(12) United States Patent
Favor et al.

(10) Patent No.: US 6,195,744 B1
(45) Date of Patent: Feb. 27, 2001

(54) UNIFIED MULTI-FUNCTION OPERATION SCHEDULER FOR OUT-OF-ORDER EXECUTION IN A SUPERSCALER PROCESSOR

(75) Inventors: John G. Favor, San Jose; Amos Ben-Meir, Cupertino; Warren G. Stapleton, San Jose, all of CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/252,898

(22) Filed: Feb. 18, 1999

Related U.S. Application Data

(63) Continuation of application No. 08/649,243, filed on May 16, 1996, now Pat. No. 5,884,059, which is a continuation of application No. 08/590,383, filed on Jan. 26, 1996, now abandoned.

(60) Provisional application No. 60/005,069, filed on Oct. 6, 1995, and provisional application No. 60/005,021, filed on Oct. 10, 1995.

(51) Int. Cl.[7] .................................................. G06F 9/00
(52) U.S. Cl. ........................... 712/215; 712/23; 712/239
(58) Field of Search ............................ 712/23, 214, 216, 712/215, 217, 235, 239

(56) References Cited

U.S. PATENT DOCUMENTS

| | | | |
|---|---|---|---|
| 4,807,115 | 2/1989 | Torng | 395/391 |
| 5,136,697 | 8/1992 | Johnson | 305/586 |
| 5,454,117 | 9/1995 | Puziol et al. | 395/800.23 |
| 5,519,864 | 5/1996 | Martell et al. | 395/391 |
| 5,530,816 | 6/1996 | Holt | 395/393 |
| 5,546,597 | 8/1996 | Martell et al. | 395/393 |
| 5,555,432 | 9/1996 | Hinton et al. | 395/393 |
| 5,560,025 | 9/1996 | Gupta et al. | 395/393 |
| 5,761,776 | 6/1998 | Popescu et al. | 395/586 |
| 5,858,176 | 1/1999 | Wilhite et al. | 395/390 |
| 5,884,059 | * 3/1999 | Favor et al. | 712/215 |

OTHER PUBLICATIONS

Dwyer III, Harry, A Multiple, Out–of–Order, Instruction Issuing System for Superscalar Processor, Cornell University, Chapter 8: 212–233.

Sohi, G.S., "Instruction Issue Logic for High–Performance, Interruptible, Multiple Functional Unit, Pipelined Computers", Mar. 1, 1990, pp. 349–359, IEEE Transactions on Computers, vol. 39, No. XP000103439.

Capozzi, A.J., et al., "Non–Sequential Hight–Performance Processing", Oct. 1984, pp. 2842–2844, IBM Technical Disclosure Bulletin, XP002024299.

(List continued on next page.)

*Primary Examiner*—Larry D. Donaghue
(74) *Attorney, Agent, or Firm*—Skjerven Morrill MacPherson LLP; David Miller

(57) ABSTRACT

A superscalar processor includes a scheduler which selects operations for out-of-order execution. The scheduler contains storage and control logic which is partitioned into entries corresponding to operations to be executed, being executed, or completed. The scheduler issues operations to execution units for parallel pipelined execution, selects and provides operands as required for execution, and acts as a reorder buffer keeping the results of operations until the results can be safely committed. The scheduler is tightly coupled to execution pipelines and provides a large parallel path for initial operation stages which minimize pipeline bottlenecks and hold ups into and out of the execution units. The scheduler monitors the entries to determine when all operands required for execution of an operation are available and provides required operands to the execution units. The operands selected can be from a register file, a scheduler entry, or an execution unit. Control logic in the entries is linked together into scan chains which identify operations and operands for execution.

17 Claims, 16 Drawing Sheets

OTHER PUBLICATIONS

Dwyer, A Multiple, Out–of–Order, Instruction Issuing System for Superscalar Processors, Chapter 3: Fast Dispatch Stack, Aug., 1991, pp. 30–73.

Popsecu, V., et al., The Metaflow Architecture:, Jun. 1, 1991, pp. 10–13, 63–73, IEEE Micro., vol. 11, No. 3, XP000237231.

Torng, H.C., et al., "On Instruction Windowing for Fine Grain Parallelism in Hight–Performance Processors", Mar. 23, 1993, pp. 98–104, IEEE, XP000370465.

Picket, J. K., et al., "Enhanced Superscalar Hardware: The Schedule Table", Nov. 15, 1993, pp. 636–644, IEEE, XP000437401.

* cited by examiner

RegOp:
| 37 36 35 | 30 29 | 26 25 24 | 22 21 | 17 16 | 12 11 10 9 | 8 7 | 0 |
|---|---|---|---|---|---|---|---|
| 0 0 Type | Ext | R1 DSz | Dest | Src1 | — SS | I | Imm8/Src2 |

LdStOp:
| 37 36 35 | 32 31 30 29 | 26 25 24 23 22 21 | 17 16 15 | 12 11 | 4 3 | 0 |
|---|---|---|---|---|---|---|
| 0 1 Type | ISF Seq | ASz DSz Data | LD Base | Disp8 | | Index |

LIMMOp:
| 37 36 35 | 21 20 | 17 16 | 0 |
|---|---|---|---|
| 1 1 | ImmHi | Dest | ImmLo |

SpecOp:
| 37 35 34 | 31 30 | 26 | 23 22 21 | 17 16 | 0 |
|---|---|---|---|---|---|
| 1 0 1 Type | CC | — | DSz | Dest | Imm17 |

FIG. 3

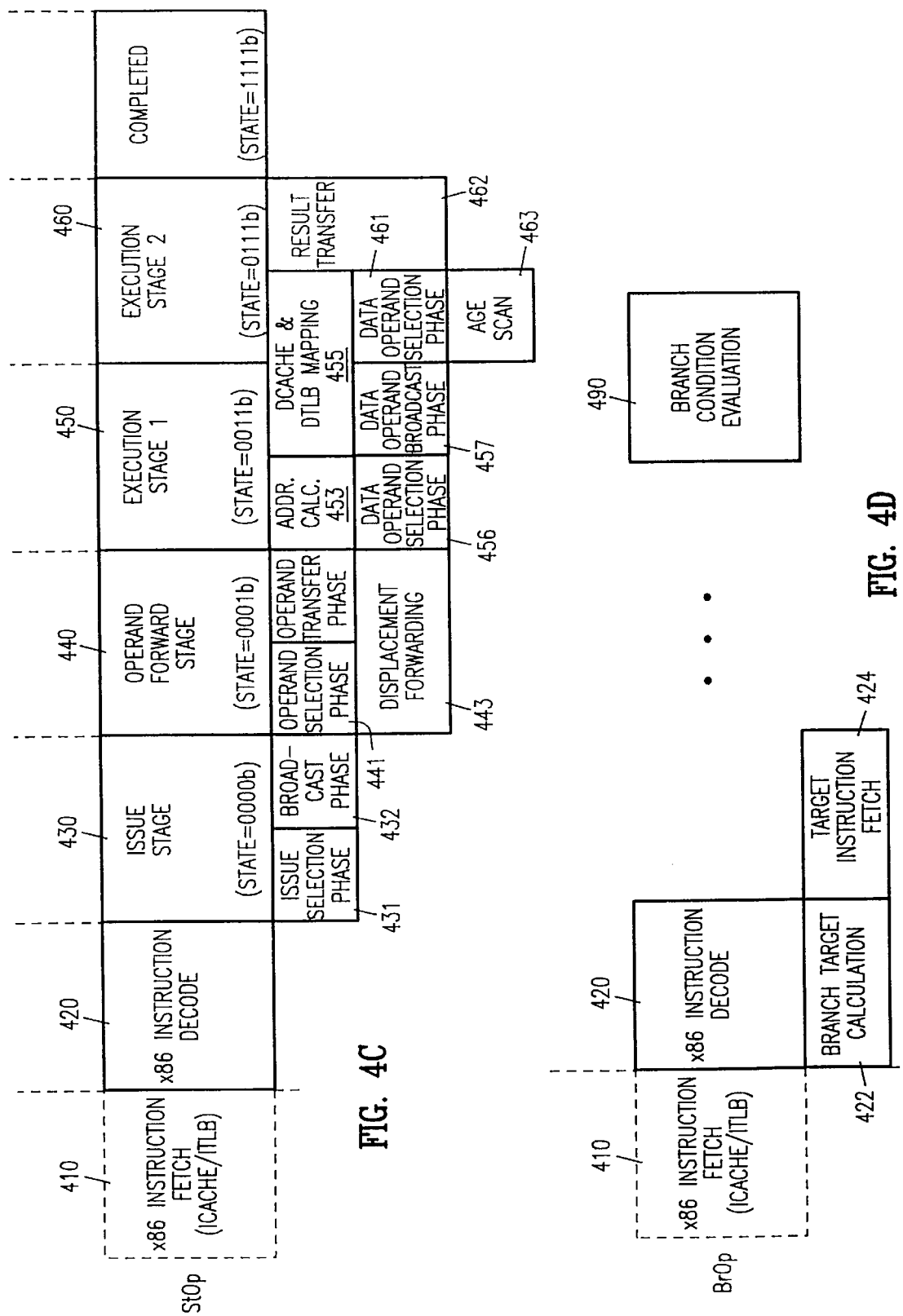

UNIFIED MULTI-FUNCTION OPERATION SCHEDULER FOR OUT-OF-ORDER EXECUTION IN A SUPERSCALER PROCESSOR

CROSS REFERENCE TO RELATED APPLICATIONS

This application is a continuation of U.S. patent application Ser. No. 08/649,243, filed May 16, 1996, (now U.S. Pat. No. 5,884,059) which is a continuation of U.S. patent application Ser. No. 08/590,383 which was filed Jan. 26, 1996 (now abandoned), which claimed the benefit of the filing dates of provisional application Ser. No. 60/005,069, filed Oct. 6, 1995 and provisional application Ser. No. 60/005,021, filed Oct. 10, 1995.

This application is related to and incorporates by reference, in their entirety the following applications:

U.S. patent application Ser. No. 08/592,150, entitled "Self- Modifying Code Handling System", filed Jan. 26, 1996 (now U.S. Pat. No. 5,826,073);

U.S. patent application Ser. No. 08/592,209, entitled "Out-of-Order Load/Store Execution Control", filed Jan. 26, 1996 (now U.S. Pat. No. 5,754,812);

U.S. patent application Ser. No. 08/592,829, entitled "Method for Simulating Cache Operation", filed Jan. 26, 1996 (now U.S. Pat. No. 5,845,106);

U.S. patent application Ser. No. 08/592,828, entitled "Method for Analyzing the Performance of a Microprocessor", filed Jan. 26, 1996 (now U.S. Pat. No. 5,886,899);

U.S. patent application Ser. No. 08/592,041, entitled "Design for a Simulation Module Using an Object-Oriented Programming Language", filed Jan. 26, 1996 (now U.S. Pat. No. 5,870,585);

U.S. patent application Ser. No. 08/649,847, entitled "A Cache Controller with Table Walk Logic Tightly Coupled to Second Level Access Logic"(now U.S. Pat. No. 5,960,464);

U.S. patent application Ser. No. 08/649,984, entitled "Instruction Decoder Including Two-Way Emulation Code Branching"(now abandoned);

U.S. patent application Ser. No. 08/649,980, entitled "Instruction Vectoring and Decode"(now U.S. Pat. No. 5,794,063);

U.S. patent application Ser. No. 08/649,983, entitled "RISC 86 Instruction Set"(now U.S. Pat. No. 5,926,642);

U.S. patent application Ser. No. 08/649,982, entitled "Software Implementation of SMM"(now U.S. Pat. No. 5,093,213);

U.S. patent application Ser. No. 08/649,242, entitled "Out-of-Order Processing with Operation Bumping to Reduce Pipeline Delay"(now U.S. Pat. No. 5,799,165);

U.S. patent application Ser. No. 08/650,055, entitled "Selection Scan Chain for Rapidly Identifying an Object in a Sequential List"(now U.S. Pat. No. 5,881,261);

U.S. patent application Ser. No. 08/649,995, entitled "Instruction Buffer Organization Method and System"(now U.S. Pat. No. 5,819,056); and U.S. patent application Ser. No. 08/649,981, entitled "Instruction Predecode and Multiple Instruction Decode" (now U.S. Pat. No. 5,826,073).

BACKGROUND OF THE INVENTION

1. Field of the Invention

This invention relates to digital processor systems, and in particular to methods and circuits for controlling the order of execution of operations to maximize processor performance.

2. Description of Related Art

A typical computer program is a list of instructions which when compiled or assembled generates a sequence of machine instructions or operations which a processor executes. The operations have a program order defined by the logic of the computer program and are generally intended for sequential execution in the program order. Scalar processors execute the operations in the program order which limits a scalar processor to completing one operation before completing the next operation. Superscalar processors contain a variety of execution units which operate in parallel to execute and complete multiple operation in parallel. Superscalar processors can therefore be faster than scalar processors operating at the same clock speed because superscalar processors can complete multiple operation per clock cycle while scalar processors ideally complete one operation per cycle.

A superscalar processor typically schedule execution of operations so that operations can be executed in parallel and complete out of the normal program order. Difficulties in out-of-order execution arise because one operation may depend on another in that the logic of a computer program requires that the first operation in the program be executed before the second operation. For example, whether an operation should be executed at all often depends on the result of a branch operation. Processors often predict the result of a branch operation before evaluating the branch operation and proceed with executing operations based on the prediction. The execution must be speculative because the branch prediction may have been incorrect so that the wrong operations were executed. Additionally, many computers require that a system's state be known just before or after an operation generates an error, interrupt, or trap; but when operations are executed out of order, an operation which follows an error in a program may have been executed before the error occurred. Thus, the processor must be able to undo operations which should not have been executed and must be able to construct the system's state following an error.

Superscalar architectures attempt to achieve several somewhat conflicting goals for scheduling operations. One goal is efficient scheduling to maximize parallel execution of operations which are actually required for completion of the program. Another goal is that scheduling circuitry not be overly complex because complexity increases the difficulty in providing a robust error free design and increases circuit size and cost. Still another goal is rapid scheduling so that a processor can operate at a high clock rate. Scheduling circuits which accomplish these goals are desired.

SUMMARY OF THE INVENTION

In accordance with the invention, an out-of-order execution engine includes a set of execution units capable of operating in parallel and a scheduler which dispatches operations to the execution units. The scheduler contains entries corresponding to operations to be executed. Each entry includes storage for information required for execution of the associated operation and logic for directing the information to the correct execution unit when required. Operations are dispatched first according to type and availability of an execution unit for the type of operation and second according to the sequential program order. Accordingly, operations of different types are often executed out of the normal program order. Operations of the same type can also be executed out-of-order because more than one execution unit may be available for a type of operation, and one operation may be held up in one execution pipeline while another execution unit completes following operations of the same type. Additionally, operations which would block an execution pipeline can be bumped from early stages of the pipeline so that even operations for a single execution unit can be executed out of the program order.

The entries in the scheduler are not specialized according to operation type, and the execution units do not have specialized stations or queues which can be blocked if an execution unit is stalled. After execution of an abortable operation, the results of the operation is kept in the associated scheduler entry and/or in a store queue. The scheduler keeps a result until an operation commit unit coupled to the scheduler determines that no fault and no mispredicted branch precedes the associated operation. If the operation commit unit determines that the results of the oldest executed operations would be generated in a sequential execution of a program, the results are made permanent by writing to a register file, a status register, or memory, and the operation is retired and removed from the scheduler. If the operation commit unit determines that a result would not be generated in a sequential execution of the program, the operation is retired without making permanent changes.

In addition to scheduling functions, the scheduler also incorporates the functions of a re-order buffer with implied register renaming. Tags indicating the program order of operation results are not required because the physical positions of entries in the scheduler indicate the program order and result values stored in an entry provide the register and status values at the corresponding point in the program order. This removes the complexity required to maintain or transfer tag information between various separate execution stations. Actual register renaming during operation execution is not required because scan chains directed in the proper physical direction in the scheduler locate preceding operations which affect desired register operands for subsequent operations.

In one embodiment of the invention, the scheduler includes rows of entries associated with pending operations. Each entry corresponds to a single operation, and each row of entries corresponds to multiple operations, for example four operations. The organization of the scheduler into rows simplifies the scheduler structure, but scheduling and execution of operations is independent of the grouping of operations in rows. The scheduler in some ways operates as a shift register where information associated with a new group of operations is loaded into a top row of the scheduler and shifts down as a group toward the bottom row of the scheduler as older operations are retired. Accordingly, the position of an operation in the scheduler indicates its age. Newer operations (i.e., operations later in the program order) are at the top of the scheduler, and older operations (i.e., operations earlier in the program order) are at the bottom of the scheduler.

Most operations are immediately eligible for execution when loaded into the top row of the scheduler but may be issued to execution units from any point in the scheduler. A state field in an entry for an operation indicates whether the operation has been issued, is in a specific stage of an execution pipeline, or has been completed. The state of the operation is independent of the operation's position in the scheduler, but the longer an operation is in the scheduler, the greater the chance that the operation will be issued and completed. Operations in a row are retired simultaneously so that multiple operations can be completed each clock cycle. Accordingly, multiple operations can be loaded into the scheduler and multiple operations can be removed from the scheduler each clock cycle.

Some operations such as evaluations of conditional branches and register operations which depend on status flags are executed when the operations reach a particular row of the scheduler. This simplifies, reduces, and speeds up hardware in the scheduler by eliminating general hardware to support execution of these operations in other rows. Scheduling delays are minimized by selecting the row for execution of such operations according to where the necessary operands for execution are likely to be available. For example, operations which depend on status flags are handled lower in the scheduler at a point where older operations are likely to have completed modification of the status flag values required for completion of the status flag dependent operation. Additional circuitry which allows execution of status flag dependent operations higher in the scheduler would provide minimal improvement in execution rate because the necessary status flags are unlikely to be available when a status flag dependent operation is in a higher row of the scheduler.

The scheduler is tightly coupled to the execution units and the operation commit unit and maintains information concerning operations in multiple execution pipelines. The scheduler issues operations, provides the operation information to the execution units when required, holds the results from completed operations until the results are committed or aborted, and forwards results as required for execution other operations. Notably, each scheduler entry holds register and status results from the associated operation. The scheduler thus implements register renaming implicitly, without explicit renaming or mapping of "logical" registers onto physical registers. Accordingly, the scheduler provides a single unified structure which schedules execution of operations, provides operand values required during execution, and acts as a reorder buffer with implied register renaming.

BRIEF DESCRIPTION OF THE DRAWINGS

FIG. 3 illustrates an example format for RISC instructions executed by an out-of-order engine in accordance with an embodiment of the invention.

FIGS. 4A, 4B, 4C, and 4D show pipelines for four types of RISC operations in an embodiment of the invention.

Use of the same reference symbols in different figures indicates similar or identical items.

DETAILED DESCRIPTION OF THE PREFERRED EMBODIMENTS

Figure 1:
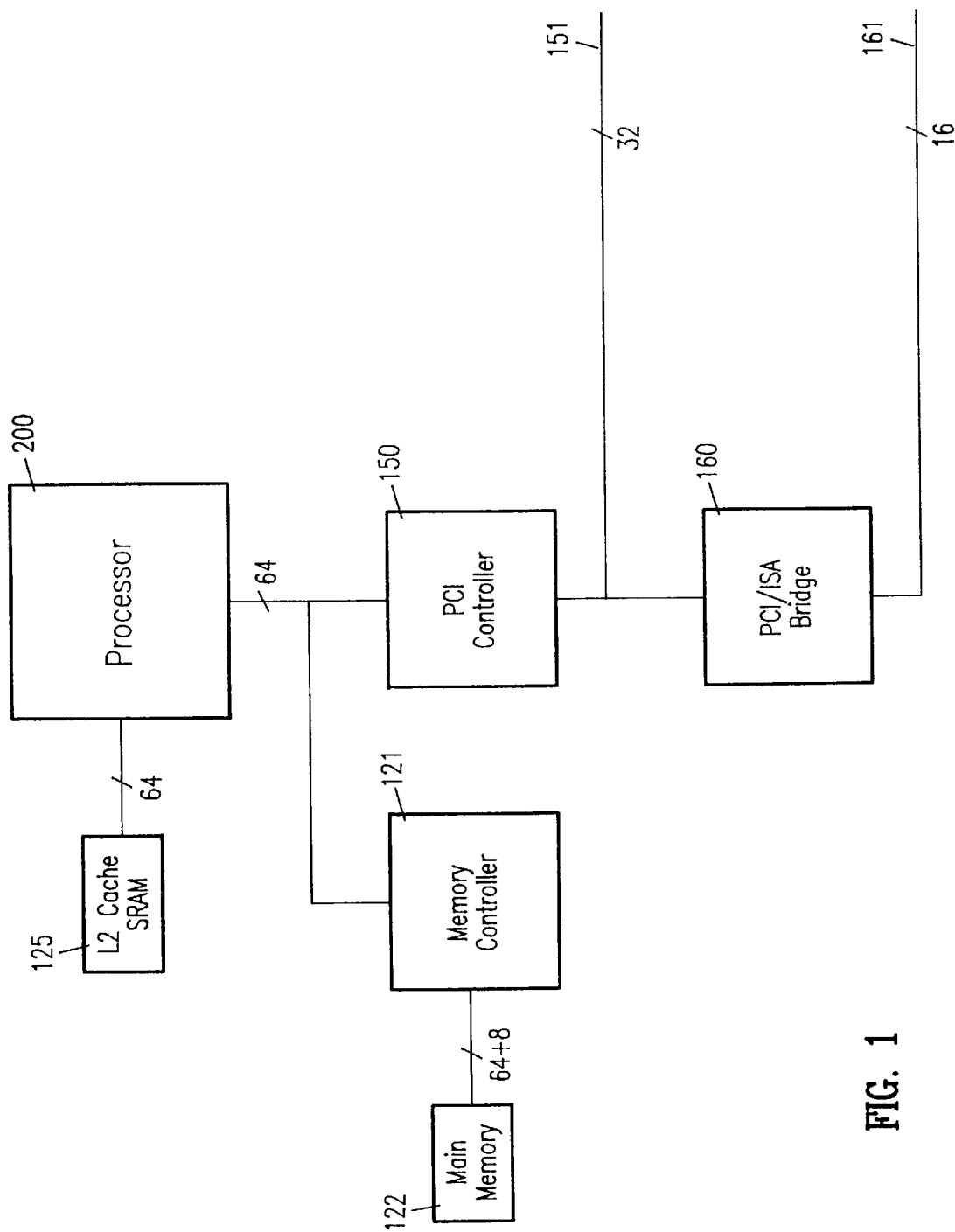
FIG. 1 shows a block diagram of a computer system including a processor in accordance with an embodiment of the invention.

The invention described in connection with the following outline:

I. Overview
II. Scheduler
  A. Scheduler Loading
    1. Static Entry Fields
    2. Dynamic Entry Fields
    3. Op Quad Fields
  B. Load/Shift Control
III. Operation Execution
  A. Issue Stage
    1. Issue Selection Phase
      a. Issue Selection Scan Chains
      b. Issue Selection Scan Chains for RUY
    2. Operand Information Broadcast Phase
  B. Operand Forward Stage
    1. Operand Selection Phase
    2. Operand Transfer Phase
    3. Displacement Forwarding
    4. Immediate Value Forwarding
  C. Data Operand Fetching
  D. Register Operation Bumping
  E. Load/Store Ordering
  F. Abort Handling
IV. Global Control Logic
  A. Scheduler Information Used by External Logic
  B. Global Control Functions
V. Status Flags
  A. Status Flag Fetch
  B. Status Flag Forwarding to cc-Dep RegOps
  C. Branch Prediction Resolution
VI. Synchronization of Non-Abortable Operations
VII. Self-Modifying Code Handling
VIII. Operation Commit Unit
  A. Commitment
    1. Register Commitment
    2. Status Flag Commitment
    3. Memory Write Commitment
  B. Op Quad Retirement
  C. Fault Handling
    1. Load Operation Fault Handling
    2. FAULT and LDDHA/LDAHA Op Handling
    3. Target Limit Violation Handling
    4. Mispredicted Branch Handling
  D. Abort Cycle Generation
IX. Processing Systems
X. Conclusion
Section A: RISC86™ Syntax
Section B: Pseudo-RTL Descriptions I. Overview A processor in accordance with an embodiment of the invention may be applied in a variety of applications including in a personal computer. FIG. 1 shows a block diagram of a computer motherboard 100 containing a processor 200 in accordance with an embodiment of the invention. Processor 200 is a monolithic integrated circuit capable of executing a complex instruction set and may be manufactured using conventional integrated circuit processes, such as a 5 metal layer CMOS process having 0.35 $\mu$m design rules. A chipset connected to processor 200 includes an external level-2 cache 125, a memory controller 121 which provides an interface to a main memory 122, and bus controllers 150 and 160 which provide interfaces to local busses such as a PCI bus 155 and an ISA bus 165.

Figure 2:
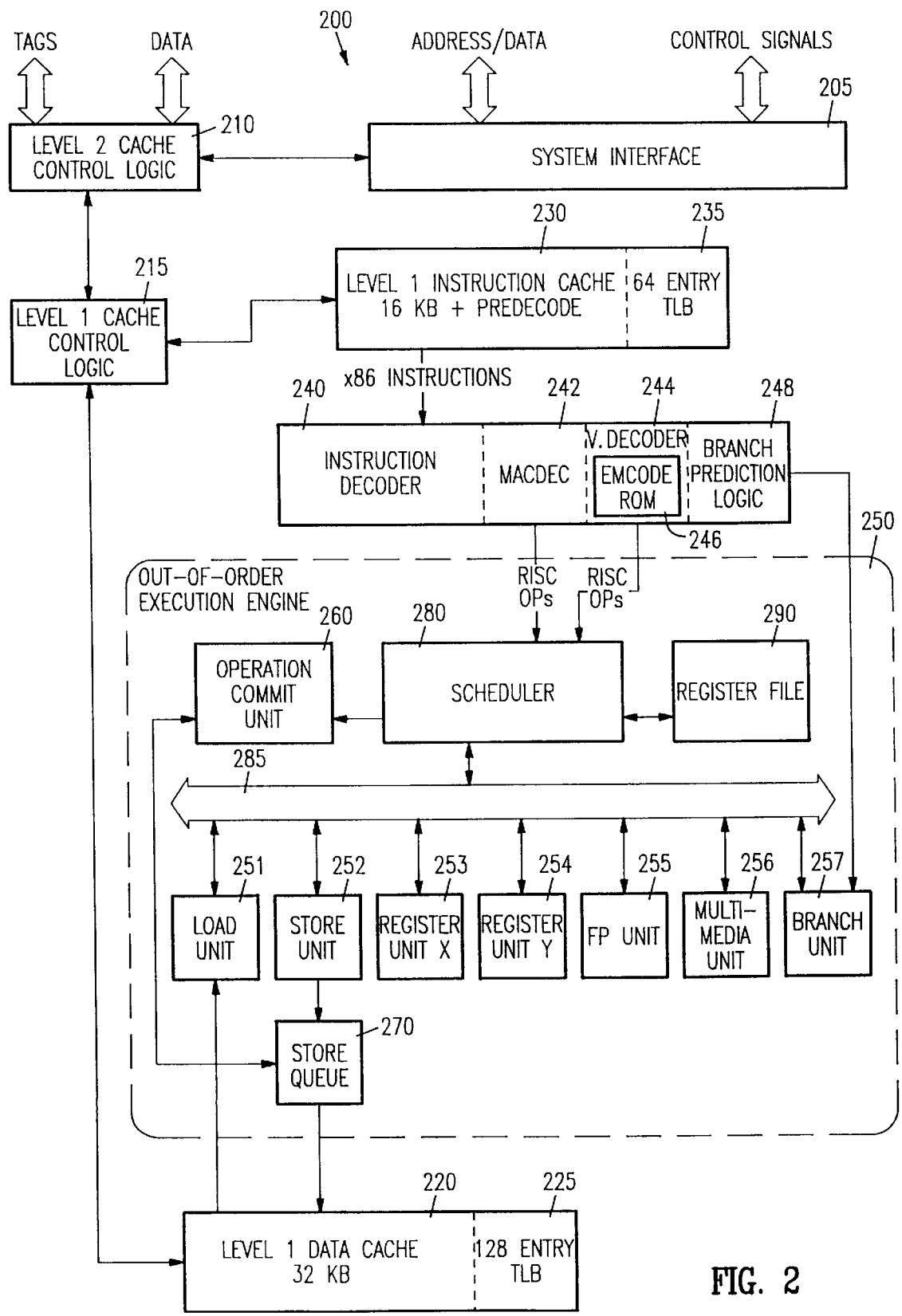
FIG. 2 shows a processor in accordance with an embodiment of the invention.

FIG. 2 shows a block diagram of an embodiment of processor 200. Processor 200 has a system interface 205 which provides access to the address space of a computer system including main memory 122 and devices on local busses 151 and 161. In an exemplary embodiment, system interface 205 has a 64-bit system bus with multiprocessor cache coherency support for modified, exclusive, shared, and invalid (MESI) states and configurable bus scaling.

Integrated level-2 cache control logic 210 provides an interface with a private bus to an external SRAM which forms level 2 cache 125. Providing level-2 cache interface separate from system interface 205 uncouples the speed of the level-2 cache from the system bus/chipset, allowing for a faster cache, and decreases utilization of the system bus and cache bus, allowing greater bandwidth on each bus. Level-2 cache control logic 210 further provides for multiple clock scaling and configurable cache sizes for up to 2 MB of data and tag storage on off-the-shelf burst pipelined synchronous SRAMs. The level-2 cache uses a writeback policy and a 32 byte line size.

As an alternative to the configuration shown in FIG. 1, processor 200 has a single bus for system and cache access. The bus, for example, may be pin-for-pin compatible with chipsets for processors such as the Pentium.

A level-1 instruction cache 230 and a level-1 data cache 220 are internal to processor 200 and are connected through level-1 cache control logic 215 to the level 2 cache and to the system bus. In the exemplary embodiment, instruction cache 230 is a two-way way set-associative cache containing storage for 16 KB of instructions and additional predecode information. Above incorporated U.S. patent application Ser. Nos. 08/649,995 and 08/649,981 describe suitable instruction caches and predecode systems. Data cache 220 is a two-way set-associative cache containing storage for 32 KB of data. To provide faster operation and avoid access conflicts, data cache 220 uses pipelined banks of dual-ported memory which allows one read and one write per cycle.

Instructions from main memory 122 are loaded into instruction cache 230. In accordance with the exemplary embodiment, the instructions in main memory 122 are CISC instructions from a complex instruction set such as the PC industry standard x86 instruction set. The CISC instructions are sometimes referred to herein as macroinstructions. Up to 16 bytes of CISC instructions are fetched per cycle. While loading instruction cache 230, instruction bytes are predecoded for rapid identification of macroinstruction boundaries. Predecoding appends code bits to each byte to indicate an offset from the byte to the start of the following instruction assuming that the instruction byte is the first byte in an instruction. Above incorporated U.S. patent application Ser. No. 08/649,981, describes a system and method for predecoding and organizing instructions which may increase the speed of instruction decoding.

An instruction decoder 240 executes unconditional branch instructions, performs branch prediction for conditional branch instructions, and converts the CISC instructions fetched from instruction cache 230 into operations for an execution engine 250. Execution engine 250 implements a superscalar, out-of-order, reduced instruction set computing (RISC) architecture. A single CISC instruction from instruction cache 230 decodes into zero (for unconditional branch instructions), one, or several operations for execution engine 250. Multiple CISC instructions can be decoded each cycle to create a set of RISC instructions which indicates the operations executed by execution engine 250. Instruction decoder 240 includes a hardware decoder (MacDec) 242 for the most common CISC instructions and a vector decoder 244 for uncommon and more complex CISC instructions. Vector decoder 244 contains a ROM 246 sometimes referred to herein as emcode ROM 246 which contains RISC instruction sequences, sometimes referred to herein as emcode. Vector decoder 244 selects an address in emcode ROM 246 according to a CISC instruction being decoded and replaces or modifies portions of the RISC instructions read from emcode ROM 246 as required to convert the CISC instruction to corresponding RISC instructions. Above incorporated U.S. patent application Ser. Nos. 08/649,984 and 08/649,980, respectively describe decoding which may be implemented in instruction decoder 240.

FIG. 3 and Section A illustrate an example format of RISC instructions that is optimized for execution of x86 CISC instructions and is sometimes referred to the RISC86® instruction set. Above incorporated U.S. pat. application Ser. No. 08/649,983 further describes the RISC86® instruction set. Each RISC86® instruction is either a register operation (RegOp), a load-store operation (LdStOp), or a special operation (SpecOp). A RegOp is sometimes designated as a ".cc" RegOp to indicate the RegOp modifies condition codes or a "cc-dep" Reg to indicate the RegOp depends on condition codes. LdStOps are further classified as either a load operations (LdOps) or a store operations (StOps). A load immediate value operation (LIMMOp) is a type of LdOp which has a different format from other LdOps and sometimes provides a large immediate value for a following LdStOp or RegOp. SpecOps include branch operations (BrOps) and floating point operation (FpOp) which have different formats. FIG. 3 and Section A describe only BrOps as an example of a SpecOp. A conditional branch operation (BRCOND) is a type of BrOp which depends on a condition code (field cc in FIG. 3).

In the exemplary embodiment of the invention, instruction decoder 240 converts x86 macroinstructions into RISC86® instructions (or operations). MacDec 242 converts common macroinstructions into short sequences of RISC86® operations. For example, x86 macroinstructions INC reg, PUSH reg, and Jcc tgt_addr are decoded into a RegOp, a StOp, and a BRCOND respectively; an ADD reg,mem macroinstructions is decoded as a LdOp and a RegOp in sequence; an ADD mem,reg macroinstructions is decoded as a LdOp, a RegOp, and a StOp in sequence; and a LEAVE macroinstruction is decode as a RegOp, a LdOp, and a RegOp in sequence.

In one embodiment, instruction decoder 240 decodes up to two x86 macroinstructions per cycle to create a set of four RISC86® operations which can be loaded into execution engine 250 in one cycle. No-op operations are used if necessary to complete a set of four operations. Two microinstructions are decoded during a cycle if the two consecutive instructions can be identified as being instructions which each decode to two or fewer operations. In an alternative embodiment, up to three (or more) macroinstructions can be decoded each cycle to form a set of four (or more) operations. Vector decoder 244 is used to decode macroinstructions which are uncommon or decode to long sequences of RISC86® operations. Such sequences may be longer than four operations and may require more than one clock cycle for loading into execution engine 250.

For unconditional branch macroinstructions, instruction decoder 240 determines the next macroinstruction fetched for decoding and generates no operations. For a conditional branch macroinstruction, decoder 240 contains branch prediction logic 248 which predicts the program counter following a conditional branch instruction and generates a BRCOND which is later evaluated to determine whether the prediction was correct. Conditional branches (BRCONDs) can also occur in RISC instruction sequences from emcode ROM 246 when the macroinstruction being decode is not a conditional branch. Emcode ROM 246 includes a prediction for each such BRCOND which vector decoder 244 uses when generating a RISC instruction sequence for a decoded macroinstruction. The prediction for a BRCOND from the emcode ROM 246 are evaluated in a manner similar to BRCOND generated directly from conditional branch macroinstruction.

Execution engine 250 contains seven execution units 251 to 257 which are generally capable of operating in parallel, a scheduler 280 which issues operations for execution, and an operation commit unit (OCU) 260 coupled to scheduler 280 for committing the results of operations. Each execution unit has corresponding operations which it can execute. A load unit 251 and a store unit 252 execute LdOps and StOps respectively. A store queue 270 temporarily stores data from speculative execution of StOps by store unit 252. Data from store queue 270 is written to data cache 220 when the results of a StOp are committed as described below. Register units 253 and 254, also referred to herein as RUX and RUY, execute RegOps which nominally access a register file 290. A floating point unit 255 and a multimedia unit 256 are optional units which respectively execute floating point operations (FpOps) and operations for multimedia applications. In the exemplary embodiment, floating point unit 255 and multimedia unit 256 are omitted.

Scheduler 280 issues operations to execution units 251 to 257, dispatches information required by the various execution units during execution, and deletes operation information as operations are retired. Scheduler 280 is partitioned into entries where each entry contains storage and logic associated with an operation. Information in the storage of an entry describes an operation which is to be executed, is being executed, or has been executed. In the exemplary embodiment, sets of four entries are organized into groups, referred to herein as rows even though entries may not be physically positioned as a row. The information associated with four operations in a row is referred to herein as an Op quad. Rows contain storage fields and logic associated with an Op quad as a group in addition to the information and logic associated with individual operations.

Scheduler 280 operates in many ways like a shift register. In an exemplary embodiment, scheduler 280 is six rows deep. Decoder 240 can load a new Op quad into the top row of scheduler 280 each clock cycle. The Op quad shifts down from the top row towards a bottom row from which the Op quad is retired. The position of an Op quad in scheduler 280 indicates the age or place in the program order for the Op quad; but for most operations, the position in scheduler 280 is independent of the stage of execution.

FIGS. 4A to 4D show multi-stage pipelines associated with RegOps, LdOps, StOps, and BrOps. Each stage in the pipelines nominally requires one processor clock cycle unless an operation is held up in one of the stages preventing operations at earlier stages from advancing. Two preliminary stages 410 and 420 are common to all the execution pipelines. During stage 410, up to 16 bytes of CISC instructions are fetched into instruction cache 230 and predecoded to identify instruction boundaries and reduce subsequent decode time. During stage 420, instruction decoder 240 decodes up to three CISC instructions from instruction cache 230 and forms an Op quad which is loaded into the top row of scheduler 280.

Scheduler 280 then controls an issue stage 430 and an operand forward stage 440 associated with operations other than BrOps. During an issue stage 430, scheduler 280 scans its entries and issues up to six operations to corresponding execution units 251 to 256. Scheduler 280 may select newer operations for issue before an older operation so that execution is out-of-order and speculative. Operand dependencies are not consider during issue selection. Scheduler 280 transmits operands to execution units 251 to 256 during operand forwarding stage 440 for the operations previously issued during issue selection stage 430. During stage 440, some operations issued to register unit 253 or 254 may be bumped out of a pipeline to avoid long blockage of the pipeline if needed operands will not be available for several clock cycles.

Figure 4A:
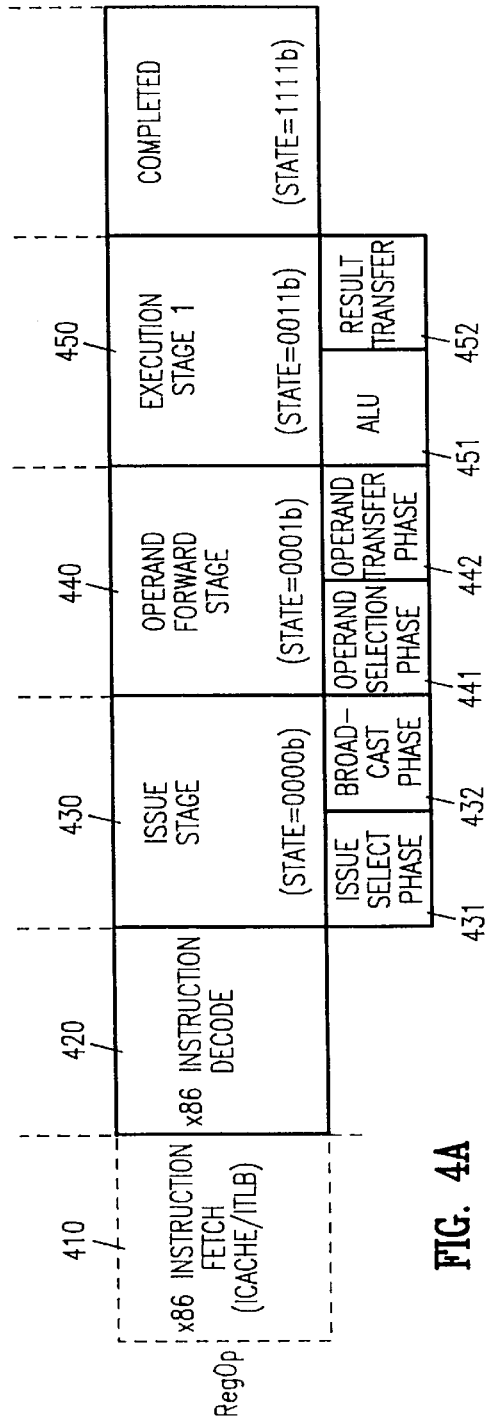

As shown in FIG. 4A, execution of RegOps is completed in the one clock cycle which is execution stage 450. Execution stage 450 of a RegOp includes an ALU phase 451 in which an arithmetic logic unit (ALU) in register unit 253 or 254 processes the source operands of the RegOp according to the type of RegOp being executed, and a result transfer phase 452 in which a result and status values from register unit 253 or 254 are stored back in the entry corresponding to the RegOp. Results and status flags stored in the entry are subsequently committed to register file 290 and the architectural status flag register if and when it is safe to do so. After or just as an operation completes, the operation's results can be committed and the operation can be retired by shifting the Op quad containing the operation out of scheduler 280. Between completion and commitment, the results- and status flags from an operation are available in scheduler 280 for execution of other instructions.

Figure 4B:
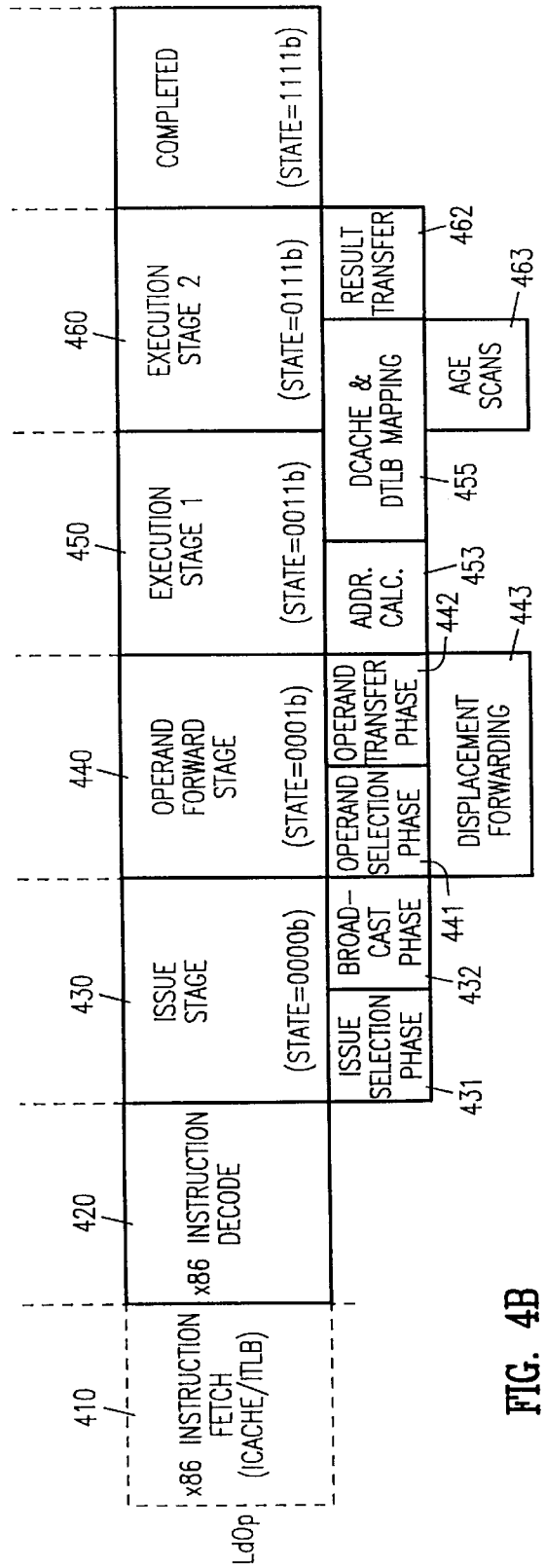

FIGS. 4B and 4C show that LdOps and StOps require two execution stages 450 and 460. Executions stages 450 and 460 include an address calculation phase 453 which determines a virtual address for a data access, a DTLB mapping phase 455 which maps addresses for accessing data cache 220, and a result transfer phase which returns the result of the operation for storage in the entry corresponding to the operation. Upon completion of an operation, scheduler 280 receives results which are speculative and are only committed if and when it is safe to do so.

FIG. 4D illustrates handling of BrOps. When instruction decoder 240 decodes a CISC branch instruction and generates a BrOp, decoder 240 determines a new program counter for the next CISC instruction to be decoded. For unconditional branches, there is no uncertainty in the new program counter, and decoder 240 completes the unconditional branch by changing the program counter. Instruction decoder 240 includes parallel adders for fast addition of an offset and the old program counter value to calculate the new program counter value. Instruction decoder 240 also includes a 16-entry return address stack onto which instruction addresses following subroutine calls are pushed for later prediction of instruction addresses after return instructions.

For conditional branches, decoder 240 predicts the program counter value following a conditional branch, and inserts a BRCOND in an Op quad loaded into scheduler 280. In the exemplary embodiment, the branch prediction is a branch correlation process which is sometimes referred to in the art as two-level branch prediction. U.S. Pat. No. 5,454, 117, entitled "Configurable Branch Prediction for a Processor Performing Speculative Execution," describes an example branch correlation process which may be used. The branch correlation predicts the address of the instruction executed after a branch instruction.

Branch prediction logic 248 in instruction decoder 240 uses an 8,192-entry branch history table (BHT) where each BHT entry contains the standard two history bits indicating tendency for the branch to be taken or not taken. The entries are indexed using a combination of four bits from the program counter (PC) and nine bits of global branch history so that whether a branch is taken or not is predicted not only from the address of the branch but also from the path which program execution took in reaching the branch. This provides a better branch prediction which reduces the chance of having to flush scheduler 280 as described below.

If the predicted or changed program counter hits in a 16-entry branch target cache of decoder 240, the next CISC instruction is ready for decoding by the end of x86 instruction decode stage 420. Otherwise, a clock cycle 424 is required to-calculate an address and fetch the next CISC instruction for decoding.

Like all other operations, conditional branch operations (BRCONDs) loaded into scheduler 280 shift toward the bottom of scheduler 280 as older operation are retired, but no issue selection scan is used for BRCONDs. A BRCOND enters a branch condition evaluation stage 490 when the BRCOND reaches row 4 of scheduler 280. Branch evaluation unit 257 can evaluate one BRCOND per cycle provided that the condition codes (cc) required for each BRCOND are valid. Branch evaluation unit 257 determines the correct program counter following the BRCOND and whether the BRCOND was correctly predicted. The required condition codes are likely to be valid when the BRCOND reaches row 4 because older operations (those in rows 4 and 5) are likely to have been completed. If the required condition codes are not yet valid, the BRCOND is held up by preventing the Op quad from shifting out of row 4. When a BRCOND is held up, Op quads above row 4 are prevented from shifting unless one or more of rows 0 to 3 is an empty (i.e. invalid) Op quad. If each of rows 0 to 3 contains valid Op quads, instruction decoder 240 cannot load a new op quad into scheduler 280 while the BRCOND is held up. Shifting of rows 4 and 5 is also held up if shifting of row 3 is held up because shifting row 4 or 5 would require creating an empty Op quad and the exemplary embodiment can only create an empty Op-quad in the top row of scheduler 280.

If a branch was correctly predicted, fetching, decoding, and executing operations continue without interruption. If the branch was incorrectly predicted, scheduler 280 restarts decoder 240 at the correct instruction address following the BRCOND so that decoder 240 starts fetching and decoding the right instructions while results from operations older than the mispredicted branch are committed and retired from scheduler 280. Loading of new instructions into scheduler 280 is inhibited until the mispredicted BRCOND is retired and scheduler 280 is flushed. When the mispredicted branch is retired, execution unit 250 is flushed by invalidating every operation in scheduler 280 and in execution units 251 to 257. All operations can be invalidated because all operations preceding the mispredicted branch must have been completed and retired before the mispredicted8 branch shifts out of the bottom row of scheduler 280 and no new instruction are loaded into scheduler 280 before the mispredicted branch is retired. Invalidating all operations simplifies the process because no identification of operations which must be retained is required. Delaying loading of new instructions has a minimal effect on performance because typically the mispredicted branch shifts down to the bottom row and is retired after two clock cycles which is about the same amount of time required for decoder 240 to fetch and have available the first new instructions.

Execution engine 250 executes abortable and non-abortable operations. Non-abortable operations cannot be speculatively executed and are only executed when the results can be safely committed. Abortable operations are speculatively executed. After an abortable operation reaches the final stage of its pipeline and is completed, any result from the execution is stored in scheduler 280 until operation commit unit 260 determines that committing the results is safe. Each cycle, one Op quad (up to four operations) can be committed and retired from scheduler 280.

II. Scheduler

Figure 5:
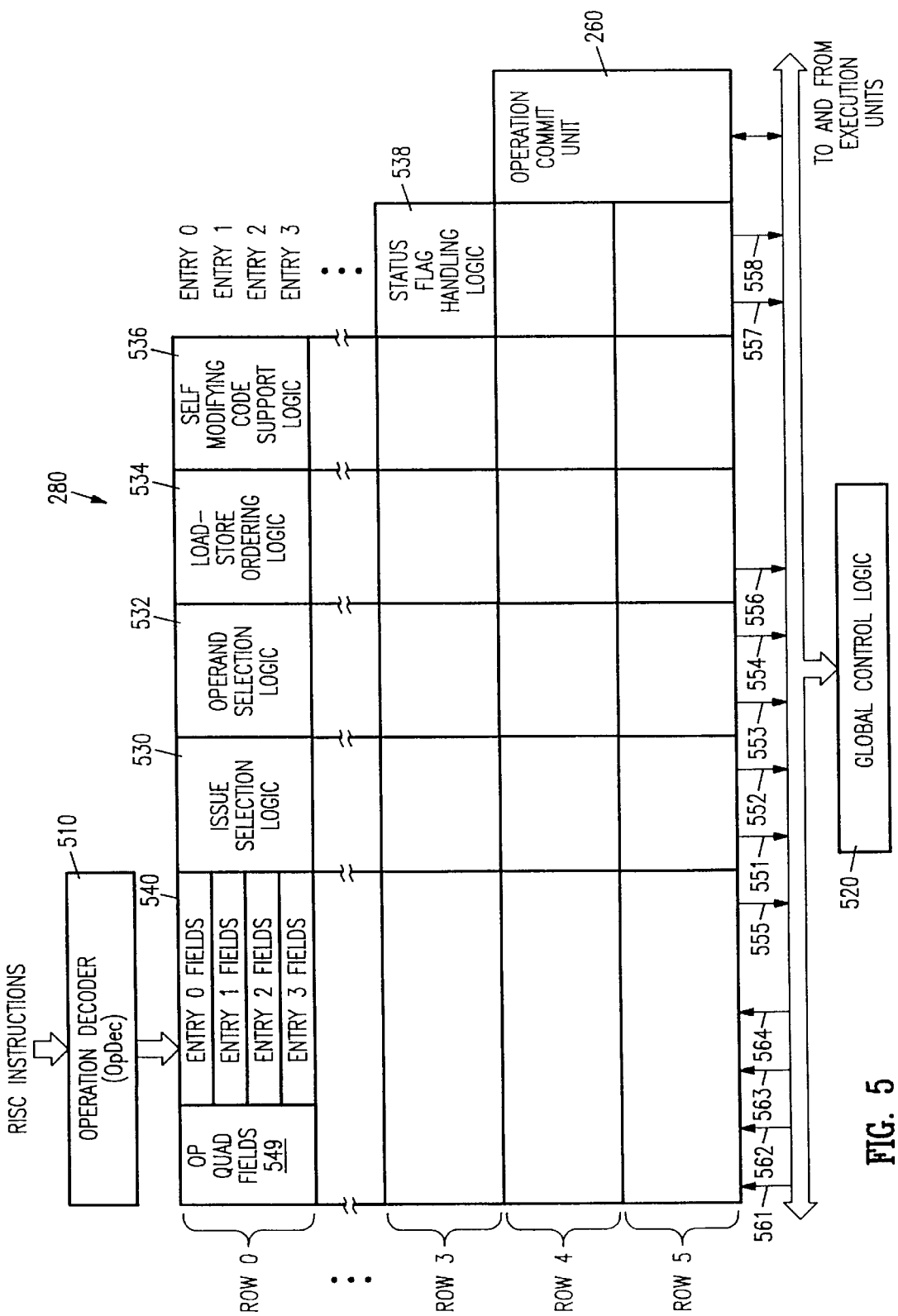
FIG. 5 shows a scheduler in accordance with an embodiment of the invention.
Figure 7:
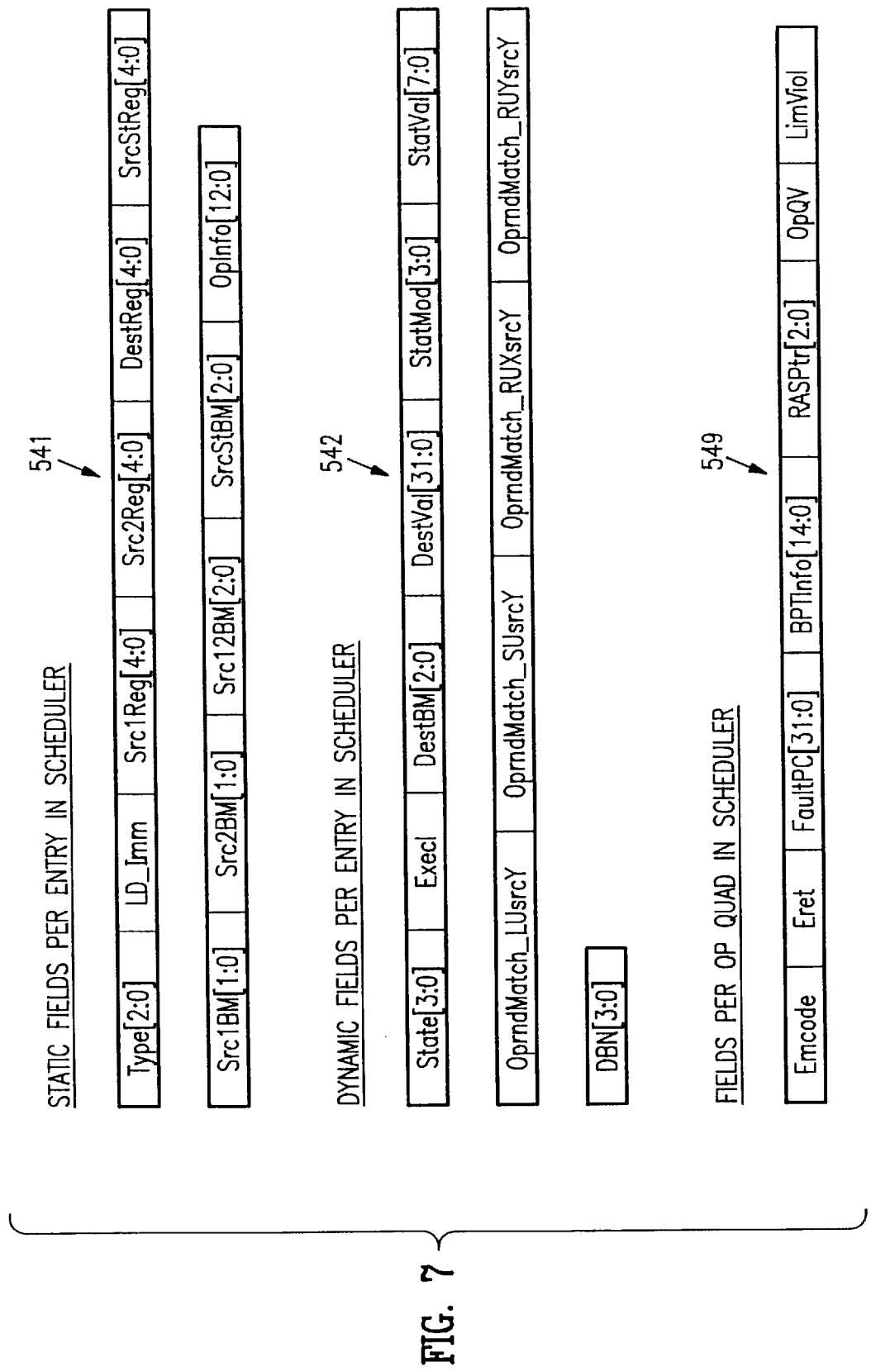
FIG. 7 illustrates an example format for fields for operations and Op quads stored in the scheduler of FIG. 5.

FIG. 5 shows the exemplary embodiment where scheduler 280 contains 24 entries associated with up to 24 operations. Each entry includes storage elements (nominally flip-flops) in a scheduling reservoir 540 and portions of logic 530, 532, 534, 536, and 538 associated with the entry. The storage elements store information regarding an operation (Op) which is awaiting execution, being executed, or completed. An operation decoder 510 receives four RISC86® operations from instruction decoder 240 and loads or initializes a new Op quad in the top row of scheduler reservoir 540. The fields in reservoir 540 are shown in FIG. 7 and are related to but not identical to the fields of the associated RISC86® instructions shown in FIG. 3. Some fields retain the same value throughout execution of the associated operation and are referred to herein as "static fields." Other fields are loaded or changed later such as when the operation completes execution and are referred to as "dynamic fields." The storage elements in scheduling reservoir 540 can be loosely viewed as a shift register that is six rows deep. Each row contains four entries, each entry associated with a RISC86® instruction. Each clock cycle, an Op quad that is not held up in a row shifts down to the next row if the next row is empty or contains an Op quad that is also shifting downward. The Op quad in the bottom row (row 5) shifts out of scheduler 280 if all operations associated with the bottom row have been committed.

Figure 6:
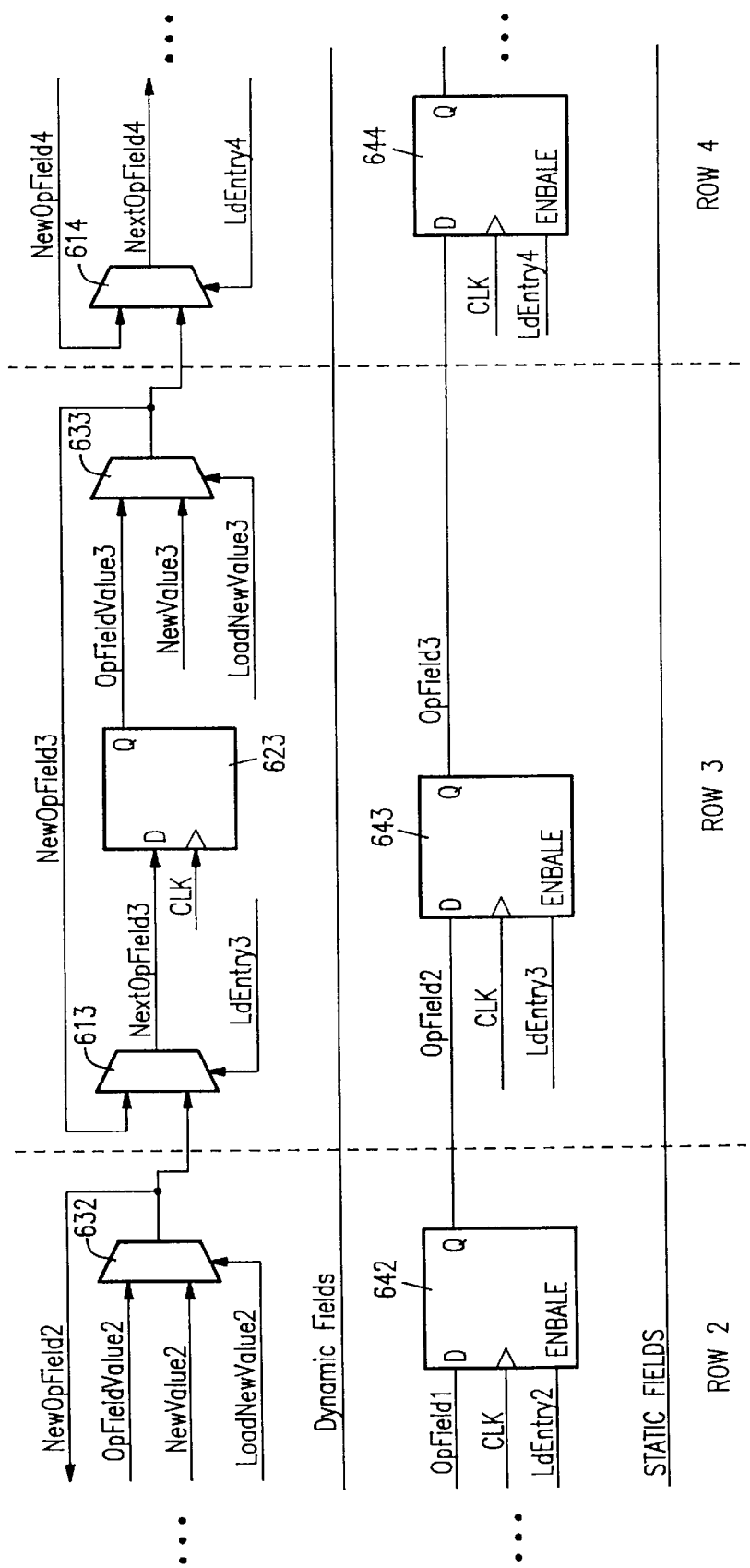
FIG. 6 shows a circuit diagram of a portion of a scheduler reservoir in accordance with an embodiment of the invention.

FIG. 6 shows an embodiment of a portion of scheduling reservoir 540. The portion of scheduling reservoir 540 shown in FIG. 6 includes a storage element (edge triggered flip-flop 623) for a dynamic field in row 3 of scheduler 280 and a storage element (edge triggered flip-flop 643) for a static field in the same row. Row 3 contains similar storage elements for each bit in the dynamic and static fields as shown in FIG. 6 and described below. The other rows in scheduling reservoir 540 are similar or identical to row 3 and are connected in series with row 3.

In FIG. 6, flip-flops 642, 643, and 644 store a bit of the same static field in respective rows 2, 3, and 4; and a bit value associated with an Op quad shifts from flip-flop 642 to flip-flop 644 as the Op quad shifts from row 2 to row 4. Global control logic 520 generates signals LdEntry[i], one for each row (i=0 to 5), which control whether shifts to the corresponding rows occur. The rows are overwritten at the rising edge of clock signal CLK. For example, a signal LdEntry3 either enables or disables flip-flop 643, and a signal LdEntry4 either enables or disables flip-flop 644. Accordingly, when an Op quad is held up in row 4, signal LdEntry4 is deasserted so that flip-flop 644 retains a value. The independence of signals LdEntry[i] allows filling of empty Op quads entries which may be above a held up Op quad. For example, if an Op quad is held up in row 4, signal LdEntry3 can be asserted so that a value OpField2 from row 2 shifts into row 3 at the rising edge of clock signal CLK. (Empty rows may result if, for example, instruction decoder 240 is unable to provide an Op quad every cycle because of a branch target cache miss.) Table B.1 in Section B describes operation of circuitry implementing static fields.

Dynamic fields are more complicated than static fields because new data from outside scheduling reservoir 540 may be inserted into a dynamic field while shifting old data, and the new data must stay with the correct Op quad which may or may not shift to the next row. Signals OpFieldValue2 and OpFieldValue3 represent information associated with respective first and second Op quads in rows 2 and 3. Circuitry outside scheduler reservoir 540 generates signals Newvalue2 and NewValue3 to change the information associated with the first and second Op quads respectively. Multiplexer 632 selects whether a new information signal NewOpField2 changes to new value NewValue2 to change the first Op quad or stays equal to old value OpFieldValue2. Multiplexer 633 selects whether a new information signal NewOpField3. changes to new value NewValue3 or stays equal to old value OpFieldValue3.

Whether dynamic field values associated with the first Op quad changes or not, value NewOpField2 can be written into row 2 or written into row 3 at the rising edge of clock signal CLK. For the first Op quad to shift into row 3, signal LdEntry3 causes a multiplexer 613 to select signal NewOpField2 as signal NextOpField3 which is written to flip-flop 623 at a rising edge of signal CLK. To prevent the first Op quad from shifting into row 3, signal LdEntry3 causes multiplexer 613 to select signal NewOpField3 which is written in flip-flop 23 . . . Signal LdEntry4 and multiplexer 614 similarly select whether the second Op quad is allowed to shift from row 3 into row 4. Table B.2 in Section B describes operation of circuitry implementing dynamic fields.

II.A Scheduler Loading

Instruction decoder 240 decodes macroinstructions and forms sets of four RISC86 instructions which are transmitted to scheduler 280 whenever row 0 (the top) of scheduler 280 is empty or contains an Op quad that is shifting to row 1. Emcode ROM 246 can contain an Op quad where not all of the operations in the Op quad are actually part of implementation of an x86 instructions. This may occur because different x86 instructions have different entry points in the same code in emcode ROM 246 or because an operation within emcode ROM 246 causes a branch into the middle of an Op quad. Instructions not required for the x86 instruction being decoded are nulled (changed to NO-OPs). Instruction decoding also includes environment variable substitution for fields of operations. For variable substitution, an emulation environment maintains environmental variables which include, for example, default address and data sizes and register numbers for the current code segment and x86 instruction being decoded. The environmental variables replace placeholder values in operations from emcode ROM 246. Environment variable substitution increases flexibility of emcode ROM 246 because different environmental variables convert one emcode section to implement different x86 instructions. Instruction decoder 240 and/or operation decoder 510 perform environmental variable substitution as required.

In scheduler 280, operation decoder 510 receives an Op quad from instruction decoder 240 and fills storage fields in the top row of scheduling reservoir 540. If no Op quad is available from instruction decoder 240, operation decoder 510 creates an empty Op-quad when the Op quad in the top row shifts down.

FIG. 7 illustrates an example of static entry fields 541, dynamic entry fields 542, and Op quad fields 549 in scheduler reservoir 540. The initial values of entry fields 541 and 542 depend on a corresponding RISC86 instruction. Operation decoder 510 modifies some fields from the RISC86 instructions based on other fields, derives new fields from existing ones, replaces some fields with physically different fields, and passes a few fields through unchanged. Op quad fields are generated from information corresponding to the Op quad as a whole.

II.A.1 Static Entry Fields

In the exemplary embodiment, each entry contains static fields 541 which are defined as follows, where all signals are active high.

Field Type[2:0] specifies the type of operation associated with the entry. Possible types include:

SpecOp; LdOp; StOp; StOp which references memory or generates a faultable address; RegOp executable only by register unit 253; and RegOp executable by either register unit 253 or 254. Multimedia unit 256 executes selected types of RegOps which are related to multimedia applications. Floating point operations (FpOps) are a type of SpecOp executed by floating point unit 255. Table B.3 in Section B describes circuitry in operation decoder 510 which generates a value for field Type.

Field LD_Imm indicates whether the operation requires an immediate value from a preceding LIMMOp. The immediate value is a large displacement if the operation is a LdStOp that uses a large displacement versus a small (8-bit) displacement held within field DestVal of the entry. For a RegOp, the immediate value is the second operand Src2. Table B.4 in Section B describes circuitry in operation decoder 510 which generates a value for field Ld_Imm.

Fields Src1Reg[4:0], Src2Reg[4:0], and SrcStReg[4:0] hold register numbers identifying registers which respectively hold the first source operand Src1, the second source operand Src2, and the store data operand of the operation. Tables B.5, B.6, and B.7 in Section B describe circuitry in operation decoder 510 which generates values for fields Src1Reg, Src2Reg, and SrcStReg.

Field DestReg[4:0] holds a register number identifying the destination register of the operation. Table B.8 in Section B describes circuitry in operation decoder 510 which generates a value for field DestReg.

Fields Src1BM[1:0], Src2BM[1:0], and Src12BM[2] indicate which bytes of operands Src1 and Src2 must be valid for execution of the operation. By definition, Src1BM[2] and Src2BM[2] are equal to Src12BM[2]. Bits 2, 1, and 0 of Src1BM[1:0] and Src2BM[1:0], indicate bits [31:16], [15:8], and [7:0], respectively. Table B.9 in Section B describes circuitry in operation decoder 510 which generates values for fields Src1BM[1:0], Src2BM[1:0], and Src12BM[2].

Field SrcStBM[2:0] indicates which bytes of the store data operand are required for completion of a StOp. The bit correspondence is the same as for Src1BM or Src2BM. Table B.10 in Section B describes circuitry in operation decoder 510 which generates a value for field SrcStBM.

Field OpInfo[12:0] holds additional information for the execution units or the operation commit unit (OCU) depending on whether the operation is executable. Field OpInfo has three possible field definitions, depending on whether the operation is a RegOp, a LdStOp, or a SpecOp. For a RegOp, field OpInfo contains a concatenation of: six bits from the RISC86 Type field; four bits from the RISC86 Ext field; the RISC86 R1 field; and two bits indicating an effective data size DataSz for the operation. For a LdStOp, field OpInfo contains a concatenation of: four bits from the RISC86 Type field; two bits from the RISC86 ISF field; four bits from the RISC86 Seg field; two bits indicating the effective data size DataSz for the operation; and a bit AddrSz indicating the effective address size for the address calculation (32/16 bits). For a SpecOp, field OpInfo contains a concatenation of four bit from the RISC86 Type field and five bits from the RISC86 cc field. Table B.11 in Section B describes circuitry in operation decoder 510 which generates a value for field OpInfo.

II.A.2 Dynamic Entry Fields

Dynamic entry fields 542 are initialized by operation decoder 510 but can change during execution of operations. Typically, each entry contains logic for changing dynamic fields as required. The dynamic fields 542 for an entry in the exemplary embodiment are defined as follows.

Field State[3:0] indicates an operation's execution state with respect to the pipelines of FIGS. 4A to 4D. (S3,S2,S1, S0 are alternate signal names for State[3:0].) Field State encodes five possible states by shifting a field of ones across four bits. Value b0000 indicates an "Unissued" state; b0001, b0011, and b0111 indicate an operation at operand forward stage, execution stage 1, and execution stage 2; and b1111 indicates an operation is completed. Most operations enter scheduler 280 with field State set to b0000, "unissued", and field State changes after the operation issues to an execution pipeline. Field State is updated (effectively shifted) when the operation issues or advances out a pipeline stage. Upon completion of the pipeline, field State is set to b1111 while the operation awaits being committed and retired. Field State of every entry is set to b1111 during abort cycles. Some operations (e.g. load constant operation LDK) have an initial state field value of 1111 and thus are already completed when loaded into scheduler 280. Table B.12 in Section B describes circuitry in operation decoder 510 which initializes field State and circuits.in the entries of scheduler 280 which modify field State during execution of the associated operation.

Field Exec1 indicates register unit 253 (not 254) is executing the operation and is set when the operation has successfully been issued to execution unit 253. Table B.13 shows the logic which sets and changes field Exec1.

Field DestBM[2:0] holds byte marks indicating which bytes of the register indicated by field DestReg the operation modifies. DestBM[2], DestBM[1], and DestBM[0] correspond to bits [31:16], [15:8], and [7:0] respectively. Field DestBM is initialized by operation decoder 510 and may be cleared during an abort cycle. Logic associated with field DestBM is described in Table B.14 of Section B.

Field DestVal[31:0] holds results from execution of the operation, to be committed to DestReg. DestBM indicates which bytes are valid after operation execution. Field DestVal is loaded when the operation completes execution stage 1 or 2 (depending on the type of operation); for non-executed operations (e.g. LDK), DestVal is initialized with the appropriate result value. Field DestVal can be used for temporary storage before results are stored when an operation is completed. In the exemplary embodiment, field DestVal initially holds immediate and displacement values for RegOps and LdStOps respectively, and the alternate (sequential or target) branch program counter value for a BRCOND. Logic associated with field DestVal is described in Table B.15 of Section B. Field StatMod[3:0] holds status group marks indicating which groups of status flags an operation modifies. Bits 3, 2, 1, 0 respectively correspond to flag bit groups {EZF,ECF}, OF, {SF,ZF,AF,PF}, and CF where flags bits EZF, ECF, OF, SF, AF, PF, and CF may be modified by RegOps. Field StatMod is all zeroes for non-RegOps and is cleared during abort cycles. Logic associated with field StatMod is described in Table B.16 of Section B.

Field StatVal[7:0] holds the operation's status result value which is to be committed to status register EFlags. StatMod indicates which flag groups are affected-after execution. StatVal is significant only for RegOps; this is reflected by StatMod. StatVal is loaded when the RegOp completes execution stage 1. Logic associated with field StatVal is described in Table B.17 in Section B.

Fields OprndMatch__XXsrcY, where "XX" is LU, SU, RUX, or RUY and "Y" is 1 or 2, are additional storage elements for transient information that is passed between two pipeline stages in contrast to information of more global significance. Table B.18 in Section B describes logic which controls fields OprndMatch__XXsrcY.

Field DBN[3:0] holds four data breakpoint status bits Bn (n=0 to 3) for a LdStOp. This field is initially all zeroes, then, when the associated LdStOp executes, breakpoint bits from the appropriate unit are recorded for later trapping. Table B.19 in Section B describes logic associated with field DBN[3:0].

II.A.3 OD Quad Fields

Each row in scheduler 280 contains four entries plus Op quad fields 549 associated with the Op quad as a whole. The following enumerates the additional Op quad fields 549 shown in FIG. 7. Operation decoder 510 initializes Op quad fields. Most Op quad fields are static. Some Op quad fields are dynamic, and logic in each row of scheduler 280 changes the dynamic Op quad field as required.

Field Emcode indicates whether the Op quad is from MacDec 242 or vector decoder 244 (i.e. emcode ROM 246) Table B.20 describes setting of field Emcode.

Field Eret indicates whether this is an emcode Op quad and that is marked as the last Op quad in a series of Op quads representing a complex macroinstruction. Table B.21 describes logic which sets field Eret.

Field FaultPC[31:0] holds the logical macroinstruction fault program counter value associated with the first operations in the row. Operation commit unit 260 uses field FaultPC when handling fault exceptions. Table B.22 describes logic which sets field FaultPC.

Field BPTInfo[14:0] holds branch prediction table-related information from when the Op quad was generated. Field BPTInfo is defined only for MacDec-generated Op quads which contain a BRCOND. Table B.23 describes logic which sets field BPTInfo.

Field RASPtr[2:0] holds a pointer to the top of the return address stack as of when the Op quad was generated. Field RASPtr is defined only for MacDec-generated Op quads which contain a BRCOND. Table B.24 describes logic which sets field RASPtr.

Field LimViol indicates that the Op quad is the decode of a transfer control instruction for which a code segment limit violation was detected on the target address. For most rows, field LimViol is static. Field LimViol is loaded in row 1 as summarized in Table B.25 in Section B.

Field OpQV indicates whether the row contains a valid Op quad and global logic 520 use field OpQV when controlling the shifting of Op quads. Invalid Op quads may be overwritten if an Op quad lower in scheduler 280 is held up. Fields in a row containing an "invalid" Op quad have the same values as an aborted Op quad, and an Op quad can become invalid as a result of an abort. Table B.26 of Section B describes logic controlling field OPQV.

Fields Op1I, Op2I, and Op3I hold a count (1, 2, or 3) of the number of macroinstructions represented by an Op quad and are used to count retired instructions.

Fields Ilen0 and Ilen1 hold lengths in bytes of the first and (if present) second macroinstructions represented by the Op quad and are used to determine the instruction address at which a fault occurred.

Fields Smc1stAddr, Smc1stPg, Smc2ndAddr, and Smc2ndPg hold the first and (if instructions from more than one page are in the Op quad) second addresses covered by operations in the Op quad and are used to detect self-modifying code.

II.B Load/Shift Control

As described earlier, scheduler 280 manages 24 entries as a shift register (or FIFO buffer) containing six rows. Scheduler 280 is not as rigid as a shift register in that each row has an independent shift control (actually a load control signal LdEntry[i]). An Op quad can shift down to the next row (and the preceding Op quad can shift down into this row from above) as long as the next row is empty or being emptied. Op quads always shift down into higher numbered rows when space is available. Ideally each Op quad shifts down one row each clock cycle, at a clock cycle boundary.

For most operations, position in scheduler 280 is independent of pipeline stage for the operation. Accordingly, most operations shift down in scheduler 280 even if held up in an execution pipeline. Two exceptions are operations that depend on status flags and any operation in the bottom row of scheduler 280. Operations which depend on status flags have a stage which must be executed when the operation is in a particular row of scheduler 280 and thus inhibit shifting until the stage is completed. Operations in row 5 inhibit shifting or retirement of an Op quad from row 5 until all operations in row 5 are completed and committed.

Table B.27 in Section B describes circuitry in global control logic 520 which generates signals LdEntry0 to LdEntry5 that control shifting in scheduler 280 and signals SchedFull and SchedEmpty which indicate whether scheduler 280 can accept a new Op quad at the end of the current cycle.

III. Operation Execution

Physically, scheduling reservoir 540 is a storage structure which holds state values for operations. In addition to reservoir 540, scheduler 280 includes logic which operates on the state values during operation execution. From a control perspective, scheduler 280 is a pipelined data path which generates control information for execution of operations through the processing pipelines and handles execution results. Scheduler storage and state changes are synchronous with the system clock, i.e. all state changes in scheduler 280 are on the rising edge of the system clock so that all storage elements in scheduler 280 (at least logically) are edge-triggered flip-flops such as described in regard to FIG. 6. From a logical perspective, all state sequencing within scheduler 280 is single cycle in nature. State transition decisions are made each cycle based on the machine state during the cycle.

The structure of scheduler 280 reflects the pipelined nature of operation execution. Logic in scheduler 280 (and correspondingly each entry) can be divided into many distinct, largely independent chunks of logic, each of which is directly associated with a specific processing stage of a given type of operation or execution pipeline. From the perspective of a particular processing pipeline, a chunk of scheduler logic associated with each stage provides key control information for the processing done in that stage and/or for determining when that stage can successfully complete. From the perspective of a given stage as viewed across all processing pipelines (at least for the first couple of stages), very similar chunks of logic perform the same function for each pipeline or for each operation source operand of each pipeline.

FIGS. 4A to 4D show pipeline timing for four types of operations. For these types, an operation is loaded into scheduler 280 after instruction decode stage 420. A BrOp is completed in branch evaluation stage 490 which occurs-when the BrOp reaches row 4 of scheduler 280. RegOps, StOps, and LdOps go through a three or four stage pipeline, and correspondingly transitions between four or five states. Field State[3:0] within a scheduler entry tracks or represents the stage of the operation associated with the entry.

Op issue stage 430 and operand forward stage.440 of FIGS. 4A and 4C are common to all RegOps, LdOps, and StOps and are described below.

Following operand forward stage 430 are the execution stages. RegOps have just one execution stage 450 because register units 253 and 254 execute all RegOps in a single cycle. Further, once a RegOp enters execution stage 450, it always successfully completes and exits stage 450 at the end of that clock cycle. LdOps and StOps have two execution stages 450 and 460, during which address calculation 453, segment and page translation (and protection checking) and data cache mapping 455, and results transfer 462 take place. Unlike RegOps, LdOps and StOps can be held for arbitrary periods in either stage 450 or 460. Most hold-ups of LdOps (most notably data cache and data translation lookaside buffer (DTLB) misses and faults) apply to the last stage 460. Hold ups in stage 450 stem from misaligned memory references and from stage 460 being occupied and blocked by an operation not advancing to completion.

Scheduler 280 controls pipelines created by the execution engines such as load unit 251, store unit 252, register units 253 and 254, floating point unit 255, and multimedia unit 256. The exemplary embodiment of the invention includes register units 253 and 254, load unit 251, and store unit 252. Application of aspects of the invention to processors having more or fewer execution units will be apparent in view of this disclosure. For example, in an embodiment containing multimedia unit 256, multimedia unit 256 can be logically considered as part of the first register unit 253 so that operations for multimedia unit 256 are issued, operands are forwarded, and results are transferred using circuitry used for register unit 253.

In one embodiment, floating point unit (FPU) 255 has its own independent register file and commit unit; and scheduler 280 contains a scan chain selecting FpOps for issue to FPU 255. Scheduler 280 issues an FpOp and forwards operands to FPU 255. Execution of the FpOp affects only registers in the register file associated with FPU 255 so that scheduler 280 does not require results from FPU 255. FPU 255 can signal that a FpOp is complete immediately, long before FPU 255 actually completes or commits the FpOp. OCU 260 commits and retires the FpOp from scheduler 280 without changing anything.

Each of register units 253 and 254 provides a pipeline referred to as an RU pipeline or as RUX or RUY pipeline to distinguish register unit 253 from register unit 254. Each RU pipeline has three stages referred to as issue stage 430, operand forward stage 440, and execution stage 450. Load unit 251 and store unit 252 respectively provide LU and SU pipelines which have four stages: issue stage 430, operand forward stage 440, and execution stages 450 and 460. As described above, the State field represents five states of an operation using "shifting/increasing field of ones" encoding to indicate the current pipeline stage of the associated operation or indicate that the operation has completed its pipeline.

Scheduler 280 has primary control of issue stages 430 and operand forward stages 440. Processing within issue and operand forward stages 430 and 440 is broken down into two phases per stage, the phases nominally occurring during the first and second halves of the system clock cycle. Issue stage 430 includes an issue selection phase 431 and a broadcast phase 432. Operand forward stage 440 includes an operand selection phase 441 and an operand transfer phase 442.

During issue selection phase 431, scheduler 280 selects the next operations to enter each of the pipelines. In the exemplary embodiment, for example, four operation selections occur at once for the LU, SU, RUX, and RUY pipelines. During broadcast phase 432, information about the operands of each selected operation is broadcast to all scheduler entries and to external logic.

During operand selection phase 441, scheduler 280 uses the information from broadcast phase 432 to locate operands (up to 2*"the number of execution units" operands). The source of an operand may be register file 290, scheduling reservoir 540, or a result bus 561, 562, 563, or 564 of an execution unit 251, 252, 253, or 254. Scheduling reservoir 540 contains fields for immediate values, results which have not been committed, and information concerning operations preceding in program order but not completed. The result bus of an execution unit is the source of an operand if the execution unit is completing an operation which affects the required operand. Scheduler 280 also determines the status of each operand value, i.e. whether a valid value is in fact available from the designated source. Based on this information, scheduler 280 determines in operand forward stage 440 which of the operations advance into execution stage 450. Advancement is independent for each pipeline. Only explicit operand dependencies constrain the order with which operations are executed. Except for such dependencies, different types of operations are processed through their respective pipelines in arbitrary order with respect to other types of operations.

During operand transfer phase 442, scheduler 280 transfers operand values from the designated sources over operand busses 554 to execution units 251 to 254. As shown in FIG. 5, the exemplary embodiment has nine operand busses 554, eight of which provide operand values for operations in operand forward stage. Embodiments having more execution units, such as embodiments having a floating point unit 255, may have more operand busses. Operand transfer occurs regardless of whether operand values are valid. If an operand value is invalid, the associated operation does not advance to execution stage 450 so that the execution unit doesn't use the invalid operand.

During operand transfer phase 442 of LdOps and StOps, displacement forwarding 443 transfers displacement operands via displacement busses 555, to load unit 251 and store unit 252 (one to each unit). The displacement operands are 32-bit values from scheduler entries. Selection of source entries for displacements occurs during operand selection phase 441.

When a LdOp or a StOp enters execution stage 450, load and store units 251 and 252 latch associated displacement and operand values and holds them as long as the operation remains in stage 450. Scheduler 280 has limited control of the pipeline execution stages 450 and 460. In stages 450 and 460, scheduler 280 keeps track of operations' states and captures resultant register and status values. Address calculation 453 in execution stage 450 determines an address accessed by the LdStOp. If the address and data size for a LdStOp causes a data access which extends across a boundary between entries in the data cache the LdStOp is referred to herein as being misaligned. Misaligned LdStOp are split into two data accesses; a first access advances to execution stage 460 while the second access is held up in execution stage 450. The state field of the scheduler entry associated with the misaligned LdStOp indicates the execution stage of the second access.

In addition to the four phase process for obtaining the source operands for starting execution, scheduler 280 performs a similar four phase process for obtaining the data operand for a StOp; but the data operand is obtained for the StOp in SU stage 460.-The.e process for providing the store data is synchronized with stages 450 and 460 of the StOp and includes an operation selection phase 456 identifying the Stop in execution stage 450, a broadcast phase 457 transmitting information describing the source of a data operand, a data operand selection phase 461, and data operand transfer phase 462. In essence, a store data operand is fetched in parallel with StOp execution; and the actual data value is obtained and transferred to store queue 270 upon completion of the StOp. Completion and exiting stage 460 corresponds to the creation of a store queue entry for the Stop, based on the data selected in phase 461 and the physical address from address calculation 453 and DTLB mapping 455. If a valid data operand or physical address is not yet available, the StOp is held in stage 460.

Besides the chunks of scheduler logic 530 and 532 associated with operation issue and operand forwarding, entries include chunks of logic 534 associated with ordering load and store operations. Just as some execution ordering must be maintained between operations due to register dependencies, a limited execution ordering is also maintained between LdOps and Stops due to memory dependencies (e.g. LdOps cannot freely execute ahead of older StOps). Above incorporated U.S. patent application Ser. No. 08/649,984, describes a suitable system for ordering load and store operations. Load-store ordering applies to StOps which access memory and to StOps such as CIA (check instruction address) and CDA (check data address) operations which reference memory and/or generate faultable addresses but not to LEA (load effective address) operations. No LdOps are excluded from load-store ordering since all Ldops reference memory.

The load-store ordering is enforced at stage 460 of the two execution pipelines where a LdOp or a StOp in stage 460 is held until completing the operation is safe. Up until stage 460, no ordering is maintained between the LU and SU pipelines. Further, LdStOps can generally complete out-of-order when memory independence is "proved" by partial address comparisons with older LdStOps. Store queue 270 performs address comparisons associated with dependency checking but requires scheduler support in determining the relative ages of LdOps and StOps in the LU and SU execution pipes. Only the appropriate address comparisons (a LdOp to older StOps and a StOp to older LdOps) are considered in determining whether a given LdOp or StOp is allowed to complete.

Load-store ordering logic 534 includes logic associated with the LU pipeline and logic associated with the SU pipeline. The logic associated with the LU pipeline determines the age of any LdOp in LU stage 460 relative to any StOps in SU stages 450 or 460, and any other StOps. Logic 534 generates three signals SC_SU2OLDER, SC_SU1OLDER, and SC_SU0OLDER on a bus 556 to indicate whether a StOP in SU stage 460, stage 450, or elsewhere is older than the LdOp in LU stage 460. The logic associated with the SU pipeline determines the age of any StOp in SU stage 460 relative to any LdOps in LU stage 460 and any other LdOps and generates two signals SC_LU2OLDER and SC_LU1OLDER to indicate whether any LdOps are older than the StOp in stage 460. Further description of load/store ordering logic 534 is provided below and in above-incorporated U.S. patent application Ser. No. 08/649,984.

Scheduler 280 further includes status flag handling logic 538 associated with acquiring and using status flag or condition code (cc) values. Three relatively independent areas of functionality are involved: fetching status flag values for status-dependent RegOps executed by register unit 253, fetching status flag values for resolution of BRCONDs by branch evaluation unit 257, and synchronizing non-abortable RegOps with preceding BRCONDS.

The RUX execution unit executes status-dependent ("cc-dep") RegOps and requires a status operand value at the same time as the register operand values, i.e. by the end of operand forward stage 440. CC-dep RegOps are not allowed to advance to execution stage 450 until reaching row 3 and are kept in row 3 until they receive valid condition codes. Unlike the fetching of register values, the status fetch process is not pipelined and occurs in one cycle, i.e. entirely during RUX operand forward stage 440. Further, the same logic 538 fetches up-to-date status flag values for both cc-dep RegOps and BRCONDs. For cc-dep RegOps, condition codes are passed to execution unit 253 while validity of the status values needed by the RegOp is checked. If valid values for all required status flags are not yet available, the RegOp is held up in operand forward stage 440 (the same as for register operand values not yet available).

BRCONDs do not require any actual execution processing. Instead, while a BRCOND is outstanding (and before it reaches the bottom of scheduler 280), the BRCOND is resolved as correctly predicted or not. BRCONDs are resolved in order, at a rate of up to one BRCOND per cycle. When a BRCOND reaches row 4, status flag handling logic 538 checks to determine whether valid status flags for evaluation of the BRCOND are available either from register file 290 or an operation older than the BRCOND. Flag handling logic 538 also determines whether the older operations, if any, that provide the status flags required for evaluation of the BRCOND are completed. If values for the required status flags are not yet available, resolution of the BRCOND is held up by inhibiting shifting of the Op quad containing the BRCOND. When the status flag values required for the next unresolved BRCOND are available, status flag handling logic 538 passes the status flag values to branch evaluation unit 257 which determines whether the condition code specified within the BRCOND was correctly predicted. If the BRCOND was incorrectly predicted, restart signals are asserted to start the instruction fetch and decode portions of instruction decoder 240 (FIG. 2) at the correct branch address. If the operation was correctly predicted, nothing happens.

The resolution of BRCONDs is significant to the execution of non-abortable RegOps. Execution of non- abortable RegOp results in changes that cannot be aborted or undone. Accordingly, non-abortable RegOps are prevented from entering execution stage 450 until execution of the RegOp is safe. This requires all preceding BRCONDs be resolved and determined to have been correctly predicted before the non-abortable RegOp can advance to execution stage 450. Consequently, while any preceding BRCOND remains unresolved or has been found to have been mispredicted, the non-abortable RegOp is held in operand forward stage 440. If preceding BRCONDs were correctly predicted, the delay is temporary; but if a preceding BRCOND was incorrectly predicted, the RegOp is held up until an eventual abort cycle flushes scheduler 280.

Vector decoder 244 generates non-abortable RegOps from emcode ROM 246. In emcode ROM 246, no operations which have an implied dependence on the results of a non-abortable RegOp are allowed in the Op quad immediately preceding the Op quad containing the non-abortable RegOp. Accordingly, when the non-abortable RegOp is executed in row 4, no operation in row 5 has implied dependence on the non-abortable RegOp, and all older operations which may have had an implied dependence on the non-abortable RegOp are retired and therefore completed before the non-abortable RegOp is executed in row 4.

III.A Issue Stage

Scheduler 280 performs issue selection and broadcast phases 431 and 432 in parallel for each execution pipeline requiring an issue scan and operands. In the exemplary embodiment, issue stage operations are performed in parallel for load unit 251, store unit 252, register unit 253, and register unit 254.

III.A.1 Issue Selection Phase

Each cycle, scheduler 280 attempts to select an operation for issue to each unit capable of parallel execution. In the exemplary embodiment, scheduler 280 selects a LdOp, a StOp, and two RegOps to be issued to LU, SU, RUX, and RUY pipelines. For issue selection phase 431, scheduler 280 scans all entries in scheduling reservoir 540 "in order" from oldest to newest operations and selects operations for issue based on fields State and Type of the entries. Issue selection 431 does not consider register status or memory dependencies that operations may have on each other. This simplifies the issue selection process and allows issue selection phase 431 to be quickly completed for a relatively large reservoir 540.

Issue selection is simultaneous and independent for each of the four processing pipelines. For each pipeline LU, SU, and RUX, the next unissued operation (as indicated by its State field) which the pipeline can execute (as indicated by field Type) is selected. In other words, the next unissued LdOp is selected for load unit 251, the next unissued StOp is selected for store unit 252, and the next unissued RegOp is selected for register unit 253. For register unit 254, a RegOp following the RegOp selected for pipeline RUX is selected. Conceptually, the issue selection for pipeline RUY depends on issue selection for RUX; but physically, issue selection for RUY is performed in parallel with issue selection for RUX.

For the scans, each scheduler entry generates four bits (i.e. one bit for each pipeline) IssuableToxx which indicate whether the associated operation is currently eligible for issue selection to pipeline xx where xx is LU, SU, RUX, or RUY. The issue selection process for pipeline xx scans from the oldest scheduler entry to the newest scheduler entry searching for entries with bit IssuableToxx set. For pipelines LU, SU, and RUX, the first operation found with the desired bit IssuableToLU, IssuableToSU, or IssuableToRU set is the one selected for issue to pipeline LU, SU, or RUX. Issue selection for pipeline RUY selects the first operation with IssuableToRUY set following the operation selected for pipeline RUX.

Operations are eligible for issue selection immediately upon being loaded into scheduler 280, i.e. an operation can be issued during its first cycle in scheduler 280. In such cases, only the Type bits and bit So need to be valid at the beginning of the cycle. All other fields in an entry can be generated as late as the end of issue selection phase 431 (i.e. up to one half cycle later) and only need to be valid within a scheduler entry for broadcast phase 432.

If an operation selected for issue does not advance into operand forward stage 440, the operation remains unissued, and during the next clock cycle, that operation competes for issue and will probably be selected again.

III.A.1.a Issue Selection Scan Chains

In one embodiment of the invention, scheduler 280 scans the operations using scan chain circuits formed from logic blocks associated with the entries. Each scan chain is similar to a carry chain such as used in some adders. In an issue selection scan chain for the load unit, the store unit, or register unit X, a "scan" bit Cin input to the oldest entry logically propagates through the scan chain until a logic block in one of the entries kills the scan bit. An entry kills the scan bit if the entry is associated with an operation of the desired type (i.e. IssuableToxx is asserted). To scan for an operation to be issued to register unit 254, a scan bit is logically generated by an entry associated with the operation to be issued to register unit 253, and that scan bit propagates until killed by an entry associated with an operation issuable to register unit 254. The entry which kills the scan bit asserts a signal IssueOpToxx to identify itself as the entry associated with the operation to be issued to execution unit xx. The selected entry can thus take appropriate action as required for broadcast phase 431. If a scan bit for execution unit xx propagates through all of the entries without being killed, no entry in scheduler 280 is associated with an operation that is issuable to unit xx, and no operation is selected for issue.

While a scan chain where a scan bit signal propagates serially through every single entry in scheduler 280 is relatively simple, a faster implementation may be necessary. Look-ahead techniques analogous to those used in traditional Generate-Propagate-Kill carry chains can be applied. One look-ahead technique combines entries into groups, and each group generates, propagates, or kills a scan bit. Look ahead is faster because group generate, propagate, and kill terms are determined in parallel from single-entry terms and whether a scan passes through a group can be determined without a signal propagating through every entry in the group. By successive combination of group terms, no scan bit signal propagation actually occurs because the entire scheduler reservoir forms a single group.

For the LU, SU, and RUX scan chains, the single-entry kill terms K are signals IssuableToXX. The generate terms G are all zero, and the propagate terms P are the complement of the associated K terms. Table B.28 indicates the single-entry terms for LU, SU, and RUX scan chains. Table B.29 in Section B describes group terms Pgrp and Kgrp used in issue selection scan chains for pipelines LU, SU, and RUX.

Figure 8A:
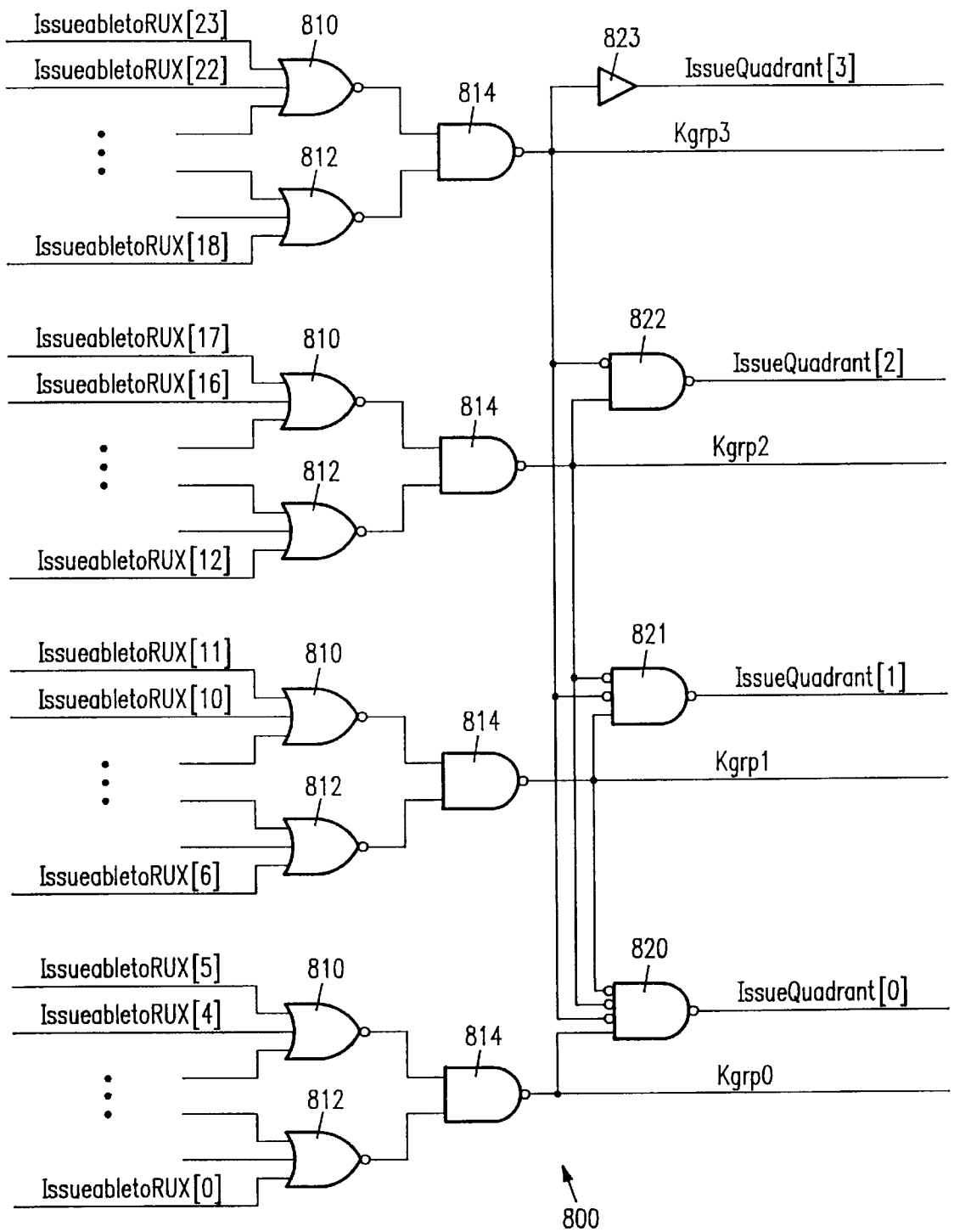
FIGS. 8A and 8B illustrate portions of a scan chain using look-ahead for rapid selection.
Figure 8B:
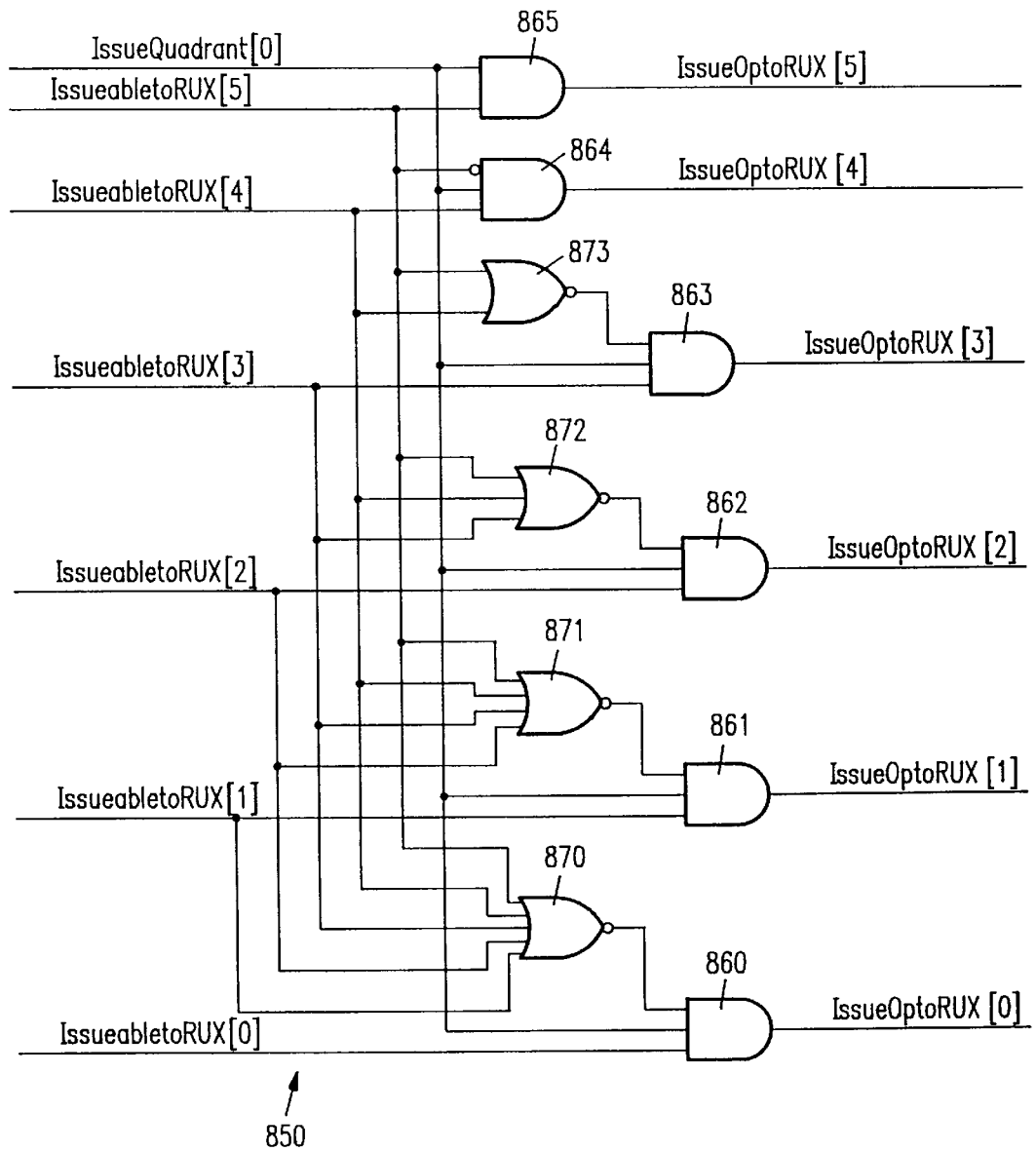

FIGS. 8A and 8B show logic 800 which implements a portion of an RUX scan chain using look-ahead groups of six entries. Groups of more or fewer entries can be eused, but six entries per group partitions 24 entries into four quadrants and reduces the number of wires used in processing the group terms. As shown FIG. 8A, each quadrant has associated NOR gates 810 and 812 and a NAND gate 814 which together act as a six-input OR gate and generate a group kill signal Kgrp3, Kgrp2, Kgrp1, or Kgrp0 for quadrant 3, 2, 1, or 0. The inputs for NOR gates 810 and 812 are signals IssuableToRUX which are the single-entry kill terms for pipeline RUX. Scan chains for the pipelines LU and SU are identical, except that respective signals IssuableToLU and IssuableToSU are input in place of IssuableToRUX.

Issue selection scans are from the oldest to newest entries according to the physical order of entries in scheduler 280.

Quadrant 3 contains the oldest entries. If signal Kgrp3 is asserted, one of the operations in quadrant 3 would kill a scan bit and an operation from quadrant 3 should be issued. A buffer 823 asserts a delayed signal IssueQuadrant[3] to select quadrant 3. If signal Kgrp3 is not asserted, a scan bit can propagate through group 3, but an operation in quadrant 2, 1, or 0 may be selected. NAND gate 822 asserts signal IssueQuadrant[2] if signal Kgrp2 is asserted and signal Kgrp3 is not. Similarly, NAND gates 821 and 820 assert signals IssueQuadrant[1] and IssueQuadrant[0] respectively if the scan bit could propagate to quadrant 1 or 0 and the group kill signal Kgrp1 or Kgrp0 is asserted (i.e., if the group would kill the scan bit). If none of the group kill signals Kgrp[3:0] are asserted, no operation is selected for issue.

FIG. 8B shows logic 850 which selects an operation from quadrant 0 if signal IssueQuadrant[0] is asserted. Four circuits similar to logic 850, one for each quadrant, operate in parallel. Since entry 5 is the oldest entry in quadrant 0, entry 5 is selected if it issuable to pipeline RUX and quadrant 0 is selected for issue. AND gate 865 asserts signal IssueOpToRUX[5] to indicate entry 5 contains the selected operation, if IssueQuadrant[0] is asserted and IssuableToRUX[51 is asserted. AND gates 860 to 864 correspond to entries 0 to 4 and assert a respective bit in signal IssueOpToRUX[0:4] to identify the selected operation when that operation is issuable to RUX and no older operation in quadrant 0 is issuable to RUX. NOR gates 870 to 873 assert signals to respective NAND gates 860 to 863 to indicate none of the older entries are issuable to RUX.

As an alternative to circuits 800 and 850, any logic which implements the equations of Table B.29 in Section B can be employed.

Logic 800 of FIG. 8A generates signal IssueQuadrant[3:0] after three gate delays from input of signal IssuableToRUX [23:0] even if the selected entry is in quadrant 0, the last quadrant searched. Logic 850 of FIG. 8B generates signal IssueOpToRUX after about two more gate delays. Without using look-ahead techniques, a scan bit must propagate through the entire scheduler when no operation is selected. This is about 24 or more gates delays for the exemplary embodiment. Accordingly, look-ahead scan chains are typically much faster than serial scan chains when a scan bit propagates through every entry.

III.A.1.b Issue Selection Scan Chain for RUY

The RUY scan chain is more complex and uses four terms G, P, K, and O. The terms G, P, and K are analogous to the conventional generate, propagate, and kill terms. The O term ensures that only one operation is selected. Single-entry generate term G for entry i is signal IssuableToRUX[i], and the term O is equal to the term G. Single-entry kill term K for entry i is signal IssuableToRUY[i], and the P terms are the complements of the associated K terms.

Look-ahead techniques can also be employed in issue selection for pipeline RUY. Conceptually, for the RUY scan chain, a scan bit is generated by the entry containing an operation selected for issue to RUX and is killed by the next newer operation that is issuable to pipeline RUY. A group generates an output scan bit if an entry in the group generates the scan bit and no following entry in the group kills the scan. A group propagates a scan bit if each entry in the group propagates the scan bit. An O term once generated prevents newer entries from generating a new scan bit, and a group O term is generated if any entry in the group generates a single-entry O term. Equations in Table B.30 of Section B summarize the logic which generates group terms from single-entry terms in an RUY scan chain.

Figure 9A:
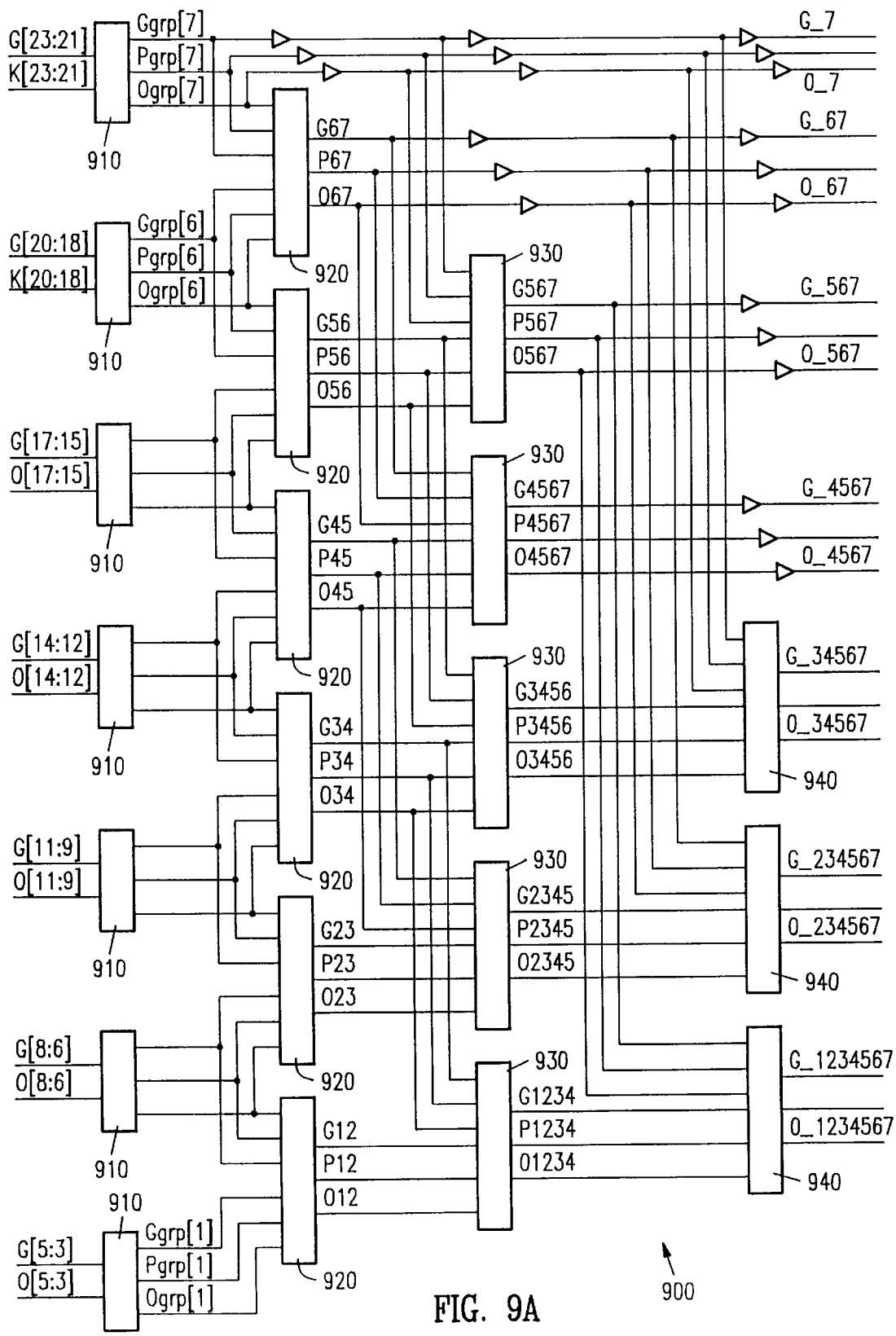
FIGS. 9A, 9B, and 9C illustrate portions of a scan chain using look-ahead for rapid selection of an operation for a second execution unit.
Figure 9B:
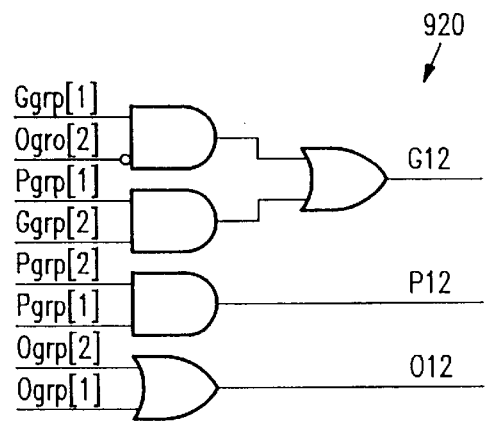
Figure 9C:
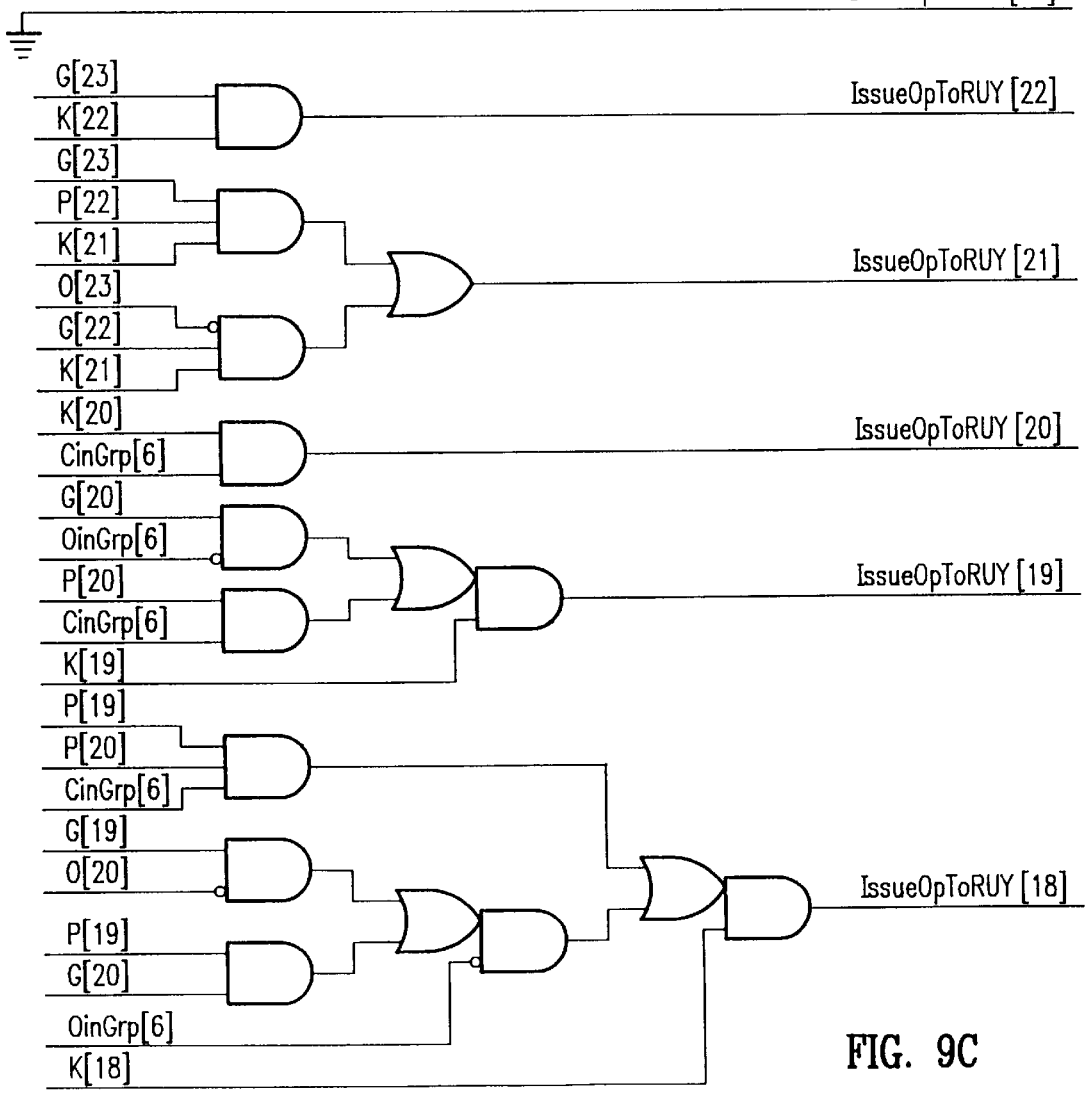

FIGS. 9A, 9B, and 9C illustrate an issue selection scan chain for pipeline RUY which initially partitions scheduler 280 into eight 3-entry groups. In FIG. 9A, logic blocks 910 implementing the logic shown in Table B.30 and generate group terms Ggrp[7:1], Pgrp[7:1], and Ogrp[7:1] from single-entry signals G[23:3] and O[23:3]. Group terms for the newest group, entries 0 to 2, are not required for reasons described below. The group terms are combined in three stages to form terms for larger groups. Circuitry 900 generates group terms such as generate terms G_7, G_67, G_567, G_4567, G_34567, G_234567, and G_1234567 for groups which contain the oldest three, six, nine, twelve, fifteen, eighteen, and twenty one entries. The first stage of circuity 900, containing logic blocks 920, combines group terms from adjacent groups of three entries to generate group terms for groups of six entries. The second stage, containing logic blocks 930, combines group terms from adjacent groups of either six or three entries to generate group terms for a group of nine or twelve entries. The third stage, containing logic blocks 940, combines group terms from adjacent groups of twelve, nine, six, or three entries to generate group terms for groups of twenty one, eighteen, and fifteen entries.

Logic blocks 920, 930, and 940 combine group terms GX, PX, and OX for a group X with group terms GY, PY, and OY for the next newer group Y to generate terms GXY, PXY, and OXY for a group XY that is the concatenation of groups X and Y. In one embodiment of the invention, each of blocks 920, 930, and 940 implements following equations.

$$GXY = GX \cdot PY + \sim OX \cdot GY$$

$$PXY = PX \cdot PY$$

$$OXY = OX + OY$$

The circuit shown in FIG. 9B shows an exemplary implementation of blocks 920, 930, and 940. In FIG. 9B, input signals are for groups 1 and 2 and output signals are for the union of group 1 and 2; but any desired consecutive groups can replace groups 1 and 2. Alternatively, other equivalent logic may be employed or alternate stages, blocks 920 and 930 or blocks 930 and 940, can be implemented with inverting logic. Additionally, as described below, propagate terms from the last stage, blocks 940, are not required, and block 940 can be simplified by not implementing the propagate equations (i.e. eliminating AND gate 922).

The desired output signals from circuit 900 are G terms and O terms. Output signals G_7, G_67, G_567, G_4567, G_34567, G_234567, and G_1234567 indicate whether a prior generated scan bit reaches group 6, 5, 4, 3, 2, 1, and 0 respectively and are also referred to herein as signals CinGrp [6:0]. Signals O_7, 0_67, O_567, O_4567, O_34567, O_234567, and O_1234567 indicate whether a scan bit was generated prior to group 6, 5, 4, 3, 2, 1, and 0, respectively, regardless of whether the scan bit is killed before reaching the respective group. Signals O_7, O_67, O_567, O_4567, O_34567, O_234567, and O_1234567 are also referred to herein as signals OinGrp[6:0].

A multi-bit signal IssueOpToRUY[23:0] can be generated from group signals CinGrp[6:0] and OinGrp[6:0] and single-entry signals P, K, G, and O. FIG. 9C shows logic which select entries for issue to the RUY execution unit. Logic which generates signals IssueOpToRUY[23:21] entries 23 to 21, differs from logic for the other groups because there is no group propagation into group 7, the oldest group. Logic shown generating IssueOpToRUY[20:18] for group 6 is repeated for each group 5 to O. As in Table B.30 of Section B, group propagate terms from the final group 0 are not required for selection of an operation for issue.

III.A.2 Operand Information Broadcast Phase

During the broadcast phase of the issue stage of the processing pipelines, information about operands for operations to be issued to the execution units is broadcast to all scheduler entries and to external logic. This information describes two source operands for each operation selected for issue. The entry for the selected operations also transmits information about the selected operations to external logic and the associated execution unit.

Operand information busses 552 (FIG. 5) run through scheduler 280. The number of operand information busses 552 matches the maximum number of operands which may be required by the execution units. An entry associated with a selected operation drives two operand information busses 552 which are associated with the execution unit to which the associated operation will issue. Each operand information bus 552 is eight bits wide and carries a 5-bit register number Src1Reg[4:0] or Src2Reg[4:0] and a 3-bit byte mark Src1BM[2:0] or Src2BM[2:0] for a source operand. Table B.31 describes the entry logic that drives operand information busses 552.

Comparison logic within each entry compares broadcast operand information to similar information concerning a destination register for the operation in the entry making the comparison. The comparison logic checks for matching register numbers and for overlapping byte marks (i.e. some or all of the bytes required for an operand are or will be modified by the operation). The results of multiple ("# of operand information busses" * "# of entries") comparisons are signals that control actions occurring during the next processing phase, operand selection phase 441. Table B.32 describes logic which performs the comparisons. The following equation summarizes a generic comparison:

OprndMatch__XXsrcY=(busReg[4:0]==DestReg[4:0]) && (busBM[1]DestBM[1]+busBM[0]DestBM[0])

where "XXsrcY" is one of LUsrc1, LUsrc2, SUsrc1, SUsrc2, RUXsrc1, RUXsrc2, RUYsrc1, and RUYsrc2 and "bus" refers to signal OprndInfo__XXsrcY which is on one of operand information busses 552.

"Match" signals OprndMatch__XXsrcY that result from the comparisons are the product of the broadcast phase and are used in the operand selection. This is done concurrently within each and every entry, i.e. within each entry, eight match signals are piped to the entry's operand selection logic 532. All the match signals remain local to each entry and are latched into registers for use in the following pipeline stage. In essence, within each entry, eight operand information bus comparators feed eight "control" signals to eight chunks of operand selection logic 532. The match signals within each entry within the bottom row are gated or masked by additional signals associated with the committing of these operations' register results to the architectural register file 290. See the description of operation commit unit 260 below. Each entry does not actually control loading of match bits into operand match registers within the entry. Global logic 520 generates signal LUAdv0, SUAdv0, RUXAdv0, and RUYAdv0 which indicate whether an issued operation will advance into operand forward stage 440, and match signals are only latched and used if an operation will actually advance into operand forward stage 440.

Four operation information busses 551 corresponding to load unit 251, store unit 252, register unit 253, and register unit 254 provide additional information describing an operation issued. The additional information, namely the OpInfo field, is read out of scheduler 280 during the broadcast phase and latched into external pipeline registers if the operation will actually advance to operand forward stage. Table B.33 describes logic which generates the operation information signals.

The Src1/2Reg and Src1/2BM fields provided during broadcast phase are used for a number of purposes during the next two phases (i.e. during operand forward stage). The OpInfo fields are simply passed "down the pipe" to the corresponding execution units (via a second set of pipeline registers controlled by corresponding signal XXAdv1). For RUX and RUY operations, the associated byte marks Src1/2BM are also passed "down the pipe" to the corresponding register unit.

III.B. Operand Forward Stage

The operand forward stage consists of an operand selection phase and an operand transfer phase.

III.B.1 Operand Selection Phase

Each cycle, in the operand forward stage, scheduler 280 uses match bits, which were generated by issue stage logic 530 and stored in operand match registers, to select entries which supply values for operands being "fetched". Scheduler 280 also determines for each operand whether the operand's value comes from a scheduler entry or register file 290. Register file 290 is the default if there was no matching entry. During the operand transfer phase, the selected entries and/or register file 290 drive operand values onto operand busses 554 and thus transfer operand values to the associated execution units.

As with the issue selection process in the issue stages, operand selections are independent and simultaneous. Thus, operand selection logic 532 contains eight scan chains for selecting entries to provide operands. Each entry has an operand match register bit for each operand bus and associated scan chain. Each scan chain searches for the newest entry with a match that is older than the entry containing the operation whose operand is being fetched. Logically, the scan starts (a scan bit is generated) from the entry containing the operation whose operand is being fetched and proceeds in the direction of older entries to the first entry with an operand match bit set. If an entry having a set match bit is found, that entry supplies the required operand by driving of the associated operand bus 554 during the next phase. If no "matching" entry is found, a scan bit output from the scan chain causes register file 290 to supply the operand value.

If an operation whose operands are being fetched does not advance out of operand forward stage, then the operand selection process is performed again in the next cycle. An operation will not advance if, for example, an entry with match bit set does not modify (and therefore cannot supply) all bytes required for the operand. Since field State and the physical location of operations within scheduling reservoir 540 can change each cycle, the outcome of the new selection may be different from the current cycle's outcome. In essence, during each cycle, the selection process determines what needs to be done to forward appropriate operand values during that cycle.

The scan to find the appropriate source for an operand value can be performed in the same manner as the issue selection scans described above. However, the scan is in the direction of older operations which is opposite from the direction of the issue selection scans. Further, for operand selection, the scan chains are not "propagate-kill" chains. Operand selection scan chain are analogous to a traditional carry or "generate-propagate-kill" chain. The initial scan bit Cin into the scan chain is zero, and the entry corresponding to the operation whose operand is being fetched generates the scan bit. A scan kill occurs at the first following entry with operand match bit set, and scan propagates occur at intervening entries.

Global control logic 520 uses the final output scan bit Cout from the last/oldest entry to determine whether any entry was selected and thus whether register file 290 should instead be selected to provide the operand. If Cout is asserted, global control logic 520 selects register file 290. The selected source drives the corresponding operand bus during operand transfer phase which is the latter part of the operand forward stage. During the operand selection phase, the source register in register file 290 which nominally holds the desired operand value is read in case register file 290 is selected to drive the operand bus.

As with the issue selection scan chains, a look-ahead implementation improves speed. Table B.34 of Section B provides an example of an operand selection scan chain in terms of look-ahead equations similar to the traditional Generate-Propagate-Kill equations.

III.B.2 Operand Transfer Phase

During operand transfer phase 442 of operand forward stage 440, values for each of the eight source operands are fetched and transmitted over operand busses 554 to input registers of the associated execution units. Operand values are 32-bit quantities, but some bytes may be undefined. During correct operation, an execution unit does not use undefined operand bytes. Any entry or register file 290 can drive each operand bus 554, and each entry of scheduling reservoir 540 can drive any and/or all of the busses.

In the exemplary embodiment, 192 operand selection signals and 8 scan chain signals Cout are generated during the operand selection phase. Based on these signals, logic in each selected entry enables the appropriate bus drivers in the entry. If none of the entries is selected for an operand, register file 290 enables drivers for that operand. Table B.35 in Section B describes logic for enabling driver for operand busses 554.

Operand registers in execution units 251 to 254 capture the operand values from operand busses 554 for use in subsequent pipeline stages. Global control logic 520 generates control signals, one per processing pipeline, to control the loading of the operand registers. New operand values are loaded into an execution unit if an operation in operand forward stage can advance into execution stage 450. Global signal LUAdv1 controls the LU stage 1 source operand registers. Similarly, signals SUAdv1, RUXAdv1, and RUYAdv1 respectively control the SU, RUX, and RUY loading of the operand registers.

During operand transfer phase 442 of operand forward stage 440 of the four processing pipelines, information about each of the operations selected to provide an operand value is also read out of scheduler 280. Each operand bus 554 has an associated operand status bus 553 that carries an operand status signal OprndStat describing the "origin" of the operand being fetched. The operand status signal from an entry is a concatenation of fields State, DestBM, Type, and Exec1 of the entry providing the operand value. External logic uses this information during the operand transfer phase to determine the source and availability of a valid operand value.

Register file 290 also has a set of drivers for operand status busses 553 to ensure that operand status busses 553 carry defined values and that the values result in appropriate behavior by logic using the information. Table B.36 of Section B describes the operand status signal and its generation.

Each source operand delivered to an execution unit comes from one of three possible sources: a scheduler entry, register file 290, or a result bus of this or another execution unit. Operand transfer phase 442 covers delivery from an entry. Register file 290 is accessed during the Operand Selection phase in parallel with scheduler activity. In particular, the register number for the desired operand is broadcast from the operations entry during the broadcast phase and passed to the appropriate read port of register file 290. For each operand to be provided, scheduler 280 determines whether a scheduler entry or register file 290 drives the operand bus 554 which corresponds to the operand; and the resultant operand is transferred to the execution unit, during the operand transfer phase, via the operand bus 554.

Figure 10:
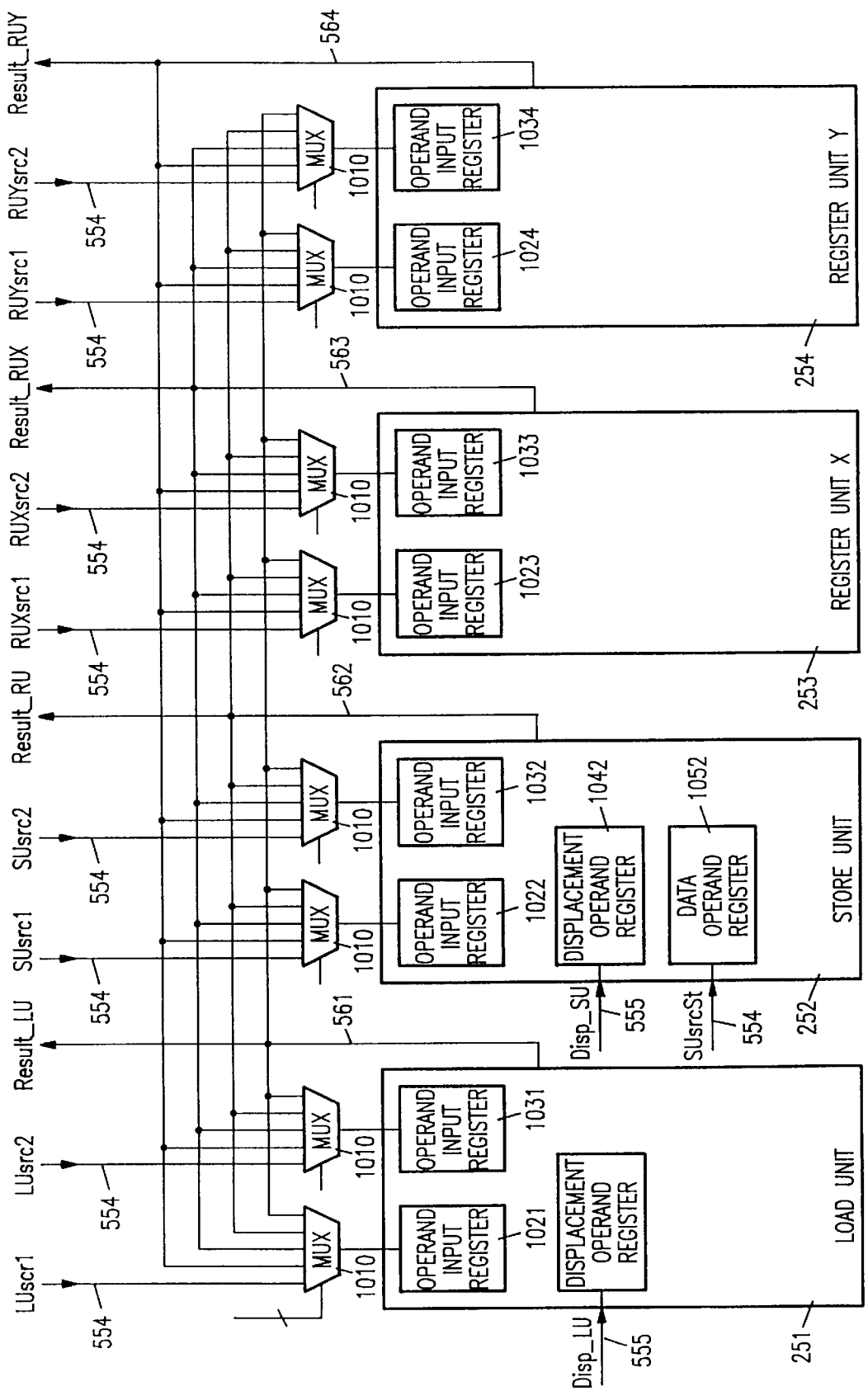
FIG. 10 is a block diagram of the interface between execution units and the scheduler of FIG. 5.

As shown in FIG. 10, operand busses 554 couple to operand input registers 1021 to 1024 and 1031 to 1034 in execution units 251 to 254 through multiplexers 1010. Result busses 561 to 564 from execution units 251 to 254 are also connected to multiplexers 1010. Thus, five "operand" busses run to each operand input of each execution unit, namely one of operand bus 554 dedicated to input that operand from scheduler 280 or register file 290 plus four result busses from execution units 251 to 254. During the operand transfer phase, scheduler 280 generates select signals for 5:1 multiplexers 1010 at each operand input register. The operand status signal indicates whether the desired operand value is or may be just becoming available from an execution unit; and if so, the appropriate result bus and value Result_XX from an execution unit 251 to 254 is selected. Otherwise, operand bus 554 is selected. The validity of the operand is an independent issue that only affects whether the associated operation in operand forward stage 440 advances into execution stage 450 and thus actually enters an execution unit.

III.B.3 Displacement Forwarding

In addition to register operands, scheduler 280 fetches and forwards displacement operands to the LU and SU processing pipelines during operand transfer phase 442. Load unit 251 and store unit 252 each have three input operand busses (two register operand busses 554 and one displacement bus 555). Displacement operands are 32-bit quantities, but some bytes in a displacement operand may be undefined and therefore not used during correct operation of execution units 251 and 252.

Scheduler 280 handles displacements in a manner similar to operation register result values. Displacements are initially stored within the 32-bit DestVal fields of entries until used and are driven onto displacement busses 555 as required during the operand transfer phase 442. Displacements are always immediate values for RISC86 operations, so that forwarding displacement values from register file 290 does not occur. Field DestVal is also used for result values from LdOps and some StOps, but the two uses of field DestVal do not conflict since a result value is not loaded into a scheduler entry until after the displacement is forwarded out of the entry, i.e. not until after operand forward stage 440.

Small (8-bit) displacements, which are specified within operations, are handled differently from large (16/32-bit) displacements. Operation decoder 510 sign extends a small displacement before loading the small displacements into the DestVal field of the entry holding the associated LdStOp. Large displacements are presumed to be stored in the DestVal field of the entry for a LIMMOp immediately preceding the LdStOp using the displacement. Generally, the preceding entry holds a "LIMM t0,[disp]" operation which can be loaded into scheduler 280 in a completed state so that the LIMMOp is not issued or executed.

The selection of DestVal fields to drive displacement busses 555 during each cycle does not require scanning of scheduler entries. Instead, each entry determines from its State and Type fields whether to enable its drivers or drivers in a preceding entry to assert a DestVal field value onto the appropriate displacement bus 555. Table B.37 in Section B summarizes logic for enabling the displacement bus drivers within each entry.

III.B.4 Immediate Value Forwarding

In the exemplary format of RISC86 operations, immediate values are operands src2 of RegOps. Scheduler 280 handles immediate values and displacements similarly. The RISC86 instruction set uses only small (8-bit) immediate values in RegOps, and operation decoder 510 stores the immediate values in field DestVal of the entry holding the RegOp. Thus, immediate values are like displacements in that they are stored in the DestVal fields of entries, but are like register operands, in that they are forwarded over register operand busses 554 (specifically the RUXsrc2 and RUYsrc2 operand busses). Immediate values for Src2 operands are forwarded to respective register execution units during operand transfer phase 442 of operand forward stage 440 in place of a register value. The selection of a register value source (i.e. a scheduler entry or register file 290) is inhibited, and the entry in question directly drives its DestVal field onto the appropriate operand bus 554. The inhibition of RUX/RUY src2 operand selection is performed during operand selection phase 441 by masking the single-entry generate term that an entry holding the RegOp would normally assert to in operand selection scan chain. This is done separately and independently for RUXsrc2 and RUYsrc2 and prevents selection of any entry by the RUX/Ysrc2 scan chain. Entries containing immediate values also inhibit selection of register file 290 as the default operand source. The single entry terms for RUX and RUY operand selection scan chains described in Table B.34 exhibit the inhibition.

The selection of small "immediate" DestVal values to drive onto the RUXsrc2 and RUYsrc2 operand busses during each cycle does not require scanning of scheduler entries. Instead, each entry enables the drivers of its DestVal field onto the appropriate operand bus 554 simply based on the entry's State field and related bits. The same drivers can be used for register operand value forwarding and immediate value operand forwarding. Table B.38 in Section B describes circuitry for driving immediate values on operand busses 554. When an entry drives an immediate value onto an operand bus 554, the entry also drives the associated operand status bus 553. The same bus drivers and driver input values as for register operands are used for immediate values but with an additional term as shown in Table B.38.

III.C Data Operand Fetching

StOps have three register source operands and no destination register. In contrast other operations have to up to two source operands and one destination. The third source operand for a StOp provides the data to be stored and is sometimes referred to herein as a data operand. The data operand is not needed to start execution of a StOp but is needed for completion of the StOp. Fetching of data operands is performed in a manner similar to fetching of other source operands, but where the "normal" operand fetch process occurs during issue stage 430 and operand forward stage 440, the data operand fetch process occurs during SU execution stages 450 and 460. Scheduler 280 checks data operand availability during SU execution stage 460 and holds the associated StOp in stage 460 if the data operand is not available.

The data operand fetch process is largely the same as issue and operand forward stages described above with two principal differences. First, operation selection phase 456 does not require a scan across scheduler entries to choose between multiple candidates such as occurs during issue selection phase 431. Instead, the entry associated with the StOp at SU stage 450 identifies itself from State and Type fields and provides the data operand to store unit 252 when required. The second difference is that the OpInfo field of the StOp does not need to be read out (again) to store unit 252 during broadcast phase 457 for the data operand. Instead, store unit 252 retains and uses the OpInfo value from when the StOp was issued. The OpInfo value read out during the SU issue stage 430 is passed down through operand forward stage and the first and second execution stages of the SU pipeline.

Table B.39 in Section B describes signals generated for data operand selection and forwarding.

III.D Register Operation Bumping

Scheduler 280 generally manages the execution pipelines based on in-order issue selection and processing for each type of operation. "Normally", operations issued to an execution unit progress down the pipeline in the order in which the operations were issued. When an operation is held up in operand forward stage of the SU or LU pipeline, for example, the operation currently being selected for issue to that pipe is also held up because operations do not pass by each other within a processing pipeline. However, when a RegOp is held up in operand forward stage of either register unit 253 or 254 due to one or more unavailable operand values, the RegOp may be bumped out of the processing pipe and back to the unissued state. Bumping sets the RegOp's State field back to b0000. When a RegOp is bumped out of operand forward stage 440, another RegOp selected for issue to that register unit advances to operand forward stage 440, immediately taking the place of the bumped RegOp. Simultaneously, the bumped RegOp is immediately eligible for reissue to a register unit, not necessarily to the same register unit. Bumping is applicable to all RegOps, subject to the following constraints. First, an RUX-only RegOp (in RUX operand forward stage) is not bumped if an RUX-only RegOp is currently being selected for issue to RUX because bumping would violate a restriction that RUX-only RegOps be executed in order with respect to each other. Secondly, a RegOp should only be bumped if the RegOp will be stalled for more than one cycle, otherwise leaving the RegOp in operand forward stage 440 more efficiently utilizes execution unit resources. Table B.12 describes circuitry which changes the State field of entries to implement RegOp bumping. Global control logic 520 generates global bump signals BumpRUX and BumpRUY which force assertion of signals RUXAdv0 and RUYAdv0, respectively so that the appropriate issued RegOps advance to operand forward stage 440. A description below of global control logic 520 further indicates the conditions under which a RegOp is bumped.

III.E Load/Store Ordering

Scheduler 280 supports maintaining the required ordering between LdOps and Stops. In particular, load- store ordering logic 534 supports checking memory dependency of loads and stores by indicating the relative ages of selected LdOps and StOps. If a LdOp or StOp possibly accesses the same address as an older Stop or LdOp which is not yet completed, holding operations in execution stage 460 of the LU and SU execution pipelines maintains proper load-store ordering.

Load and store units 251 and 252 contain address comparators, and ordering logic 534 in scheduler 280 provides on bus 556 information indicating the relative age of the LdStOps so that only the appropriate address comparisons are considered when determining whether to hold a LdOp or StOp in the second execution stage 460. The relative age determination process is similar to the issue selection/operand information broadcast process. During a first phase 463 of execution stage 460 for LdOp and StOp pipelines, ordering logic 534 performs five "propagate-kill" scans across all scheduler entries from oldest to newest. Two scans compare LdOps to the StOp in SU stage 460, and three scans compare Stops to the LdOp in LU stage 460. During a second phase 464, the entry for the LdOp and/or StOp in execution stage 460 samples the results from the associated two or three scan chains and drives on bus 556 global signals SC_SU2OLDER, SC_SU1OLDER SC_SU0OLDER, SC_LU2OLDER, and SC_LU1OLDER which directly indicate the desired relative age information.

A LdOp in execution stage 460 or in stage 450 and performing the second half of a misaligned load requires three scan chains to determine the LdOp's age relative to three categories of Stops. Each scan chain scans for oldest StOp in a category. One scan chain detects a StOp in stage 460 or in stage 450 and performing the second half of a misaligned store. Another scan chain detects a StOp in stage 450, and a third scan chain detects an oldest StOp not yet in stage 450. The state of the scan bit at any point in the scan chain reflects whether an older StOp of a given type has been found yet. Thus, the entry for a LdOp can determine from the input scan bits the LdOp's age relative to any StOp in a given category. If the input scan bit Cin is 1, the scan signal has not been "killed" yet, and no older StOp of the given category exists. Load-store ordering logic 534 determines which, if any, signals from the address comparators are relevant.

A StOp in stage 460 or in stage 450 and performing the second half of a misaligned store requires two scan chains to determine its age relative to two categories of LdOp. One scan chain detects any LdOp in stage 460 or stage 450 and performing the second half of a misaligned load. The second scan chain detects any LdOps not yet in stage 460. Based on the input scan bits Cin to the entry holding the StOp in question, ordering logic 534 determines which signals from the address comparators are relevant.

Each scan chain is a "propagate-kill" chain from oldest scheduler entry to newest. Table B.40 in Section B and U.S. patent application Ser. No. 08/592,209 describe load-store ordering.

III.F Abort Handling

When an abort cycle occurs, scheduler 280 is flushed. All Op quads are invalidated by clearing all Op quad fields OpQV, and fields of the entries are also set to innocuous values. Fields in the entries must be cleared because field OpQV only affects the control of Op Quad loading and shifting and other operations within scheduler 280 ignore field OpQV and assume that the entries are valid. A logically invalid operation within scheduler 280 is changed to a valid but innocuous operation. To do this, the State field of the operation is set to completed so that the operation will not be issued or executed. DestBM and StatMod fields are set to indicate that the operation does not modify any register bytes or status flags. In these circumstances, all other fields can have any values without causing any "harm". Such an operation is effectively a No-op operation.

A new Op quad may be loaded into scheduler 280 as soon as scheduler 280 is flushed. The new Op quad is not associated with any of the outstanding Op quads that need to be flushed; instead, it is logically the first new Op quad "after" the abort. This would occur after an aborted or mispredicted ERCOND. The first new Op quad after abort cycles are delayed due to exception conditions.

In effect, the following sequence of events occurs at the end of the abort cycle. Note that the storage elements within scheduler 280 are fully synchronous with the system clock signal and don't change state in response to inputs until the next cycle boundary. First, changes in fields OpQV, State, DestBM, and StatMod occur as described above. Then all, some, or none of the Op quads shift down one position, and a new Op quad is loaded into the top scheduler entry. For exception-related aborts, the new Op quad is also invalidated and whatever shifting that occurs is generally a don't care since all scheduler Op quads are being flushed. For BRCOND-related aborts, the new Op quad is valid or empty.

The Abort signal comes in two varieties, "early" and "late". The early version is called SC_EAbort, and the late variety is called SC_Abort. The early abort signal is transmitted to sections of scheduler 280 which require immediate notification of an abort. The late variety is the same as the early, but delayed by one cycle with a flip-flop and is more widely transmitted.

IV. Global Control Logic

In addition to logic associated with individual entries, scheduler 280 contains logic which controls scheduler 280 globally.

IV.A Scheduler Information Used by External Logic

External logic such as global control logic 520 and execution units 251 to 254 uses a variety of information provided by scheduler 280 during the broadcast and the operand transfer phases of fetching operand values. For most types of operands, the broadcast and operand transfer phases are during the issue and operand forward stages of the execution pipelines. During the broadcast phase, information about the operation whose operands are being fetched is read out on the appropriate OpInfo bus 551; and the operation's two source register (Src1 and Src2) and byte mark (Src1BM and Src2BM) fields are read out onto the two associated OprndInfo busses 552. For the data operand of StOps, the broadcast phase and operand transfer phase are during SU stages 450 and 460. Information for the data operand for a StOp is driven on an associated OprndInfo bus 552, but there is no associated OpInfo. Store unit 252 retains operation information from when the StOp was issued. Broadcast operand information is used during the next couple of phases. Operation information is simply passed down the pipeline in the execution units. In the case of register units 253 and. 254, the two source byte mark Src1BM and Src2BM bits from the OprndInfo busses 552 are also passed down the pipeline. During the operand transfer phase, information about each of the operations that is the source of an operand value is read out onto OprndStat bus 553 associated with each operand bus 554. The information describing the status of the sourcing operation is directly used (and only used) during this phase. Table B.41 summarizes the information read out of scheduler 280 at various times.

IV.B Global Control Functions

The preceding describes the logic, storage elements, and busses comprising the core of scheduler 280. Scheduler 280 also includes global control logic 520 that coordinates shifting in scheduler 280 and "feeding" of operations and operands to execution units 251 to 254. The following describes pieces of global control logic 520 for the four phases of the operand fetch process.

During the issue selection phase, the only external concern is whether an operation was selected for issue to each processing pipeline. For each issue selection that did not find an eligible operation, no scheduler entry drives the corresponding OpInfo and OprndInfo busses 551 and 552. The values on these busses and the following three phases for this processing pipeline are don't care. The only requirement is that an operation valid bit (OpV) for operand forward stage 440 of an execution pipeline is zero to indicate operand forward stage 440 in this pipeline stage is empty.

Operand forward stage operation valid (OpV) bits indicated whether valid operations are issued to the execution units. The output scan bit Cout of each issue selection scan chain generates an OpV bit for operations in the issue stage. Table B.42 describes the operation valid or OpV bits. Global signals XXAdv0 control loading of OpV bits into pipeline registers to follow progress of the empty operation. During abort cycles, all pipeline registers are unconditionally cleared to flush the execution units.

The broadcast phase requires no significant global control logic other than to control the pipeline registers which latch information (namely the OprndInfo and OpInfo values) read from scheduler 280.

During the operand selection phase, two external activities take place. First, the source register numbers (i.e. the SrcYReg fields of the latched OprndInfo values) read during the preceding phase are used to access register file 290. This is done in parallel with operand selection scans within scheduler 280. Up to nine source operands can be fetched each cycle. Accordingly, register file 290 has nine corresponding read ports, each associated with one of operand busses 554. The register fields presented to these ports are XXsrcY and SUsrcSt, where XX={LU,SU,RUX,RUY} and Y={1,2}.

A second external activity during the operand selection phase is determining, for each operand bus 554 and operand information bus 552, whether scheduler 280 or register file 290 will provide a value during the next phase. Each scheduler entry directly determines for itself whether it should drive the busses or not, so the only concern for global control logic 520 is whether register file 290 should be enabled. Enabling register file 290 is based on output scan bits Cout which indicate whether any entry was selected during the operand selection phase. If the final scan signal Cout of an operand selection scan chain indicates no entry was selected for the associated operand bus 554, global control logic enables register file 290 to drive the associated operand bus 554 and operand information bus 552. Equations describing signals on operand busses 554 are in Tables B.35 and B.36 of Section B.

During the operand transfer phase, global control logic 520 controls: RegOp "bumping", all execution unit input multiplexers 1010 of the execution units, validity determination for each operand value being fetched, and generation of signals HoldXX0 which factor into the generation of the global pipeline register control signals XXAdv0.

One implementation of RegOp bumping is split between logic within each scheduler entry that changes the State field of the entry, and global control logic 520 which generates global bump signals BumpRUX and BumpRUY and forces assertion of signals RUXAdv1 and RUYAdv1. Generation of the BumpRUX/Y signals is based on the OprndStat values that are read out of scheduler 280, during operand transfer phase, for each of the register unit source operands (i.e. OprndStat_RUXsrcY and OprndStat_RUYsrcY where srcY={src1, src2}). In particular, fields State and Type for each operand source are examined to determine whether the sourcing operation is at least two cycles away from providing a valid operand value. If either sourcing operation is at least two cycles away from providing a valid operand value, the dependent RegOp is bumped out of operand forward stage. A RegOp is at least two cycles from providing an operand if the RegOp has not yet advanced to operand forwarding stage. A LdOp is at least two cycles from providing an operand if the LdOp has not yet advanced to the first execution stage.

Table B.43 summarizes generation of the signals BumpRUX/Y and include an additional timeout term to handle what could otherwise be deadlock situations. 3-bit counters associated with RUX and RUY operand forward stage's generate signals RUX/Ytimeout after an operation has been held in operand forward stage for more than a time out period. Taking RUX as example, whenever RUX operand forward stage is loaded (irrespective of whether with a valid or invalid operation), the associated counter is reset to a start value. During all other cycles, the counter is decremented. If the counter reaches 000, then RUXtimeout is asserted to indicate that the operation has been held up too long.

RUX/Ytimeout signals cause setting of corresponding operation valid signals OpV for operand forward stage of register units 253 and 254. For example, signal RUXtimeout immediately forces signal OpV_RUX_0 equal to 0, which then causes assertion of pipeline control signal RUXAdv0 to reload RUX operand forward stage. Signal OpV_RUX_0 ensures that the RUX execution stage 450 does not see the bumped RegOp if signal RUXAdv1 is also asserted.

A second global control function occurring during operand transfer phase 442 is generation of the control signals for each source operand input multiplexer 1010 coupled to execution units 251 to 254. As described above, each 5:1 multiplexer 1010 selects an operand from an associated operand bus 554 or one of result busses 561 to 564 to load into an associated one of operand register 1021 to 1024 or 1031 to 1034. During operand transfer phase 442, control logic 520 uses operand status signals OprndStat from busses 553 to generate control signals for each of multiplexers 1010 and select operands OprndStat_SUsrcSt and OprndStat_XXsrcY, where XX={LU,SU,RUX,RUY} and Y={1,2}, to be loaded into the operand registers. In particular, global control logic 520 examines fields State and Type for each operand source to determine whether the sourcing operation has completed execution and, if not completed, which execution unit is executing the sourcing operation. The operand bus 554 is selected if the sources is register file 290, a completed operation, or an operation providing a src2 immediate value to itself. Otherwise, the result bus from the execution unit corresponding to the type of the sourcing-operation is selected. An operand from a result bus will not be valid unless the sourcing operation is completing in that cycle. Table B.44 in Section B summarizes generation of select signals for each operand.

A third global control function occurring during the operand transfer phase is determination of the validity of each of the nine operand values being presented to execution unit source operand registers. A signal is generated for each source operand to indicate whether the source operand value is valid. As with the control of the associated execution unit input multiplexers 1010, operand validity determination is based on fields State and Type of the OprndStat values from busses 553. A sourcing operation must either have completed execution or currently be completing execution for an operand to be valid. In addition, the DestBM field of the OprndStat value is compared with field Src1BM or Src2BM of the latched OprndInfo value for the operand being fetched. For the operand to be valid, the sourcing operation's byte marks must be a superset of the required byte marks Src1BM or Src2BM. A src2 immediate value is always valid. A signal OprndInvld__XXsrcY is asserted to indicate operand srcY for execution unit XX is invalid. Table B.45 summarizes logic which generates signals OprndInvld__XXsrcY.

A fourth global control function occurring during the operand transfer phase is generation of pipeline control signals which hold operation up in a pipeline stage when required operands for advancement are not valid. Signals SC__HoldXX0 hold operations in operand forward stage 440 of execution unit XX if source operands are not available. StOps can advance out of operand forward stage 440 even if the data operand is not available, but signal SC__HoldSU2 holds the StOp in the second execution stage 460 if the data operand is then invalid. -cc-dep RegOps are held up in operand forward stage 440 if required condition codes are invalid. Table B.46 summarizes logic which generates signals SC__HoldXX0 and SC__HoldSU2.

V. Status Flags

Status flag logic 538 for both x86 architectural flags and micro-architectural flags involve three areas of functionality: fetching status flag operand values for cc-dep Regops, fetching status flag values for resolution of BRCONDs, and synchronizing non-abortable Regops with preceding BRCONDs. Unlike operand selection logic 532 and LdOp-StOp ordering logic 534, status flag handling logic 538 is not spread across all scheduler entries. Status flag handling for related operations only occurs while operations that access status flags are within certain rows in scheduler 280. Cc-dep RegOps must be in row 3 during the cycle when status operand fetching occurs (i.e. during RUX operand forward stage). BRCONDs and non-abortable RegOps must be in row 4 during resolution by branch evaluation unit 257 and RUX operand forward stage, respectively. Accordingly, cc-dep and non-abortable RegOps are held up in RUX operand forward stage until they shift down to rows 3 and 4 respectively, and shifting of the Op quads in rows 3 and 4 is inhibited until Cc-dep and non-abortable RegOps in those rows can advance into RUX execution stage. BRCOND remain in row 4 until the status flags required for evaluation are valid.

Restricting execution or evaluation of cc-dep RegOps, non-abortable RegOps, and BRCOND to when the operations are in particular rows of scheduler 280 simplify status flag handling logic 538. For example, status flag handling logic 538 is only required in the bottom three scheduler rows and only the bottom two rows are used for determining appropriate status flag values. Additionally, the same status flag values can be shared by both a cc-dep RegOp in row 3 and a BRCOND in row 4. Synchronization between non-abortable RegOps and BRCONDs is simplified because the position of BRCONDs when evaluated is fixed.

A number of restrictions placed on positioning cc-dep RegOps, BRCOND, and non-abortable RegOps relative to each other within Op quads further simplifies logic. The restrictions generally translate into coding rules for emcode, but in some cases also constrain MacDec 242 decoding of multiple macroinstructions in a cycle. The restrictions require that an Op quad contain:
1) No cc altering RegOps after a BRCOND;
2) No cc altering RegOps before a cc-dep RegOp;
3) No non-abortable RegOps and a BRCOND together;
4) Only one cc-dep RegOp;
5) Only one BRCOND; an
6) Only one non-abortable RegOp.
With these restrictions, status flags are which are correct for a cc-dep RegOp in row 3 are also correct for a BRCOND in row 4, and the same status flag circuitry serves two purposes.

V.A Status Flat Fetch

Status flag handling logic 538 fetches four independent groups of status flags corresponding to the four bits of field StatMod. Table B.47 in Section B identifies the four flag groups and their correspondence to field StatMod. Whether each group is valid for an operation is independently determined depending on whether older operations which could modify the group have completed.

Passing status flag values directly from either register unit 253 or 254 to a cc-dep RegOp entering register unit 253 is not supported in the exemplary embodiment. Accordingly, status flags are valid the cycle following completion of a condition code altering RegOp. This creates a minimum latency of one cycle between a RegOp which modifies a particular group of status flags and execution of a following cc-dep RegOp which uses the group. The statistical performance impact of this latency is minimal because cc-dep RegOps are relatively rare when decoding typical x86 code. Further, any impact of the latency can be eliminated if instruction decoder 240 orders RISC86 operations to avoid a cc-dep RegOp in an Op quad immediately following a RegOp that alters the condition codes required for the cc-dep RegOp.

During each cycle, the effective set of status flag values at the boundary between scheduler rows 3 and 4 is computed. The computed status flags include the committed status flag and all changes to the status flags caused by operations in rows 4 and 5. As noted above, only RegOps modify the status flags. Since each RegOp can modify only one, two, three, or all four of the groups of status flags, status flag computation is performed independently for each of the four groups. The result of the computation, for each group, is a set of flag values and state information from the newest RegOp with a StatMod bit corresponding to the group set. The State field for the RegOp indicates whether the RegOp has completeed and provided valid flag values.

Status flag logic 538 generates eight status flag bits STATUS and four validity bits STATUSV associated with the four groups of status flags as shown in Table B.47. These 12 bits are passed via bus 557 to branch evaluation unit 257 which evaluates BRCONDs and logic in register unit 253 which handles cc-dep RegOps. Register unit 253 and branch evaluation unit 257 determine from validity bits STATUSV whether the required status flags are valid and if they are valid, uses status bits STATUS to execute the cc-dep RegOp (if any) in row 3 and evaluate the BRCOND (if any) in row 4. Global control logic 520 generates shift control signals based on whether the required status flags are valid.

A process similar to that for fetching register operand values fetches each status flag group to obtain the appropriate flag values for the last operation in row 3 of scheduler 280. In the following the notation OpX refers to entry X in scheduler 280 where X=0 and X=23 respectively identify the newest and oldest operations in scheduler 280. Row 4, for example, contains Op16, Op17, Op18, and Op19. For each flag group, a propagate-kill-style scan from Op16 to Op23 locates the first operation with StatMod bit for this flag group set, and that entry's completed state bit (i.e. S3) and the appropriate set of flag values are read out. The StatusV bit for this group is simply state bit S3 from the entry found. If no such operation is found, the desired flag values are read from the architectural status flags register and signal STATUSV is set to indicate the group is valid. Table B.48 describes the status flag fetch logic for each flag group.

V.B Status Forwarding to cc-DeD RegOps

During each cycle, global control logic 520 examines the four operations within row 3 to determine whether any of them is a cc-dep RegOp. If one is, then that RegOp is decoded to determine which groups of status flags are needed, and the StatusV bits are checked to determine whether all of those groups are valid. Concurrently, Status [7:0] is blindly passed to the RUX execution unit. If any of the required flag groups are not currently valid, the cc-dep RegOp is held up from advancing into the RUX execution stage and shifting of the Op quad out of rows 3 is inhibited. If all of the required flag groups are currently valid, the cc-dep RegOp is allowed to advance into the RUX execution stage at least insofar as the status operand fetch is concerned. The cc-dep RegOp may still be prevented from advancing because an operand is not available. If the cc-dep RegOp does not advance into execution stage 460, shifting of row 3 is inhibited.

If there is no unexecuted cc-dep RegOp in rows 3 to 5, but there is a cc-dep RegOp in RUX operand forward stage, then the RegOp is unconditionally held up in operand forward stage. If a cc-dep RegOp in row 3 has not yet executed, but there is no cc-dep RegOp in RUX operand forward stage, shifting of rows 3 is inhibited. Table B.49 describes logic which controls shifting and operation advancement.

V. Branch Prediction Resolution

During each cycle, if a BRCOND is found in row 4, the condition code (cc) field of that BRCOND is decoded to determine a predicted condition value. The predicted condition value is compared to a selected one of 32 condition values derived from status flags from status flag handling logic 538 if associated validity bits indicate the selected condition is valid. If the selected condition is not yet valid, shifting of the Op quad in row 4 is inhibited and evaluation of the BRCOND is attempted again in the next clock cycle. If the selected condition is valid, a comparison of the predicted condition and the selected condition indicates whether the prediction was correct.

If a BRCOND is found to be mispredicted (and thus a pipeline restart is required), the restart signal is asserted based on whether the BRCOND is from MacDec 242 or is an emcode operation from internal or external emcode. In addition, an appropriate x86 macroinstruction or emcode vector address and an associated return address stack TOS value are generated and returned to instruction decoder 240 to restart decoding.

For the benefit of the logic handling synchronization between non-abortable RegOps and preceding BRCONDs (described in the next section), a record is maintained of a mispredicted BRCOND while it remains outstanding (i.e. until an abort cycle occurs). Further, an outstanding mispredicted BRCOND holds up loading of "new" Op quads until the abort cycle occurs.

If a BRCOND was correctly predicted, the only action taken is to set the BRCOND's State bit S3 to indicate the BRCOND is completed. Table B.50 describes logic which handles BRCOND evaluation.

VI. Synchronization of Non-Abortable Operations

During each cycle, if a non-abortable RegOp is found in row 4, then scheduler 280 checks for any preceding mispredicted BRCONDs. Due to emcode coding constraints, any preceding BRCONDs must be in a lower row and thus must have all been resolved. Further, any BRCOND currently being resolved (in row 4) is after the non-abortable RegOp and thus is irrelevant.

If there is no mispredicted BRCOND, the non- abortable RegOp is allowed to advance into RUX execution stage, although the RegOp does not advance if required operands are not yet available. If the RegOp does not immediately advance into RUX execution stage, the RegOp is still allowed to shift out of row 4.

If rows 4 or 5 contain no unexecuted non-abortable RegOp but there is a non-abortable RegOp in RUX operand forward stage, the non-abortable RegOp is unconditionally held up in operand forward stage until the non-abortable Reg-Op reaches row 4. If a non-abortable RegOp in row 4 has not yet executed, but no non-abortable RegOp is in RUX operand forward stage or an unexecuted non-abortable RegOp is in row 5, shifting of rows 4 and 5 is inhibited. Table B.51 describes logic for handling non-abortable RegOps.

VII. Self-Modifying Code Handling

Store queue 270 provides several bits of the linear and physical addresses for data to be committed. If the store addresses match any instruction address for an Op quad, a write to an instruction may have modified an instruction, and an operation now present (decoded) in scheduler 280 may be incorrect. The incorrect operation must be corrected before results from the operation are committed. Above incorporated U.S. patent application Ser. No. 08/592,150 describes a system for handling self-modifying code which may be used in scheduler 280.

In the exemplary embodiment of the invention, self-modifying code support logic 536 compares address bits from store queue 270 to the instruction address (or addresses, if the instructions in an Op quad are from different pages) of each Op quad. If a comparison eliminates the possibility of code modification, logic 536 does nothing. If the possibility is not eliminated, logic 536 flushes scheduler 280 and restarts the fetch/decode process from the address of the last committed instruction. Logically, in scheduler 280, detection of self-modifying code is treated as a kind of trap and factors into a signal indicating a "trap pending". Table B.52 describes an example portion of self-modifying code handling logic 536.

VIII. Operation Commit Unit

OCU (Operation Commit Unit) 260 generally operates on the operations within the last or second to last row (row 4 or 5) of scheduler 280. The principal function of OCU 260 is to commit (or make permanent) the results of operations and then retire Op quads from scheduler 280. OCU 260 also initiates abort cycles.

Many types of results or state changes can stem from execution of an operation. The principal types of changes are abortable and encompass: register changes; status flag changes; and memory writes. In the RISC86 instruction set, register changes result from all RegOps, LdOps, LIMMOps, LDK operations, and STUPD StOps. Status flag changes result from ".cc" RegOps, and memory writes result from STxx StOps. Scheduler 280 and store queue 270 support abortable state changes by temporarily storing register and status results in entries of scheduler 280 and memory write data in entries of store queue 270, until the associated operations are committed and retired. Operation commitment makes state changes permanent. While new state values reside in scheduler 280 and store queue 270, the state values are forwarded to dependent operations as necessary.

All other state changes are non-abortable and result from non-abortable RegOp execution. The non-abortable state changes include changes to standard x86 registers such as segment registers and non-status EFlags bits and changes to micro-architectural registers for execution of RISC operations. Non-abortable state changes can occur immediately during non-abortable RegOp execution, and decoder 240 and scheduler 280 are responsible for ensuring sufficient synchronization of the non-abortable operations with the surrounding operations.

VIII.A Commitment

During each cycle, OCU 260 examines operations within rows 4 and/or 5 of scheduler 280 and tries to commit the results of as many of the operations as possible. The state changes in an Op quad may be committed in one cycle or over many cycles. If all of the operations of an Op quad in the bottom row have been committed or are being successfully committed, the Op quad is retired from scheduler 280 at the end of the current cycle by allowing an Op quad from row 4 to shift into and overwrite row 5. Otherwise, as many changes as possible are committed and shifting into row 5 is inhibited. The commitment process is repeated each cycle until all operations in row 5 have been committed and the Op quad from row 4 is allowed to shift down to row 5.

Commitments of register results, status results, and memory writes are performed independently. For operations which have multiple results (e.g. a RegOp with register and status results, or a STUPD operation with a register result and a memory write), the various results are not necessarily committed simultaneously. The commitment of one type of state change can generally be ahead or behind the commitment of another type of state change. The overall commitment of an operation occurs when OCU 260 commits the last result from the operation.

An operation's results are not committed until: the operation's execution state indicates the operation is completed; any preceding faultable operations, namely any preceding LdStOps, are completed, which implies that the operations are fault-free; and any preceding BRCONDs are completed, which implies that the BRCONDs were correctly predicted. FAULT operations are not a concern since decoder 240 places each FAULT operation as the first "valid" operation in an Op quad so that no operations in the same row as a FAULT operation need to be completed. For StOps which generated a memory write, an additional constraint is that only one write can be committed per cycle from store queue 270 into data cache 220.

OCU 260 can commit up to four register and four status results and one memory write per cycle and typically commits and retires an Op quad from scheduler 280 every cycle. An Op quad remains in the bottom row of scheduler 280 and unretired for more than one cycle only if the Op quad contains multiple memory write StOps or if some of the operations in the Op quad have not yet completed.

If an operation in the bottom row needs to be faulted, for example, if the operation is a FAULT operation or a fault occurred during execution of the operation, commitment of the following operations is inhibited. Once all older operations within the Op quad being faulted have been committed or are being successfully committed, OCU 260 retires the Op quad and initiates an abort cycle. The abort cycle flushes scheduler 280 and all execution units of all outstanding operations.

Concurrent with the abort cycle, OCU 260 also vectors instruction decoder 240 to one of two possible emcode "entry point" addresses, either the "default" fault handler address (as initialized by reset emcode), or an "alternate" handler address (as specified by a macroinstruction or exception processing emcode). LDDHA and LDAHA operations, which are loaded into scheduler 280 in a completed state and are recognized and "executed" by OCU 260 when they reach the bottom of scheduler 280, support setting of the fault default and alternate handler addresses.

Only certain types of operations can be faulted, namely LdOps, StOps (except for LEA operations), and FAULT operations. For a LdOp or StOp, faults are identified by the second execution stage 460 of the LU or SU execution pipeline; and if a fault is detected, the LdStOp is held up in the second execution stage until the associated or an unrelated abort cycle flushes the LdStOp from scheduler 280 and execution unit 251 or 252. This results in completed LdStOps being guaranteed fault-free. OCU 260 differentiates between a faulting LdStOp and a LdStOp that has not yet completed, by signals from execution units 251 and 252 indicating a faulting operation is stuck in their respective second execution stage. When OCU 260 tries to commit the next uncompleted LdStOp and the associated execution unit 251 or 252 signals a fault for an operation held in the second execution stage, the operation that OCU 260 is trying to commit must be the operation that has encountered a fault. If the associated execution unit 251 or 252 does not assert a fault signal, then nothing definite can be determined about an uncompleted LdStOp; and OCU 260 waits for the LdStOp to complete.

FAULT operations are loaded into scheduler 280 in a completed state and always fault. OCU 260 handles commitment of FAULT operations and the resulting abortion of surrounding operations in the same manner as LdStOps which fault.

In addition to faults on specific operations, OCU 260 also recognizes various debug trap exceptions which are accumulated and remembered up until the end of an emcode sequence as indicated by an ERET. If an "ERET" Op. quad is retired and trap exceptions are pending, OCU 260 initiates a fault-style abort cycle as if a fault was recognized on a fifth and last operation within the Op quad.

OCU 260 recognizes a "branch target limit violation" condition which, while associated with just certain operations within an Op quad, is tagged with the Op quad as a whole. This unconditionally initiates an abort cycle as if a fault was recognized on the first operation within the Op quad.

While OCU 260 is primarily concerned with operations that generate abortable state changes, OCU 260 also handles BRCONDS. BRCONDs are resolved when in row 4. If a misprediction is detected, logic for fetching macroinstructions and instruction decoder 240 are immediately reset and restarted from the proper macroinstruction address. When the mispredicted BRCOND reaches row 5, commitment of operations newer than the mispredicted BRCOND is inhibited, and an abort cycle is initiated after all operations preceding the mispredicted BRCOND have been committed or are being successfully committed. The abort cycle flushes scheduler 280 and all execution units of all operations. The abort cycle also enables loading "new" operations from decoder 240 into scheduler 280 for immediate issue to execution units 251 to 256. Mispredicted BRCONDs and operation fault aborts differ in that no vectoring to emcode is initiated for mispredicted BRCONDs. No action is necessary to commit a correctly predicted BRCOND that reaches the bottom of scheduler 280.

OCU 260 either commits or aborts each BRCOND. OCU 260 chooses the action based on the BRCOND's scheduler entry State field. When a BRCOND is resolved, its scheduler entry State field is either changed to completed if correctly predicted, or is left unissued if mispredicted. Thus, whether a BRCOND is completed in row 4 directly indicates whether the BRCOND was mispredicted.

The actual timing of operation result commitments is relatively simple and can be viewed as happening during the latter part of the commit cycle. Typically, an Op quad is committed during the same cycle that it falls into the bottom of scheduler 280, and is retired from scheduler 280 at the end of the cycle. During this cycle, while results are being written to register file 290, operand values continue to be forwarded to all dependent operations from scheduler 280, not from register file 290.

Committing memory writes (i.e., committing Stops)is a two stage process implemented in the form of a two stage write commit pipeline. The first stage of the write commit pipeline corresponds to OCU 260's commit cycle for a StOp and, as far as OCU 260 is concerned, the StOp has been committed when it enters the second stage of this pipeline. Timing-wise the StOp must enter the second write commit stage before or concurrent with retirement of the associated Op quad from scheduler 280. If a StOp cannot enter this second stage, the StOp is viewed as not yet being committable and retirement of the Op quad is held up.

When OCU 260 initiates an abort cycle due to an operation fault, an abort signal and an associated emcode vector address are asserted during the commit/retire cycle of the Op quad containing the faulting operation. During the next cycle, scheduler 280 will have been flushed, and the target emcode Op quad is being fetched. For internal emcode, scheduler 280 will be empty for exactly this one cycle.

The Abort signal for a mispredicted BRCOND is also asserted during the commit/retire cycle of the associated Op quad. Since instruction fetch and decode was restarted earlier, scheduler 280 can be reloaded with a new Op quad as early as the very next cycle, i.e. scheduler 280 does not sit empty for even one cycle.

When OCU 260 recognizes multiple operations within an Op quad as requiring an abort cycle, it chooses the first such operation and initiates appropriate abort actions with respect to that operation at the appropriate time for that operation.

VIII.A.1 Register Commitment

OCU 260 manages and controls committing of register result values to register file 290. During each cycle, the register result of each completed operation within one of the bottom two rows of scheduler 280 can be written into register file 290 (during the latter part of the cycle, via four independent write ports). Each write is performed according to byte marks, field DestBM[2:0], from the associated scheduler entry. This process applies to the x86 architectural registers and the temporary/micro-architectural registers.

If an operation is not yet completed and committable, the associated register file write is inhibited for this cycle. If an operation is of a type which conceptually does not generate a register result, then the byte marks are all clear and the register number is possibly undefined. This results in no bytes being modified during the register file write. Similarly, if register t0 (an always zero register) is specified as the destination for an operation, the byte marks are again all cleared. In both of these cases, operation decoder 210 forced the byte marks to b000 during loading.

In general, the possibility of contention exists, i.e. of multiple simultaneous writes to the same register. The desired result is from the newest operation, and the other, older writes are inhibited and effectively ignored. Register file 290 handles this function separate from OCU 260's control of the register commitment process based simply on the presented register numbers and associated write enables.

Further, if the contending writes are such that the older writes modify register bytes which are not modified by the newest write, then the effective register file write is a combination of bytes from the contending operations. For example, if a first (oldest) operation modifies bytes {3,2,1, 0}, a second operation modifies bytes {1,0}, and a third (newest) operation modifies byte {1}, the actual register file write takes bytes {3,2} from the first operation, byte {0} from the second operation, and byte {1} from the third operation. In other cases, some of the register file bytes are not modified at all. Control logic in register file 290 handles this further functionality. In essence, contention resolution logic inside register file 290 operates on the basis of individual bytes instead of 32-bit words.

The write enables for all four operations are generated in parallel. An associated write enable is asserted to register file 290 for each completed operation if all preceding/older LdStOps within the Op quad are completed and no preceding/older BRCOND is mispredicted. When results of an operation are written to register file 290, the associated DestBM bits are cleared to indicate that the scheduler entry no longer provides a register value to dependent operations. Clearing of the DestBM field is also done for partial register writes. If a dependent operation cannot obtain all required bytes from one operation, the dependent operation is held up in an operand forward stage until it can obtain all of the bytes from register file 290.

In addition, nine signals OprndMatch_XXsrcY associated with a scheduler entry (see description above) are masked (i.e. forced to indicate no match) when the DestBM bits within that entry are about to be cleared. This is due to the pipelined nature of the register operand fetch process within scheduler 280. Specifically, the DestBM bits of an entry are used in both stages of this process and must be consistent across both cycles.

To increase register commitment throughput, operation register writes may take place from row 4 when register commitment for all operations in row 5 have completed. This is accomplished by generalizing the RegOp write enable logic to consider either the four operations in row 5 or four operations in row 4. The operations of the selected row are renamed "OpA" through "OpD" in place of Op23 through Op20 or Op19 through Op16. Table B.53 describes logic which selects results for commitment to register file 290.

VIII.A.2 Status Flag Commitment

OCU 260 also manages and controls the commitment to the architectural EFlags register of status flag results generated by ".cc" RegOps. Unlike the commitment of register results, none of the (up to four) status flag results of operations from row 5 are written into EFlags until the Op quad in row 5 is about to be either retired or aborted. In the normal case, when all operations within the Op quad have been fully committed or are being successfully committed, the cumulative or overall result of all four status results is written into EFlags at the end of the cycle when the Op quad is retired from scheduler 280. For an Op quad containing a faulting operation or a mispredicted BRCOND, only the status results from the operations before the faulting instruction or BRCOND are committed and the cumulative result is written during or at the end of the abort cycle.

This process applies to the micro-architectural status flags (EZF and ECF) as well as to the x86 architectural status flags. In essence, the architectural EFlags register is extended to 34 bits to make room for the extra two status flags. The RDFLG and WRFLG RegOps only reference the standard 32-bit portion of this extended EFlags register. Generation of the cumulative status result is based on the status bit marks (StatMod[3:0]) from each of the four entries within the bottom row. The eight status flags are divided into four groups for modification marking purposes instead of having eight individual bit marks. As with updates to a general register within the register file, the possibility of contention exists, i.e. of multiple modifications to the same group of status flags. The desired result is the newest modification values for each group of status flags.

The generation of the cumulative status result is also based on the completed status (State[3]) of each of the four operations. For an Op quad being aborted, field State identifies which status results should be committed and which should not be committed. For commitment, all preceding operations must be completed and thus free of fault and misprediction. Table B.54 summarizes logic which accumulates the status flag changes.

No explicit control or constraint on operation commitment and retirement is required insofar as status flag results are concerned. Since status flag state changes only result from RegOps and since all RegOps generate register state changes (even if just to t0), an Op quad cannot be retired until all RegOps within the Op quad are completed and thus have valid status result values. There is also no need, given how status flag values are forwarded (to BRCONDs and "cc-dependent" RegOps), for any clearing of StatMod fields for the operations of the bottom row.

VIII.A.3 Memory Write Commitment

A third function of OCU 260 is controlling the commitment of memory write data values to "memory" (the data cache and/or to main memory). This differs from the commitment of register and status results in a number of ways: memory write commitment involves an associated store queue entry (in most cases); at most one memory write can be committed per cycle; the commitment process has a two stage commit pipeline. OCU 260 scans the bottom two rows to find StOps for memory writes to commit. The possibility of faults on the associated StOps exists.

Memory writes are all associated with StOps (except for LEA, CIA, and CDA operations, which don't actually reference memory). When a StOp completes execution, the associated memory address and store data is entered into store queue 270. Later, when the memory write of a StOp is committed, this entry is read out to cache memory and retired from store queue 270. StOps are executed and committed in order relative to each other which allows store queue 270 to operate as a simple FIFO, and matching of store queue entries with associated scheduler StOps is automatic.

The actual commitment process, though, is more complicated and described below. Generally, a two stage process is required in which the last/oldest store queue entry is first read and the address looked up in data cache 220; then, based on the status of the lookup, the store data is written into data cache 220 and/or out to memory. In the latter case, the data and address is typically simply loaded into the Write Buffer and, later, written out to memory.

In the two stage write commit pipeline, the first stage (i.e. the data cache tag lookup) corresponds to the commit cycle of register and status results, i.e. the containing Op quad could be retired at the end of this stage's cycle. From OCU 260's perspective, the commit process is largely viewed as a single cycle/single stage action that either succeeds or is delayed. The commitment of a memory write can be held up for similar reasons as for a register state change, and also held up if the write commit is not able to enter stage 2 of the commit pipe. When a write enters commit stage 2, the associated StOp can be retired from scheduler 280, and the remainder of the commit process is asynchronous to OCU 260 and scheduler 280.

During the first commit stage, no control decisions are made. The data cache tag lookup is performed, and the accessed tag data is simply latched for examination during the second commit stage.

The write commit pipeline is only a single pipeline and thus only supports commitment of one memory write per cycle. For Op quads containing at most one memory-writing StOp, this allows the possible commitment and retirement of an Op quad each cycle (subject to the same sort of caveats as stem from the commitment of register state changes). For Op quads containing two, three, or four StOps, a corresponding minimum number of cycles is required to commit the Op quad which causes the Op quad to remain at the bottom of scheduler 280 for at least that many cycles. Committing a memory write associated with a StOp in row 4 or row 5 reduces hold-ups caused by multiple StOps in an Op quad. Given that memory writes are committed in order, OCU 260 can get a "head start" on multiple write Op quads when the bottom Op quad is held up but otherwise empty of uncommitted memory writes or the bottom Op quad simply does not contain any StOps. This helps to better match the OCU's one write per cycle commitment capability to the average number of writes per Op quad which is less than one per Op quad.

During each cycle, the OCU's memory write commit logic searches the bottom two rows for the oldest uncommitted memory-writing Stop (i.e. for the next Stop and associated write to try to commit). The selected operation generated the current bottom/oldest store queue entry. Concurrently with operation selection, the address of the oldest store queue entry is presented to the Data cache and a tag lookup initiated. Note that this is done "blindly", i.e. without consideration of whether the associated StOp is in fact presently committable.

If the selected StOp is committable and the write commit is able to advance into the second write commit stage, OCU 260 considers the StOp to be committed. In the next cycle, OCU 260 searches for the next memory-writing StOp. The criterion for StOp commitment are the same as for register result commitment: the selected StOp must be completed, all preceding/older LdStOps within the Op quad (and possibly the preceding Op quad if this StOp is in the last row) must also be completed, and there must not be a preceding/older mispredicted BRCOND. A write commit is able to advance into commit stage 2 when that stage is either empty or is successfully completing commitment of a write.

If the selected StOp is not committable only because it is not completed, OCU 260 examines the signal from the second SU execution stage which indicates whether a StOp is "stuck" in that stage with a detected fault condition. If there is any such operation, it is the same Stop that OCU 260 is trying (unsuccessfully) to commit, and thus must be aborted by OCU 260. An appropriate abort cycle is not initiated until the StOp is in the bottom row, all preceding operations within the Op quad have been committed, and no. preceding BRCOND was mispredicted. This is essentially an extension of the condition for StOp being committable. In the mean time, OCU 260 remains in this state until an abort cycle is initiated for a preceding operation.

OCU 260 is primarily concerned with memory-writing Stops but also handles CIA and CDA operations because these operations generate faultable memory addresses which OCU 260 must examine and commit. In the normal case of such an operation executing fault-free, OCU 260 trivially spends a cycle on committing the operation and simply moves on to committing the next StOp in the next cycle. Since no store queue entry was created during execution of the operation, no entry is retired from the store queue. If a fault was detected during execution of the CIA or CDA operation, the operation is "stuck" in the second SU execution stage, and OCU 260 aborts in exactly the same fashion as for other StOps.

A second special situation for OCU 260 arises when a StOp's memory reference crosses an alignment boundary (currently 8 bytes) and is split by store unit 252 into two memory writes having two associated store queue entries. In such situations, OCU 260 take two cycles to retire the two store queue entries and does not officially commit the StOp until the second cycle. If the StOp has a fault, it is aborted without retirement of any store queue entries.

The exemplary embodiment of OCU 260 uses a set of mask bits (CmtMask[7:0]) which represent the OCU's progress in committing memory-writing StOps within the last two rows. Each of the eight mask bits CmtMask[7:0] corresponds to the eight entries in the last two rows. A first set of bits (starting from bit 0) are clear to indicate that OCU 260 has searched the corresponding entries and committed any StOps up to the entry corresponding to the last clear bit. The entry corresponding to the last clear bit contains the next StOp to be committed. Entries corresponding to the set mask bits have yet to be examined for committable Stops. OCU 260 also maintains a set of bits (UncmtStOp[7:0]) indicating which entries in the last two rows contain uncommitted memory-writing StOps.

During each cycle, OCU 260 selects the next uncommitted StOp and generates a new set of mask bits based on the entry containing this StOp. The unmasked entries are examined to determine whether the selected StOp is presently committable or an abort cycle needs to be initiated. If the selected StOp is committable and if stage 2 of the commit pipeline is able to accept a new write commit at the end of the cycle, the StOp is committed, and the UncmtStOp bits are updated with new values. The UncmtStOp bits are also updated/shifted to match any shifting of the last two rows. Table B.55 in Section B describes this logic.

VIII.B Op Quad Retirement

When all abortable state changes of the operations within the bottom row of scheduler 280 have been committed or are being successfully committed, OCU 260 retires the Op quad from scheduler 280 at the end of the cycle. This allows the next Op quad to shift into the bottom row of scheduler 280. During cycles in which not all such operation results have been committed, the Op quad is not retired and is either retained for further commitment processing or invalidated due to an abort cycle. If invalidated, the abort cycle would be in response to some fault having been recognized on one of the operations within row 5.

More specifically, the retirement of an Op quad requires that all register results, status results, and memory writes are committed, and that there is no FAULT operation or mispredicted BRCOND in the Op quad. Retirement of an Op quad also occurs immediately if the Op quad is marked as invalid. The scheduler's shift control logic automatically takes care of this. Status results are all committed together in conjunction with retirement (or abortion) of the Op quad. Register results are committed or currently committing if the associated operations are completed. Table B.56 summarizes circuitry in OCU 260 for retirement of Op quads.

VIII.C Fault Handling

VIII.C.1 Load Operation Fault Handling

Ldops normally do not require any special handling by OCU 260 since LdOps only result in general register state changes. Like most StOps, though, LdOps can also encounter faults during execution. Special logic in OCU 260 recognizes and handles LdOp faults in the same manner as StOp faults. To determine whether a faulting LdOp exists in bottom row of scheduler 280, OCU 260 searches row 5 for an operation which is a LdOp with all preceding/older operations completed and committed and no preceding mispredicted BRCOND. OCU 260 also examines a signal from load unit 251 indicating whether a LdOp with a detected fault condition is "stuck" in the second execution stage of the LU pipeline.

If a LdOp in row 5 is uncompleted and preceded only by completed and committed operations and the signal from LU stage 2 is asserted, OCU 260 recognizes a faulting LdOp and initiates an appropriate abort cycle immediately to abort the LdOp and all following operations. Table B.57 summarizes the OCU's LdOp fault handling logic.

VIII.C.2 FAULT and LDDHA/LDAHA Operation Handling

A few special operations, FAULT, LDDHA, and LDAHA operations, require additional, special commitment handling. None of these operations are issued to or executed by an execution unit. The FAULT, LDDHA, and LDAHA operations have no execution dependencies with other operations and are significant only to OCU 260.

OCU 260 handles the FAULT operation much like a faulting LdStOp. An abort cycle is initiated along with vectoring to the current emcode OCU fault handler. Unlike faulting LdStOps, there is no issue of whether there is a fault to recognize and of when to initiate the abort cycle. To simplify the OCU's logic for handling FAULT operations, the following constraints are placed upon decoders 240 and 510: 1) FAULT operations must be in the first operation position of an Op quad, 2) all following operations in the Op quad must be "NO-OPs" (e.g. LDK t0,xx), and 3) the following Op quad must not contain any memory-writing StOps. Prohibiting memory-writing StOps from the next Op quad ensures that all other OCU commitment logic can operate blindly on "FAULT" Op quads without any special consideration.

The State of a FAULT operation is initialized to 'b0000 when loaded into scheduler 280. When the FAULT operation reaches row 5, the uncompleted state of the Fault operation inhibits the OCU's Op quad retirement logic from retiring the Op quad, and FAULT operation commit logic in OCU 260 immediately initiates an abort cycle. The specifics of the abort cycle are the same as for faults on LdStOps. The only difference is the generation of a unique fault ID. Table B.58 describes logic which generates an abort signal for a FAULT operation.

The LDDHA/LDAHA operations enable emcode to set and change the address in emcode ROM 246 to which OCU-recognized exceptions are vectored. OCU 260 maintains two vector address registers, one to hold a "default" handler address and another to hold an "alternate" handler address. The first vector address register is active for most emcode (both macroinstruction and exception processing emcode) by default and is set just once by the reset emcode via an LDDHA operation. (Processor 200 executes reset emcode for initialization after a reset.) The second vector address register is set via an LDAHA operation.

For emcode sequences from vector decoder 244 (defined to be from an entry point through to an ERET) which do not contain an LDAHA operation, any faults recognized by OCU 260 on operations within the sequence result in vectoring to the address in the default handler address register. For emcode sequences which contain an LDAHA operation, faults on operations in Op quads before the one containing the LDAHA operation result in vectoring to the default address; but faults on operations in the Op quad containing the LDAHA operation or in any following Op quads up to and including the last quad of the emcode sequence, result in vectoring to the address in the second vector address register. The retirement of the "ERET" Op quad effectively reactivates the default handler address register for all following operations until the next occurrence of an LDAMA operation. The occurrence of an abort cycle also reactivates the default handler address register.

To simplify matters for OCU 260, LDDHA/LDAHA operations are constrained to be located in the oldest Eoperation position of an Op quad. "Valid" operations are allowed in the following operation positions of the Op quad. Table B.59 summarizes the OCU's LDDHA/LDAHA operation handling logic.

VIII.C.3 Target Limit Violation Handling

In addition to the commitment of state changes associated with each operation within an Op quad, OCU 260 also recognizes a special condition tagged for an Op quad as a whole. Whenever MacDec 260 decodes a transfer control instruction and a code segment limit violation is detected on the target address (after the MacDec has generated an Op quad and the Op quad has been loaded into scheduler 280), the Op quad is marked to indicate that such a violation was detected in association with the Op quad.

When the Op quad reaches OCU 260 and is to be committed, the set tag bit is recognized and an abort cycle is initiated without commitment of any state changes from the operations within the Op quad. Effectively the entire Op quad is faulted. The effect is similar to as if there was a FAULT operation in the Op quad. Table B.60 describes logic for handling branch target limit violations.

VIII.C.4 Mispredicted Branch Handling

Besides commitment of abortable state changes and handling of various special cases, OCU 260 handles generation of abort cycles for mispredicted BRCONDs. As mentioned earlier, the restart of the instruction fetch and decode areas occurs before the BRCOND reaches the bottom of scheduler 280. Scheduler 280 subsequently generates an abort and ensures that only preceding operations are committed. As with the generation of abort cycles for operation faults, the abort is not initiated until all preceding operations have been committed. Table B.61 summarizes logic which generates an abort for a mispredicted branch.

VIII.D Abort Cycle Generation

OCU 260 generates abort cycles in two situations: recognition of an Op fault (on a LdStOp or a FAULT operation), and recognition of a mispredicted BRCOND. Preceding sections and Tables B.55, B.57 B.58, and B.61 covered generation of signals initiating an abort cycle (i.e. signals StAbort, LdAbort, FltAbort, LimAbort, and BrAbort). This section describes the generation of the general Abort signal and related information.

The Abort signal is a combination of all individual abort signals associated with commitment of specific types of state changes or operations. The associated emcode vector address, which is defined only for fault-related aborts and not BRCOND-related aborts, is FltVecAddr as described above. The Abort signal flushes scheduler 280 and all execution units 251 to 257 of all outstanding operations and re-initializes these areas in preparation for receiving new operations from instruction decoder 240. For BRCOND-related aborts, this is sufficient because branch evaluation unit 257 previously restarted the emcode and x86 macroinstruction fetch and instruction decoder 240.

For exception-related aborts, instruction decoder 240 also needs to be restarted at the fault handler address. When instruction fetch/decode restarts are signaled simultaneously for both a mispredicted BRCOND and an operation exception, the operation exception is given higher priority. The vector address for the restart and the generation of the appropriate restart signals are generated accordingly. When a fault-related abort occurs, OCU 260 also latches information about the fault, namely the x86 macroinstruction program counter (the logical address of the associated x86 instruction effectively being faulted) into a register SR4. Table B.62 summarizes the OCU's abort cycle generation logic.

IX. Processing Systems

Figure 11A:
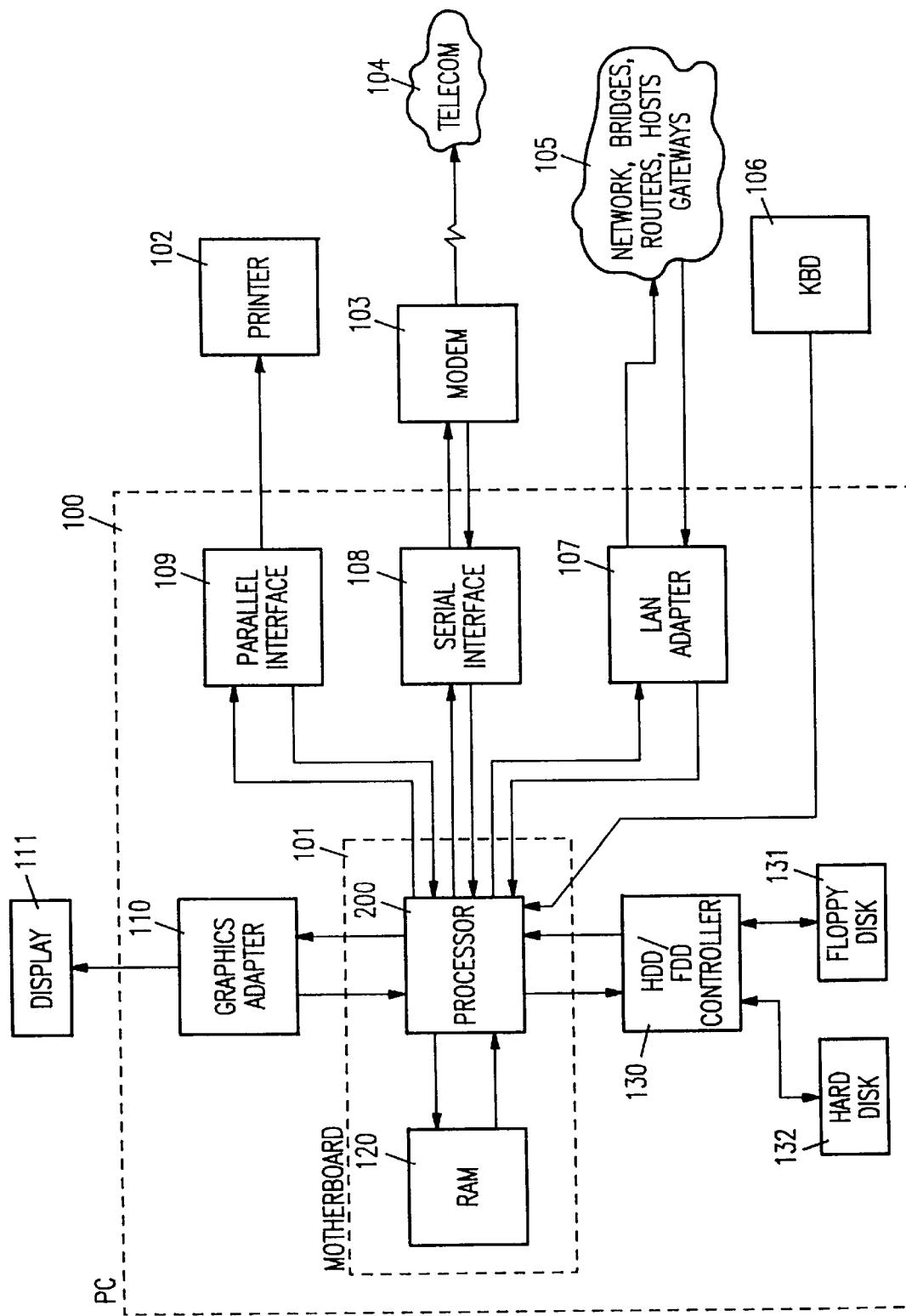
FIGS. 11A, 11B, and 11C are three exemplary block diagrams of processing system embodiments of the invention.
Figure 11B:
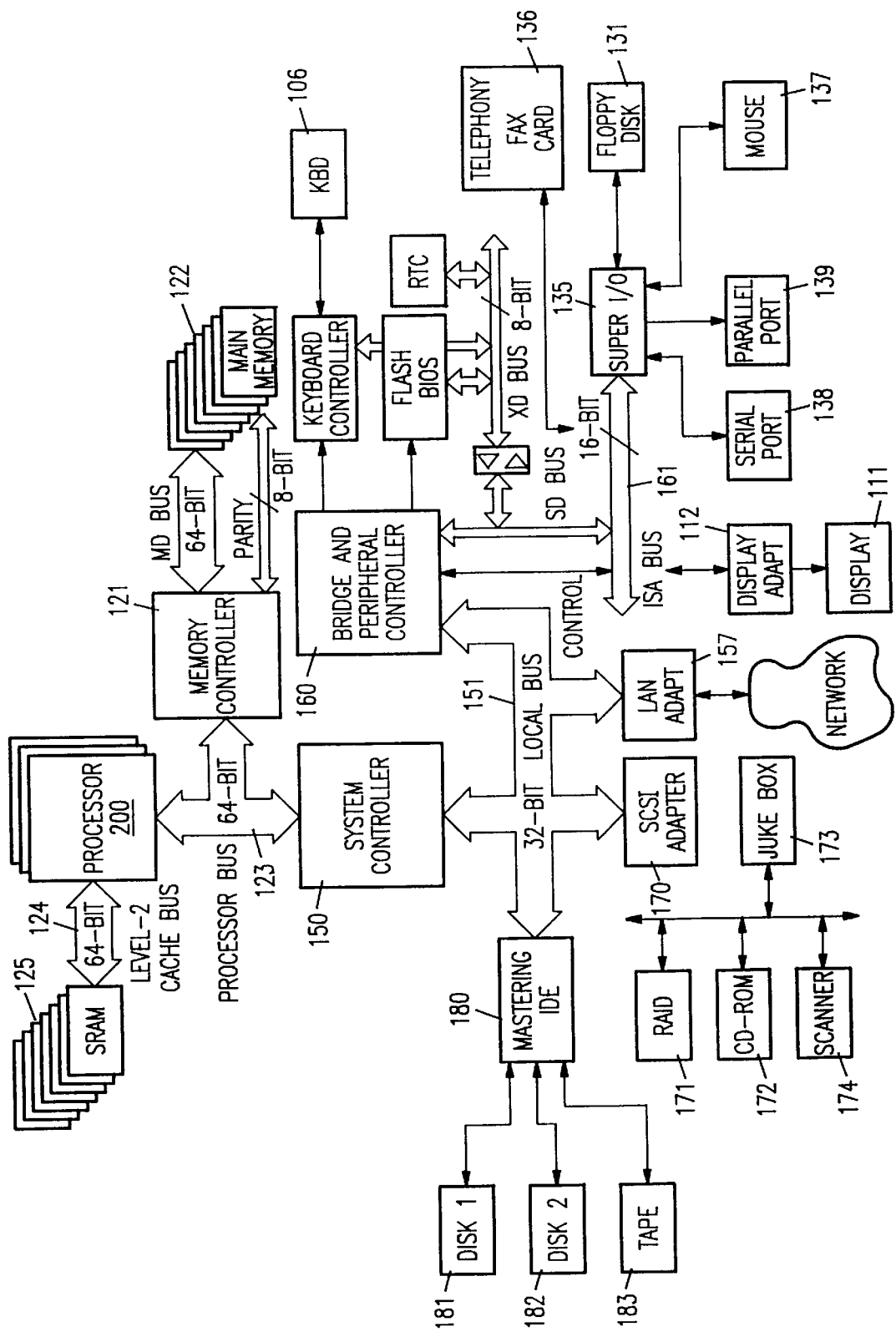
Figure 11C:
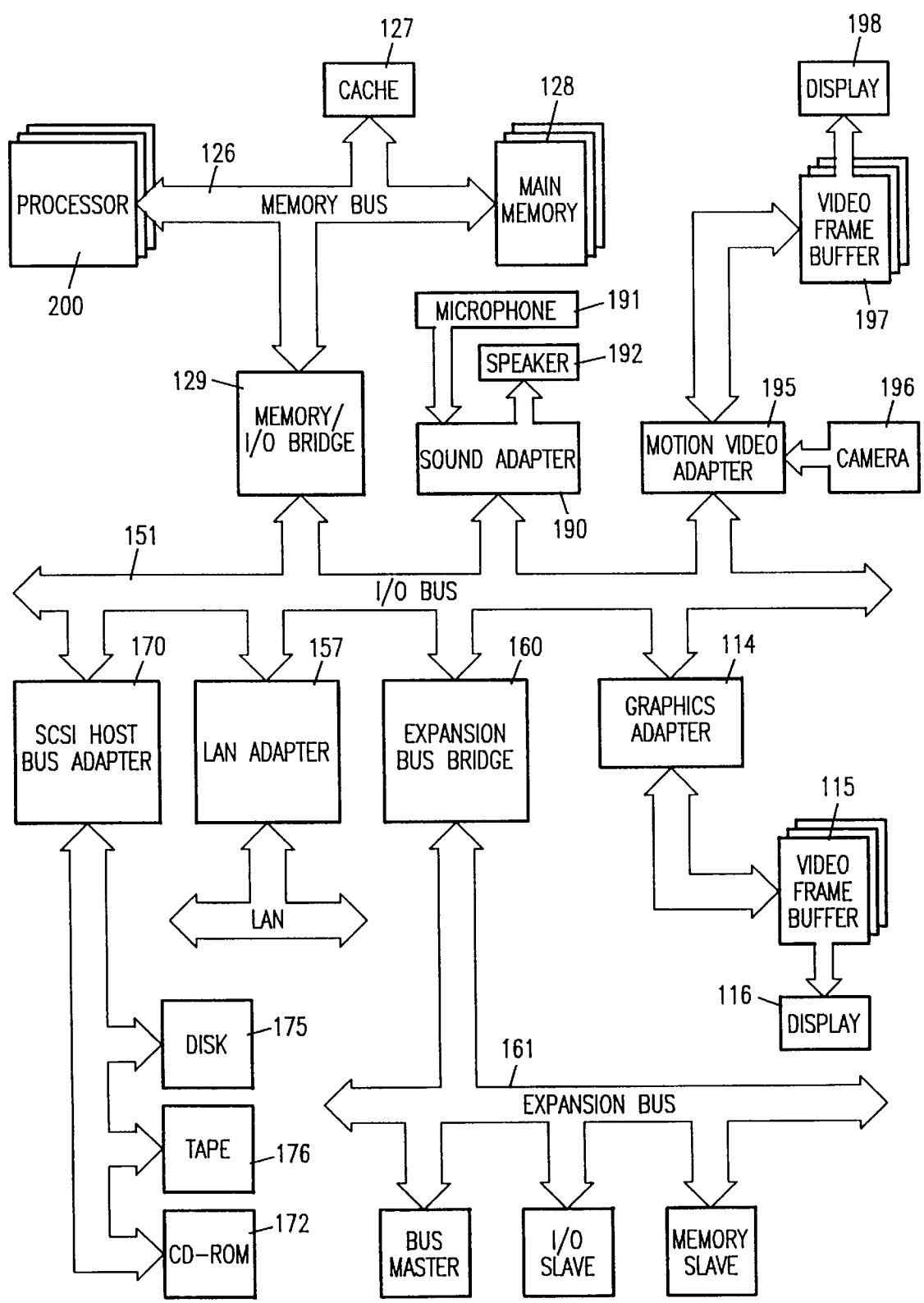

Embodiments of the invention include a wide variety of processing systems, illustratively including standalone and networked personal computer systems, workstation systems, multimedia systems, network server systems, multiprocessor systems, embedded systems, integrated telephony systems, and video conferencing systems. FIGS. 11A to 11C depict an illustrative set of processing systems that combine a superscalar processor 200 in accordance with the invention with suitable, bus configurations, memory hierarchies and cache configurations, I/O interfaces, controllers, devices, and peripheral components. The set of processing systems depicted in FIGS. 11A to 11C is merely illustrative and alternate combinations of bus configurations, memory hierarchies, I/O interfaces, controllers, devices, and peripheral components are also suitable. For example, suitable configurations for a system incorporating superscalar processor 200 include combinations of components, cards, interfaces, and devices such as:

1. video display devices, monitors, flat-panel displays, and touch screens;
2. pointing devices and keyboards;
3. co-processors, floating point processors, graphics processors, I/O controllers, and UARTS;
4. secondary and tertiary storage devices, controllers, and interfaces, caches, RAM, ROM, flash memory, static RAM, dynamic RAM
5. CD-ROMs, fixed disks, removable media storage devices, floppy disks, WORMS, IDE controllers, enhanced-IDE controllers, SCSI devices, scanners and jukeboxes;
6. PCMCIA interfaces and devices, ISA busses and devices, EISA busses and devices, PCI local busses and devices, VESA local busses and devices, Micro Channel Architecture busses and devices;
7. network interfaces, adapters and cards such as for ethernet, token ring, 10Base-T, twisted pairs, untwisted pairs, ATM networks, frame-relay, ISDN, etc;
8. video cards and devices, 2-D and 3-D graphics cards, frame buffers, MPEG/JPEG compression/ decompression logic and devices, videoconferencing cards and devices, and video cameras and frame capture devices;
9. computer integrated telephony cards and devices, modem cards and devices, fax cards and devices;
10. sound cards and devices, audio and video input devices, microphones, and speakers;
11. data acquisition and control cards and interfaces, compression/decompression logic and devices, encryption/decryption logic and devices; and
12. tape backup units, redundant/fault tolerant components and devices such as RAID and ECC memory.

Suitable combinations of such components, cards, interfaces, and devices (including those enumerated above as well as comparable components, cards, interfaces, and devices) are too numerous to list. However, those skilled in the art will appreciate the full set of suitable combinations and will recognize suitable couplings between such components, cards, interfaces, and devices.

A networked personal computer 100 incorporating superscalar processor 200 is shown in FIG. 11A. Superscalar processor 200 is coupled to memory subsystem 120. In the embodiment of FIG. 11A, memory subsystem 120 is shown as RAM, although alternative embodiments include a cache or caches interposed between the RAM and superscalar processor 200. Control logic and storage for such a cache may be distributed among the memory subsystem 120 and the superscalar processor 200. For example, the level 1 caches (i.e., an instruction cache and a data cache) and cache control logic may be included in superscalar processor 200 and a level 2 cache may be included as part of memory subsystem 120. Alternative distributions are also suitable, although the level 1 caches are preferably on-chip components of superscalar processor 200.

Superscalar processor 200 and memory subsystem 120 are included as parts of a motherboard 101 of computer 100. A series of adapters, interfaces, and controllers couple processor 200 to devices and peripheral components. These adapters, interfaces, and controllers are typically coupled to processor 200 as cards in a backplane bus of motherboard 101. However, alternative embodiments may incorporate individual adapters, interfaces and controllers into motherboard 101. For example, a graphics adapter 110 may be included on motherboard 101 with superscalar processor 200 or be a separate component as shown in FIG. 11A. In either case, graphics adapter 110 is coupled to superscalar processor 200 via busses such as those described below with reference to FIGS. 11B and 11C. Graphics adapter 110 drives signals to control display 111 in accordance with screen updates supplied by superscalar processor 200. A parallel interface 109 and a serial interface 108 provide parallel port and serial port signaling interfaces for respectively interfacing to parallel port devices (e.g., printers such as parallel printer 102, tape backup units, etc.) and to serial devices (e.g., modem 103, pointing devices, and printers). In computer 100, parallel interface 109 and serial interface 108 are shown as separate interfaces although each is often incorporated with a hard disk/floppy disk controller (such as hard disk/floppy disk controller 130) as a multifunction card. Hard disk/floppy disk controller 130 controls access to the media of a hard disk 132 and to a floppy disk 131. Typically, hard disk/floppy disk controllers such as hard disk/floppy disk controller 130 provide some level of buffering of reads and writes. Hard disk/floppy disk controller 130 may also provide limited caching for data transfers to and from the disk media.

Suitable designs for graphics adapter 110, parallel interface 109, serial interface 108, and hard disk/floppy disk controller 130 are well known in the art. For example, implementations of graphics adapter cards conforming to the VGA standard are commonly available, and suitable designs are well known to those skilled in the art. Designs for parallel and serial interfaces, such as those conforming to the Centronics parallel interface and to the RS-232C serial interface specifications, respectively, are also well known to those skilled in the art. Similarly, designs for IDE and SCSI disk controllers are well known in the art and suitable implementations are commonly available.

A LAN adapter 107 provides computer 100 with a network interface to local area networks such as 802.3 Ethernet, 10Base-T, twisted pair, and token ring networks. As with the other adapters and interfaces, LAN adapter 107 is typically coupled to processor 200 as a card in the backplane bus of motherboard 101. However, alternative embodiments may incorporate LAN adapter 107 into motherboard 101. Suitable cards and devices providing network interfaces are well known in the art and LAN adapter 107 may be any such suitable card or device.

Because of the high performance associated with its superscalar design, superscalar processor 200 is particularly attractive as the processor, or one of multiple processors, in a network server configuration such as than shown in FIG. 11B. In the network server configuration of FIG. 11B, multiple instances of superscalar processor 200 are shown coupled to a level 2 cache 125 and to a processor bus 123. In the embodiment FIG. 11B, superscalar processor 200 includes an on-board level 1 cache (i.e., instruction cache 130 and data cache 170) and level 2 cache control logic. The level 2 cache control logic (not shown) is coupled to level 2 cache 125 via a 64-bit cache bus. Alternate embodiments of superscalar processor 200, may offload the functionality of level 2 cache control logic. In such an alternative embodiment, level 2 cache control logic may be interposed between superscalar processor 200 and level 2 cache 125. In the context of bus structures presented in FIG. 11B, level 2 cache control logic could be coupled to superscalar processor 200 via processor bus 123. Suitable modifications to the level 2 cache configuration of FIG. 11B will be apparent to those skilled in the art.

Referring again to FIG. 11B, superscalar processor 200 is coupled to a memory controller 121 and to a system controller 150 via a 64-bit processor bus 123. Memory controller 121 provides a 64-bit interface to memory 122 including an 8-bit parity interface to support Error Correcting Codes (ECC). ECC memory is desirable, but optional, and alternative embodiments may forgo the parity interface. System controller 150 provides the interface (or bridge) between the 64-bit processor bus 123 and the 32-bit local bus 151. Local bus 151 is any high-speed I/O bus, for example, a VESA Local bus (VL bus) or Peripheral Component Interconnect (PCI) bus. System controller 150 provides buffering to support the potentially disparate clock rates of processor bus 123 and local bus 151. System controller 150 arbitrates for use of the two busses (123 and 151) and may, in certain configurations, support burst data transactions across the two busses. Suitable designs for interbus bridges, such as system controller 150 (bridging processor bus 123 and local bus 151) and bridge and peripheral controller 160 (bridging local bus 151 and ISA bus 161, as described below) are well known in the art. For example, U.S. Pat. No. 5,414,820, entitled "Crossing Transfers for Maximizing the Effective Bandwidth of a Dual-Bus Architecture," to McFarland et al., the entirety of which is incorporated herein by reference, describes a design suitable for bridging a high-speed system bus and a slower I/O bus. System controller 150 and bridge and peripheral controller 160 are of any such suitable design.

Local bus 151 couples to multiple local bus devices and components (illustratively, to SCSI Adapter 170, IDE controller 180, LAN Adapter 157, and bridge and peripheral controller 160). Certain of the local bus devices and components on local bus 151 may optionally be provided as cards coupled to the local bus 151 by a modular connector. In the embodiment of FIG. 11B, SCSI adapter 170, IDE controller 180, and LAN adapter 157 are provided as cards coupled to the local bus 151 by a modular connector. Bridge and peripheral controller 160 is directly connected to the local bus 151. Alternate configurations (including configurations in which one or more of the SCSI adapter 170, IDE controller 180, and LAN adapter 157 are directly connected to local bus 151) are also suitable and will be appreciated by those skilled in the art. In addition, alternative embodiments may couple a display adapter to local bus 151 thereby taking advantage of the generally higher bandwidth and throughput of local bus 151 for screen updates (when compared to alternatives such as ISA, EISA, and Micro Channel Architecture busses). Because display device requirements are typically less demanding in network server configurations than in personal computer or workstation configurations, display adapter 112 is shown coupled to the lower bandwidth ISA bus 161.

IDE controller 180 is representative of a variety of controller designs (including IDE, enhanced IDE, ATA, and Enhanced Small Device Interface (ESDI) controller designs)

for interfacing storage devices such as disks, tape drives, and CD-ROMs. IDE controller 180 is coupled to two disks (hard disk 181 and floppy disk 182) and to a tape backup unit 183. Alternative configurations may interface an IDE/enhanced IDE CD-ROM via IDE controller 180, although a both a CD-ROM 172 and a CD jukebox 173 are interfaced via a Small Computer System Interface (SCSI) adapter 170 in the embodiment of FIG. 11B. Suitable designs for hard disks, floppy disks, CD-ROMs, and tape drives are all well known in the art and modular components based on those designs are commonly available for IDE, enhanced IDE, and ATA based controller designs. IDE controller 180 is of any such suitable design, including enhanced IDE, ATA, and ESDI alternatives.

SCSI adapter 180 is coupled to local bus 151 and to multiple SCSI devices (illustratively, to a Redundant Array of Inexpensive Disks (RAID) 171, CD-ROM 172, scanner 2016, CD jukebox 173, and a scanner 174) in a daisy chain configuration. For illustrative purposes, the daisy chain of SCSI devices is shown as a bus in FIG. 11B. Additional SCSI devices may also be coupled to SCSI adapter 180 and additional SCSI adapters may be coupled to local bus 151 to provide even larger numbers of SCSI device connections. Additionally, SCSI adapter 180 and/or additional SCSI adapters may be coupled to an Industry Standard Architecture (ISA) bus such as ISA bus 161, although coupling to a local bus such as local bus 151 is generally preferable because of the higher bandwidth and throughput of local busses conforming to standards such as the VL bus or PCI standards.

In addition to the set of SCSI devices shown in FIG. 11B, additional hard disks printers, LAN adapters and other computer systems may be coupled to superscalar processor 200 via a SCSI adapter such as SCSI adapter 180. Additionally, SCSI adapter 180 is representative of suitable alternative device adapters such as SCSI-2 and ESDI adapters. Suitable designs for RAIDs, scanners, CD-ROM jukeboxes, hard disks, CD-ROMs, printers, LAN adapters and tape drives are all well known in the art and modular components based on those designs are commonly available for SCSI adapter designs. SCSI adapter 180 is of any such suitable design, including SCSI-2 and ESDI alternatives.

LAN adapter 157 is coupled to local bus 151 and, in the embodiment of FIG. 11B, provides support for an IEEE 802.3 Carrier Sense Multiple Access with Collision Detection (CSMA/CD) local area network, although adapters for alternative network configurations and for media variations of an 802.3 network are also be suitable. LAN adapter 157 is therefore representative of suitable alternative device adapters such as those based on IEEE 802.x standards (e.g., 802.3 baseband Ethernet on coaxial media, twisted and untwisted pair media, and 10Base-T, 802.3 broadband networks, 802.4 token passing networks, 802.5 token ring networks, etc.), and those based on Fiber Distributed Data Interface (FDDI) standards. Designs for such suitable network adapters are well known in the art and modular components based on those designs are commonly available for both VL bus and PCI bus connections. In addition, suitable designs for network adapters with ISA, SCSI, and SCSI-2 interfaces are also are well known in the art and modular components based on those designs are also commonly available. Alternative embodiments may therefore incorporate LAN adapters such as LAN adapter 157 coupled to superscalar processor 200 via ISA bus 161 or SCSI adapter 180, although coupling to a local bus such as local bus 151 is generally preferable to the ISA bus alternative because of the higher bandwidth and throughput of local busses conforming to standards such as the VL bus or PCI standards. LAN adapter 157 is of any suitable design, for any suitable network topology and medium, and is coupled to any of the suitable bus structures (e.g., VL bus, PCI bus, ISA bus, SCSI, etc.).

ISA bus 161 is coupled to local bus 151 via bridge and peripheral controller 160. Suitable bridges, like system controller 150 bridge, are well known in the art and bridge and peripheral controller 160 is of any suitable design. ISA bus 161 provides a lower-speed (when compared to local bus 151), 16-bit I/O bus and provides modular connections for a variety of peripheral components including display adapter 112, telephony card 136, and a multifunction I/O card such as super I/O 135. Display adapters such as display adapter 112 are well known in the art and provide varying degrees of support for advanced graphics functions. For example, simple text display adapters provide text and character based graphics only. More sophisticated display adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. As described above, display device requirements have typically been less demanding in network server configurations than in personal computer or workstation configurations. As a result, display adapter 112 is shown coupled to the relatively low bandwidth ISA bus 161. However, alternative embodiments may couple an advanced or specialized display adapter to local bus 151 thereby taking advantage of the generally higher bandwidth and throughput of local bus 151 for screen updates (when compared to alternatives such as ISA, EISA, and Micro Channel Architecture busses).

Super I/O 135 provides support for a pointing device 137, a serial port 138, a parallel port 139, and a disk 131. Suitable designs for combination ISA cards such as super I/O 135 are well known in the art and such cards are commonly available. Super I/O 135 is of any such suitable design. Modems may be coupled via serial port 138 and printers may be coupled via either serial port 138 or parallel port 139 provided by super I/O 135. Alternatively, a single function ISA card may be used for such purposes. Modem and fax/modem cards are one example of such a single function card. Telephony card 136 is representative of cards providing voice, fax, and speech recognition, modem, fax-on-demand services, etc. Suitable telephony cards typically conform to standards defining a modular architecture for integrating computer-based application with telephony hardware. These standards include the Communicating Applications Specification (CAS) and the more comprehensive Signal Computing System Architecture (SCSA) standard. Telephony card 136 is of any such suitable design.

Preferably, a high performance server configuration, such as that shown in FIG. 11B, includes a hierarchy of busses with varying performance characteristics each matched to the devices and components coupled thereto. Those skilled in the art will recognize a variety of suitable variations on the bus hierarchy of FIG. 11B, including the elimination of individual busses, the addition of multiple instances of individual busses, and redistribution of devices and components among the various busses. The server configuration of FIG. 11B is representative of all such suitable variations.

A multimedia workstation configuration for superscalar processor 200 shown in FIG. 11C. As with the server configuration of FIG. 11B, the multimedia workstation configuration includes a hierarchy of busses with varying performance characteristics each matched to the devices and components coupled thereto. Those skilled in the art will recognize a variety of suitable variations on the bus hierarchy of FIG. 11C. Memory bus 126 couples superscalar processor 200, cache 127, memory 128, and bridge 129. As with the network server configuration of FIG. 11B, a variety of cache configurations are suitable for a multimedia workstation. In the embodiment FIG. 11C, superscalar processor 200 includes an on-board level 1 cache (e.g, an instruction cache and data cache). A level 2 cache (i.e., cache 127) including control logic is coupled to superscalar processor 200 via memory bus 126. Alternate embodiments of superscalar processor 200, may incorporate functionality of level 2 cache control logic thereby enabling a direct connection to level 2 cache storage. Furthermore, alternative embodiments may relocate all cache support to cache 127, although at least a level 1 cache is preferably on-chip with superscalar processor 200. Suitable modifications to the cache configuration of FIG. 11B will be apparent to those skilled in the art.

As in FIG. 11B, local bus 151 of FIG. 11C is preferably a high speed I/O bus such as a VL bus or PCI bus. SCSI adapter 170, LAN adapter 157, a graphics adapter 114, sound adapter 190, and motion video adapter 195 are coupled to each other and to superscalar processor 200 via I/O bus 151. SCSI adapter 170, LAN adapter 157, and an expansion bus bridge 160, together with the components and devices coupled to each are comparable to corresponding adapters, components, and devices discussed above with reference to FIG. 11B.

In particular, SCSI adapter 170 is coupled to multiple SCSI devices (illustratively, disk 175, tape backup unit 176, and CD-ROM 172) in a daisy chain configuration. For illustrative purposes, the daisy chain of SCSI devices is shown as a bus. Additional SCSI devices may also be coupled to SCSI adapter 170. Suitable designs for SCSI adapter 170 are discussed above. Variations on the set of SCSI devices, and on SCSI configurations in general (each of which has been described above with reference to FIG. 11B) are also applicable in the multimedia workstation configuration of FIG. 11C. Similarly, suitable designs and variations on LAN adapter 157 are also described above in the context FIG. 11B. Furthermore, suitable designs and variations on expansion bus 161 are described above in the context of FIG. 11B. As described above, suitable designs for bridge 160 and ISA bus 161 are well known in the art and modular components based on such suitable designs are commonly available.

In accordance with an embodiment of superscalar processor 200, superscalar processor 200 may contain a multimedia unit 256 for executing multimedia extensions to the x86 instruction set. Referring again to FIG. 11C, multimedia adapters, such as sound adapter 190, motion video adapter 195, and graphics adapter 114, are each coupled to superscalar processor 200 via busses 151 and 126 to provide for high-bandwidth transfers of multimedia data between the multimedia adapters, memory 128, and secondary storage devices (e.g., disk 175). Sound adapter 190 provides digital-to-analog (D/A) and analog-to-digital (A/D) interfaces for respectively synthesizing and sampling audio signals. The A/D and D/A interfaces of sound adapter 190 are respectively coupled to a microphone 191 and a speaker 192. Suitable designs for sound cards are well known in the art and sound adapter 190 is of any such suitable design.

Motion video adapter 195 provides support for capture and compression of video signals, for example, from video camera 196. In addition, motion video adapter 195 supplies a display device 198 such as a television, high-definition television, or a high resolution computer monitor with display signals via a frame buffer 197. Alternative embodiments of motion video adapter 195 may eliminate frame buffer 197 and directly drive a raster display. Furthermore, alternative embodiments of motion video adapter 195 may decouple the video input and video output functionality of motion video adapter 195, and instead provide separate video input and video output components.

Because video information requires large amounts of storage space, it is generally compressed. Accordingly, to display compressed video information, for example from data represented on a compact disk in CD-ROM 172, the compressed video information must be decompressed. High bandwidth burst mode data transfers are supported by I/O bus 151, which is preferably a local bus such as PCI with support for arbitrary length burst data transfers. In the multimedia workstation configuration of FIG. 11C, video compression and decompression can be performed by superscalar processor 200 (executing multimedia instructions in a multimedia unit) and/or by motion video adapter 195. Thus, memory bus 126 and bridge 129 preferably support burst data transfers across bridge 129 between memory bus 126 and I/O bus 151. Suitable designs for motion video adapters typically provide support for the Motion Pictures Expert Group (MPEG) standards for video encoding and decoding (e.g., MPEG-1 and MPEG-2) and for JPEG. In addition, motion video adapter 195 may support video conferencing by providing implementing video compression/decompression algorithms in accordance with H.261 (the standard compression algorithm for H.320 videoconferencing). Suitable designs for implementing such compression/decompression algorithms are well known in the art and motion video adapter 3021 is of any such suitable design. Graphics adapters such as graphics adapter 114 are well known in the art and provide varying degrees of support for advanced graphics functions. For example, graphics adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. Suitable designs for graphics adapters are well known in the art and modular components based on these designs are commonly available. Graphics adapter 114 is of any such suitable design. Alternative embodiments my combine the graphics display functionality of graphics adapter 114 with the motion video display functionality of motion video adapter 195 outputting on a single high-resolution display device.

X. Conclusion

Although the present invention has been described with reference to particular embodiments, the description is only an example of the invention's application and should not be taken as a limitation. Various adaptations and combinations of features of the embodiments disclosed are within the scope of the present invention.

Section A: RISC86™ Syntax

This section describes op-codes according to the RISC86™ syntax illustrated in FIG. 3.

RegOp DEFINITIONS

Bits 36 and 37 of an Op-code are 00 to identify a RegOp. Bits 10 and 11 are unused and should be 00.

A.1 RegOp Type Field Encoding

|  | Type | DSz≠1b | DSz=1b | cc-dep | RUX-only |
|---|---|---|---|---|---|
| ALU Ops | 00000x | ADD/INC | ADD/INC | | |
| | 00001x | MOV/OR | OR | | |
| | 00010x | ADC | ADC | ♦ | ♦ |
| | 00011x | SBB | SBB | ♦ | ♦ |
| | 001000 | AND/EAND | AND | | |
| | 001001 | BAND | | | |
| | 00101x | SUB/ESUB | | | |
| | 00110x | EXOR/XOR | | | |
| | 00111x | CMP | CMP | | |
| Shift Ops | 010000 | SLL | SLL | | ♦ |
| | 010001 | BLL | SLL | | ♦ |
| | 01001x | SRL | SRL | ♦ | ♦ |
| | 01010x | SLC/RLC | | ♦ | ♦ |
| | 01011x | SRC/RRC | | ♦ | ♦ |
| | 01100x | SLA | SLA | | ♦ |
| | 01101x | SRA | SRA | | ♦ |
| | 01110x | SLD/RLD | RLS | | ♦ |
| | 01111x | SRD/RRD | RRS | | ♦ |
| Move and Other Ops | 10000x | RDFLG | | ♦ | |
| | 100010 | SEXT | | | |
| | 100011 | ZEXT | | | |
| | 100100 | RDFLGS | DAA | ♦ | ♦ |
| | 100101 | RDFLGS | DAS | ♦ | ♦ |
| | 10011x | MOVcc | | ♦ | ♦ |
| | 101000 | MUL1S | | | ♦ |
| | 101001 | MLU1U | | | ♦ |
| | 101010 | MULEH | | | ♦ |
| | 101011 | MULEL | | | ♦ |
| | 101100 | DIV1 | | | ♦ |
| | 101101 | DIV2 | | | ♦ |
| | 101110 | DIVER | | | ♦ |
| | 101111 | DIVEO | | | ♦ |
| Spec. Reg. Ops | 11000x | RDxxx | | ♦ | ♦ |
| | 11001x | | | ♦ | |
| | 1101xx | | | ♦ | ♦ |
| | 111000 | WRDR | | | ♦ |
| | 111001 | WRDL | | | ♦ |
| | 11101x | WRxxx | | | ♦ |
| | 111100 | CHKS | | | ♦ |
| | 111101 | WRDH | | | ♦ |
| | 11111x | WRIP | | | ♦ |

Mnemonics separated by a "/" have identical Type fields and are treated identically by register units 253 and 254. These Regops differ in status modifications indicated by fields Ext and SS and committed by OCU 260.

The Type field is interpreted differently based on field DSz. As illustrated above, execution units perform one operation for a byte-size RegOp and another operation for a 16/32-bit size RegOp.

All byte-size RegOps and all RegOps having type field of the form x1xxxx, 1x1xxx, or xx01xx are RUX-only operations.

Hardware treats all RegOps with Type field values of the form xx01xx as "cc-dependent" and thus synchronizes execution of the operation with status operand forwarding.

A.2 RegOp Extension Field Ext[3:0]

For MOVcc Op's, {Type[0],Ext[3:0]} specifies a 5-bit condition code.

For RDxxx/WRxxx Op's, {Type[0],Ext[3:0]} specifies a 5-bit special register number. For WRFLG(.cc) the spec register number encoding matches the StatMod value desired if ".cc" is specified. For RDSEG Ops, Ext[3:0] specifies a 4-bit segment (selector) register. The set of segment registers include x86 architectural registers and additional special segment registers.

| Reg. # | Name | Use |
|---|---|---|
| 0000 | ES | x86 Architectural |
| 0001 | CS | x86 Architectural |
| 0010 | SS | x86 Architectural |
| 0011 | DS | x86 Architectural |
| 0100 | FS | x86 Architectural |
| 0101 | GS | x86 Architectural |
| 0110 | HS | Temporary |
| 0111 | — | |
| 100x | TS | Descriptor table "seg. reg." (GDT or LDT) |
| 1010 | LS | Linear "seg. reg." ("null" segmentation) |
| 1011 | MS | Emulation memory seg. reg. |
| 11xx | OS | Effective (arch.) data seg. reg. |

The OS segment register is replaced at Op decode time by the current 3-bit register number from the emulation environment.

For other operations with field SS=1, {Type[0],Ext[3:0]} specifies four Status Modification bits (as stored in scheduler 280).

A.3 RegOp Operation/Data Size Field DSz[2:0]

Field Dsz indicates a data size for the operation.

| DSz [2:0] | Operation/Data Size |
|---|---|
| 0 0 0 | 1 byte |
| 0 0 1 | 2 bytes |
| 0 1 0 | 4 bytes |
| 0 1 1 | DSize |
| 1 0 0 | ASize |
| 1 0 1 | SSize |

Sizes DSize, ASize, and SSize are placeholders which are replaced with corresponding environmental variables during environmental substitution.

A.4 RegOo RUX-only Field R1

R1 is set to indicate the RegOp is issuable only to register unit 251.

A.5 RegOp Destination Field Dest[4:0]

Field Dest[4:0] holds a 5-bit general register number identifying a destination register for the operation.

A.6 RegOp First Source Field Scr1[4:0]

Field Scr1[4:0] holds a 5-bit general register number identifying a first source register for the operation.

A.6 RegOp Set Status Field SS

Field SS is set to indicate the operation modifies the status flags indicated by field Ext.

A.6 RegOp Field I

Field I indicates whether field Imm8/Src2 contains an immediate value or a register number.

A.6 RegOp Field Imm8/Src2[7:0]

Field Imm8/Src2 holds an immediate value or a register number for a second source operand. If I=0, Imm8/Src2[4:0] contains a 5-bit register number. If I=1, Imm8/Src2[7:0] specifies an 8-bit signed immediate value which is sign extended to a size indicated by field DSz.

LdStOp Definitions

Bits 37 and 36 of an Op-code are 0 and 1 to indicate a LdStOp.

A.7 LdStOp Type Field Type[3:0]

| Type [3:0] | Mnemonic | Operation |
|---|---|---|
| 0000 | LD | Load integer (int.) data |
| 0001 | LDF | Load floating point (f.p.) data. |
| 0010 | LDST | Load int. data with store check |
| 0011 | LDM | Load multimedia (m.m.) data |
| 0100 | CDAF | CDA plus flush cache line(s) |
| 0101 | — | |
| 0110 | LDSTL | Load int. w/store check, locked |
| 0111 | LDMSTL | Load m.m. w/store check, locked |
| 1000 | ST | Store int. data |
| 1001 | STF | Store f.p. data |
| 1010 | STUPD | Store int. w/ base register update |
| 1011 | STM | Store m.m. data |
| 1100 | CDA | Check data effective address |
| 1101 | CIA | Check instruction effective address |
| 1110 | TIA | TLB Invalidate Address |
| 1111 | LEA | Load effective address |

A.8 LdStOp Address Calculation Size Field ASz[1:0]

Before emcode environmental substitution, field ASz[1:0] indicates the address calculation size as follows.

| ASz [1:0] | Size |
|---|---|
| 00 | ASize |
| 01 | SSize |
| 10 | 4 bytes |
| 11 | DSize |

Emcode environmental substitution changes ASize, SSize, or DSize to the appropriate fixed size.

A.9 LdStOp Data Size Field DSzr[1:0]

| | For LDF, STF, LDM, STM | | For Other Ops | |
|---|---|---|---|---|
| DSZ | Before | After (LDF, STF only) | Before | After |
| 00 | FpDSize | — (LDF, STF only) | 1 byte | 1 byte |
| 01 | 2 bytes | 2 bytes | 2 bytes | 2 bytes |
| 10 | 4 bytes | 4 bytes | 4 bytes | 4 bytes |
| 11 | 8 bytes | 8 bytes | DSize | — |

A.10 LdStOp Data Field Data[4:0]

Field Data indicates a 5-bit general register number for the store source or load destination register.

A.10 LdStOp Segment Field Seg[3:0]

Field Seg[3:0] identifies a segment register.

A.11 LdStOp Base Operand Field Base[3:0]

Field Base contains a 4-bit register number indicating a general register in the lower half of the register file. The value from the register is the base for the address calculation.

A.12 LdStOp Index Field Index[3:0]

Field Base contains a 4-bit register number indicating a general register in the lower half of the register file. The value from the register is use as an address index which is scaled and added to the base during an address calculation.

A.13 LdStOp Index Scale Factor Field ISF[1:0]

Field ISF indicates the index should be scaled by a factor of 1, 2, 4, or 8.

A.14 LdStOp Large Displacement Field LD

Field LD indicates whether the operation uses a large (32-bit) displacement from a preceding LIMMOp or small (8-bit) displacement from field Disp8.

A.15 LdStOp Small Displacement Field Disp8[7:0]

Field Disp8[7:0] contains an 8-bit displacement which is sign extended to a size indicated by field ASz.

LIMMOp Definitions

Bits 37 and 36 of an Op-code are 11 to indicate a LIMMOp.

A.16 LIMMOp Immediate Fields ImmHi and ImmLo

Fields ImmHi[14:0] and ImmLo[16:0] respectively contain the most significant 15 bits and the least significant 17 bits of a 32-bit immediate value.

A.17 LIMMOp Destination Field Dest[3:0]

Field Dest[3:0] stores a 4-bit register number indicating a destination for the immediate value.

Note: the standard NO-OP is "LIMM t0,<undefined>" which is loaded into scheduler in a completed state and is committed by writing an immediate value <undefined> to a register t0 which is not changed by writing.

SpecOp Definitions

Bits 37 and 36 of an Op-code are 10 to indicate a SpecOp. Bit 35 is set for the SpecOps described in this section but cleared for FpOps.

A.18 SpecOp Type Field Type[3:0]

| Type | Mnemonic | Operation |
|---|---|---|
| 00xx | BRCOND | Branch condition |
| 010x | LDDHA | Set default fault handler address 1 |
| 011x | LDAHA | Set alternate fault handler address 1 |
| 100x | LDK | Load constant |
| 101x | LDKD | Load constant, data |
| 11xx | FAULT | Unconditional fault |

A.19 SpecOp Condition Code Field cc [4:0]

Field cc[4:0] contains a 5-bit condition code for BRCOND operations. Bits cc[4:1] specify the condition to be tested as follows.

| cc [4:1] | Mnemonic | Condition |
|---|---|---|
| 0 0 0 0 | True | 1 |
| 0 0 0 1 | ECF | ECF |
| 0 0 1 0 | EZF | EZF |
| 0 0 1 1 | SZnZF | ~(~EZFZF) |
| 0 1 0 0 | MSTRZ | ~EZF·~IP·~(DTF+SSTF) |
| 0 1 0 1 | STRZ | ~EZF·~IP·~(DTF+SSTF) |
| 0 1 1 0 | MSTRC | ~ECF·~IP·~(DTF+SSTF) |
| 0 1 1 1 | STRZnZF | ~EZF·~IP·~(DTF+SSTF)·ZF |
| 1 0 0 0 | OF | OF |
| 1 0 0 1 | CF | CF |
| 1 0 1 0 | ZF | ZF |
| 1 0 1 1 | CvZF | CF+ZF |
| 1 1 0 0 | SF | SF |
| 1 1 0 1 | PF | PF |
| 1 1 1 0 | SXOF | SF ^ OF |
| 1 1 1 1 | SxOvzF | SF ^ OF + ZF |

Bit cc[0] specifies whether the condition or its compliment is evaluated for truth.

In the above definitions, "~", "·", "+", and "^" indicate logical NOT, AND, OR, and XOR operations, respectively. OF, SF, ZF, AF, PF, and CF are standard x86 status bits. EZF and ECF are an emulation zero flag and an emulation carry flag that emcode uses in sequences implementing x86 instructions when architectural zero flag ZF and carry flag CF are not changed. IP, DTF, and SSTF are signals indicating an interrupt pending, a de-bug trap flag, and single step trap flag respectively.

Branch conditions STRZ and MSTRC are logically identical and are used in implementing x86 instructions such as a move string instruction MOVS. For such x86 instructions, emcode stores an index in a register and creates a loop that ends with a BRCOND. Each iteration of the loop moves a chunk of data and decrements the index. Branch prediction initially predicts that the BRCOND branches to the beginning of the loop. Condition MSTRC indicates that branch evaluation logic 257 is to signal instruction decoder 240 when the index reaches a predefined point near completion of the x86 instruction. Decoder 240 then changes the branch prediction for the BRCOND being loaded into scheduler 280. Accordingly, a mispredicted branch and associated abort can be avoided when looping is complete. The improves processor efficiency.

A.20 SpecOp Data Size Field DSz[1:0]

Field DSz[1:0] indicates a data size 1 byte, 4 bytes, or DSize for load constant operations LDK and LDKD.

A.21 SpecOp Destination Field Dest[4:0]

Field Dest holds a 5-bit register number which is the destination of operation LDK and LDKD.

A.21 SpecOp Immediate Field Imm17[16:0]

Field Imm17[16:0] contains a 17-bit constant, a 17-bit signed immediate, or 14-bit Op address.

General Register Definitions

There are 24 integer general registers. The first eight registers correspond to the x86 general registers AX to DI. The remaining sixteen registers serve as temporary or scratch registers used within multiple operation sequences implementing CISC instructions. The operations which use 5-bit register numbers can access 32 registers, and remaining register numbers not used for integer registers can be multimedia registers or placeholders for environmental variable substitution.

The x86 integer register set supports addressing, for byte operations of either of the lower two bytes of half of the registers (AX, CX, DX, and BX). Based on register size specification, the 3-bit register numbers within x86 instructions are interpreted as either hi/lo byte registers or as word/dword registers. From an operation perspective, this size is specified by either the ASz or DSz field of the operation. (ASz for Base and Index registers in LdStOps; and generally DSz for Data/Dest, Src1, and Src2 registers). The scratch integer register set supports similar addressing of the lower two bytes of again half of registers (t1–t4 and t8–t11).

The following table maps register numbers 1 to 24 to named register.

| Reg·Num· | Register Name Size≠1 byte | Register Name Size=1 byte |
|---|---|---|
| 00000 | AX | AL |
| 00001 | CX | CL |
| 00010 | DX | DL |
| 00011 | BX | BL |
| 00100 | SP | AH |
| 00101 | BP | CH |
| 00110 | SI | DH |
| 00111 | DI | BH |
| 01000 | t1 | t1L |
| 01001 | t2 | t2L |
| 01010 | t3 | t3L |
| 01011 | t4 | t4L |
| 01100 | t5 | t1H |
| 01101 | t6 | t2H |
| 01110 | t7 | t3H |
| 01111 | t0/_ | t4H |

-continued

| Reg·Num· | Register Name Size≠1 byte | Register Name Size=1 byte |
|---|---|---|
| 10000 | t8 | t8L |
| 10001 | t9 | t9L |
| 10010 | t10 | t10L |
| 10011 | t11 | t11L |
| 10100 | t12 | t8H |
| 10101 | t13 | t9H |
| 10110 | t14 | t10H |
| 10111 | t15 | t11H |

Mnemonics "t0" and "_" are synonyms for a register that can be written to but always returns a value zero when read. "_" is typically used in a context where an operand or result value is a don't care. As indicated above register t0 cannot be referenced in byte mode.

Section B: Pseudo-RTL Descriptions

Tables in this section describe logic which generates signals used throughout the exemplary embodiment of processor 200. Each table may use signals described in other tables without further explanation or reference to the other tables. Signals described in this section are asserted or active high unless expressly indicated otherwise.

The following notations are used. "~" indicates the complement or inverse of a signal such as would be provided by an inverter. Signals connected via a "·", "," and "&" are combined as a logical AND such as could be implemented by an AND gate. Signals connected via a "+" are combined as a logical OR such as could be implemented by an OR gate. Signals connected via a "^" are combined as a logical exclusive OR such as could be implemented by an XOR gate. The notation "if (a) x=b else x=c" or alternatively "if (a) x=b:c" indicates a multiplexer with an output signal x equal to signal b if signal a is assert and signal x equal to c otherwise. If "else x=c" is omitted, signal x is low if signal a is low. Another notation which represents a multiplexer is "x=switch (A) case A1: x1 case A2: x2 . . . case An: xn" where output signal x has values x1 or x2 or . . . xn depending on the value of a multibit select signal A. Where cases are omitted as in "x=switch (A) x1:x2: . . . xn", output values x1 to xn correspond to sequential values of signal A. Most signals described change each clock cycle. Notation @ (clock) indicates a signal is latched into a register at an edge of signal clock for use in a subsequent clock cycle.

As will be understood by those skilled in the art, the logic described below can be implemented in a variety of ways.

Table B.1 Static Field Storage Element Operation
always @(posedge CLK)
if (LdEntry[i]) // Shift control from global control
  OpField[i] =OpField[i−1] // load preceding Op value
Table B.2 Dynamic Field Storage Element Operation
if (LoadNewValue[i]) // if logic loads a new value
  NewOpField[i] =NewValue[i]; // load a new value else
  NewOpField[i]=OpField[i];
if (LdEntry[i]) // if logic shifts value
  NextOpField[i] =NewOpField[i−1]; // advance FIFO
else
  NextOpField[i] =NewOpField[i];
always @(posedge CLK)
  OpField[i]=NextOpField[i];
Global control logic 520 for scheduler 280 generates independent signals LdEntry[i] which select a signal loaded into a respective flip-flop.

The notation xxOp.yyy refers to an input signal to operation decoder 510 indicating a value from a field yyy defined for a RISC86 instruction of type xxOp. For example, RegOp.Src1 refers to bits in an instruction at the same position as the Src1 field of a RegOp. FIG. 3 and Section A define an exemplary field definition for a RegOp, a LdStOp, a LIMMOp, and a SpecOp.
Table B.3 Field Type
Type[2:0] switch(OpId) {
  case RegOp: Type[2,1] = 'b11,
    Type[0] = ~(RegOp.R1 +RUYD)
  case LdStOp: Type[2] = LdStOp.Type[3],
    Type[1] = LdStOp.Type[3],
    Type[0] = LdStOp.Type[3] ·~(LdStOp.Type[2]
      ·LdStOp.Type[1])
  default: Type[2:0] = 'b000
}
"RUYD" is a special register that disables the second register unit RUY for debugging.
Table B.4 Field LD_Imm
LD_Imm =(OpId=RegOp) ? RegOp.I : LdStOp.LD
  //don't care if not RegOp or LdStOp
Table B.5 Field Src1Reg
  if (OpId=RegOp) Src1Reg =RegOp.Src1;
    Src1Reg[2] &= ~(LdStOp.DSz=1B)
  else Src1Reg = {1'b0,LdStOp.Base}
  //don't care if not RegOp or LdStOp
Table B.6 Field Src2Reg
  if (OpId=RegOp) Src2Reg =
    RegOp.Src2; Src2Reg[2] &= ~(LdStOp.DSz=1B)
  else Src2Reg = {1'b0,LdStOp.Index}
  //don't care if not RegOp or LdStOp
Table B.7 Field SrcStRec
  SrcStReg = LdStOp.Data
  SrcStReg[2] = SrcStReg[2]·~(LdStOp.DSz=1B
    LdStOp.DataReg=t0)
  //don't care if not StOp
Table B.8 Field DestReg
  if (OpId=LIMMOp) DestReg = {1'b0,LIMMOp.Dest}
  elseif ((OpId=LdStOp)·(LdStOp.Type=STUPD))
    DestReg = {1'b0,LdStOp.Base}
  else { DestReg = LdStOp.Data
    DestReg[2] = DestReg[2]·~(LdStOp.DSz=1B)
  }//don't care if non-STUPD StOp
Table B.9 Fields Src1BM, Src2BM, and Src12BM
  if (OpId=RegOp) {
    Src1BM[0] = ~(RegOp.DSz=1B) + ~RegOp.Src1[2]
    Src1BM[1] = ~(RegOp.DSz=1B) + RegOp.Src1[2]
    Src2BM[0] = ~(RegOp.DSz=1B) + ~RegOp.Src2[2]
      +RegOp.I
    Src2BM[1] = ~(RegOp.DSz=1B) + RegOp.Src2[2]
      ~RegOp.I
    if (RegOp.Type=10001x) Src2BM(1] =
      Src1BM[1] =1'b0 //if ZEXT,SEXT
    Src12BM[2] = (RegOp.DSz=4B)
    if (RegOp.Type=(10001x + 111x00)) Src12BM[2]=1'b0
      //if ZEXT,SEXT,CHKS
  } else { //else LdStOp or don't care
    Src1BM[1:0] = Src2BM[1:0] = 2'b11
    Src12BM[2] = (LdStOp.ASz=4B)
  } // don't-care if LIMM
Table B.10 Field SrcStBM
  if (LdStOp.Type=x0xx) { //STxx Ops
    SrcStBM[0] = ~(LdStOp.DSz=1B) +
    ~LdStOp.Data[2]

SrcStBM[1] = ~(LdStOp.DSz=1B) +
      LdStOp.Data [2]
    SrcStBM[2] = (LdStOp.DSz=4B)
  } else
    SrcStBM[2:0] = 'b000 //CDA,CIA,LEA Ops
  //don't care if not a Stop
Table B.11 Field OpInfo
  OpInfo[12] = Op[35]
//Prevents LIMM from looking like various exception Ops
  OpInfo[11:8] = (OpId=LIMMOp) ? 'b1111 : Op[34:31]
  OpInfo[7:0] = Op[30:25], Op[23:22]
Table B.12 State Field
Operation decoder 510 initializes field State[3:0] either as b0000 (unissued) or b1111 (completed) according to the OpId field of the corresponding RISC86 instruction.
State = (~OpQV + OpId=SpecOp·SpecOp.Type=(LDKxx +
  LDXHA) + OpId=LIMMOp) ? 'b1111: 'b0000
Field State (signals S0, S1, S2, and S3) change during operation execution as follows.
  if (S0Enb1) S0 = ~BumpEntry + SC_Abort
  if (S1Enb1) S1 = (S0—BumpEntry) + SC_Abort
  if (S2Enb1) S2 = S1 + SC_Abort
  if (S3Enbl) S3 = S2 + S1·RU + SC_Abort
BumpEntry =RU·18 S1·S0·(Exec1·BumpRUX +
  ~Exec1·BumpRUY)
S0Enb1=IssueOpToLU[i]·CHP_LUAdv0 +
  IssueOpToSU[i]·CHP_SUAdv0 +
  IssueOpToRUX[i]·CHP_RUXAdv0 +
  IssueOpToRUY[i]·CHP_RUYAdv0 +
  SC_Abort + BumpEntry
S1Enb1 = LU·CHP_LUAdv0 + SU·CHP_SUAdv0 +
  RU·(Exec1·CHP_RUXAdv0 + ~Exec1·CHP_
  RUYAdv0) +
  SC_Abort
S2Enb1 = LU·CHP_LUAdv1 + SU·CHP_SUAdv1 + RU +
  SC_Abort
S3Enb1 = LU·CHP_LUAdv2 + SU·CHP_SUAdv2 + RU +
  SC_Abort
Signal SC_Abort is asserted to abort execution of operations currently in scheduler 280. Signals IssueOpToLU[i], IssueOpToSU[i], IssueOpToRUX[i], and IssueOpToRUY[i].
Table B.13 Field Exec1
Operation decoder 510 initializes field Exec1 to low.
  Exec1 =X
Subsequently, field Exec1 changes as follows.
  if (S0Enb1) Exec1=IssueOpToRUX
Signal IssueOpToRUX is generated within the entry during the issue selection scan chain for register unit 253.
Table B.14 Field DestBM
Operation decoder 520 initializes field DestBM according to the operation to indicate which bytes of the destination register will be modified.
if (OpId=LIMMOp) {
  if (LIMMOp.DestReg=t0) DestBM='b000
  else DestBM = 'b111
}elseif (OpId=LdStOp·LdStOp.Type=STUPD) {
  DestBM[1:0] = 2'b11
  DestBM[2] = (LdStOp.ASz=4B)
}else {
  DestBM[0] = ~(LdStOp.DSz=1B) +~LdStOp.Data[2]
  DestBM[1] = ~(LdStOp.DSz=1B) + LdStOp.Data[2]
  DestBM[2] = (LdStOp.DSz=4B) } if (~OpQV + DestReg ='b01111 +
(OpId=LdStOp·LdStOp.Type=ST/STF)) DestBM = 3'b0
// if invalid or dest is to, store no dest reg
Field DestBM is cleared as follows:
if (SC__Abort) DestBM =3'b0
Table B.15 Field DestVal
Operation decoder 510 generates field DestVal from the associated RISC86 instruction using the following logic.
DestVal = switch(OpId) {
   case RegOp: sext(RegOp.Imm8)
   case LdStOp: sext(LdStOp.Disp8)
   case LIMMOp: {LIMMOP. ImmHi,LIMMOp.ImmLo}
   case SpecOp: if (SpecOp.Type=BRCOND~DEC__
     OpQSel__E)
   DEC__AltNextIPC
   else sext(SpecOp.Imm17) }
Follow execution of the operation field DestVal changes as follows.
if ((~S2 + LU)·~S3·S1) DestVal = switch (Type)
   case LU: DC__DestRes
   case SU: SU1__DestRes
   case (RU·Exec1): RUX__DestRes
   case (RU·~Exec1): RUY__DestRes
where signals DC__DestRes, SU1__DestRes, RUX__DestRes, and RUY__DestRes are from the execution unit that executed the operation.
Table B.16 Field StatMod
Operation decoder 510 sets field StatMod according to the associated operation.
StatMod = (OpQV·(OpId=RegOp)·RegOp.SS) ?
   RegOp.Ext : 4'b0 //OPQV:see below
Logic in scheduler 280 clears field StatMod during an abort.
if (Exec1·~S3·S1·RUX__NoStatMod + SC__Abort)
   StatMod =4'b0
Table B.17 Field StatVal Generation Logic
Field StatVal is initially zero.
StatVal = 8'bX
and changes when a RegOp is completed.
if (~S3·S1) StatVal =
   (Exec1) ? RUX__StatRes : RUY__StatRes
Table B.18 Fields OprndMatch-XXsrcY
Fields OprndMatch__XXsrcY pass information from the issue stage to operand forward stage of each processing pipeline (or, in one case, from stage 1 to stage 2 of SU), values are controlled by global signals XXAdvY (more specifically XXAdv0 or SUAdv2).
if (LUAdv0) { OprndMatch__LUsrc1 = . . .
   OprndMatch__LUsrc2 = . . . }
if (SUAdv0) { Oprndmatch SUsrc1 =
   OprndMatch__SUsrc2 = . . . }
if (SUAdv2) { OprndMatch__SUsrcSt =. . .}
if (RUXAdv0) { OprndMatch__RUXsrc1 =. . .
   OprndMatch__RUXsrc2 =. . . }
if (RUYAdv0) { OprndMatch__RUYsrc1 =
   OprndMatch__RUYsrc2 =. . .}
Table B.19 Field DBN
Field DBN is initially zero.
DBN=4'b0
and changes during execution as follows.
if ((AdvLU2 + AdvSU2)·~S3·S2) DBN[3:0] =(DBN__LU [3:0]·LU) +(DBN__SU[3:0]·SU)
Table B.20 Op Quad Field Emcode
Emcode = DEC__OpQSel__E + DEC__Vec2Emc //treat vectoring Op quad as part of emcode
Table B.21 OD Quad Field Eret
   Eret = DEC__OpQSel__E·EDR__Eret
Table B.22 OD Quad Field FaultPC
   FaultPC = DEC__IPC
The logical PC for the first decoded x86 instruction in Op quad.
Table B.23 OD Quad Field BPTInfo
   BPTInfo = DEC__BPTInfo
Information from the current BPT access.
Table B.24 OD Quad Field RASPtr
   RASPtr = DEC__RASPtr
The current return address stack.
Table B.25 Op Quad Field OpQV
Operation decoder 510 initially sets field OpQQV to indicate whether the Op quad loaded into the top of scheduler 280 is valid.
   OpQV = ((DEC__OpQSel__E) ? EDR__OpQV : DEC__
     OpQV ExcpAbort~(SC__MisPred~·BrAbort)
This multiplexer is not unique; all new Op quad fields come from similar (but 3:1) multiplexers see OCU description for description of ExcpAbort.
Field OpQv can later be cleared after an abort to invalidate an Op quad and prevent execution or commitment.
   if (SC__Abort) OpQV='b0
Table B.26 OD Quad Field LimViol
   LimViol=~b0
Field LimViol is actually loaded one cycle later than all of the other fields above (i.e. during the first cycle that the new Op quad is resident and valid within the scheduler. This is reflected in the description above of this Op quad field.
@clk: LdLV = LdEntry0·~DEC__OpQSel__E
//a simple flip-flop
if (LdLV) LimViol=DEC__LimViol
//see below for LdEntryo
Table B.27 Shift Control Logic
Signals LdEntry0 to LdEntry5 control loading of row 0 (with a new Op quad) to loading row 5 (with an Op quad from row 4) as described in regard to FIG. 6. In this table, input signal OpQRetire, from OCU 260, indicates when a valid Op quad in the bottom row of scheduler 280 can be retired and input signals HoldOpQ3, HoldOpQ4A, and HoldOpQ4B indicate whether condition code evaluation has held up an operation in row 3 or 4.
HoldOpQ45=(HoldOpQ3+HoldOpQ4A+HoldOpQ4B)·~
   (SC__MisPred+Q4PendLdStAbort+"trap pending")
LdEntry5=(OpQRetire+~OpQV__5)·~HoldOpQ45
LdEntry4=(OpQRetire+~OpQV__5+~OpQV__4)
   ·~HoldOpQ45
LdEntry3=LdEntry4+~OpQV__3
LdEntry2=LdEntry4+~OpQV__3+~OpQV__2
LdEntry1=LdEntry4+~OpQV__3+~OpQV__2 +~OpQV__1
LdEntry0=LdEntry4+~OpQV__3+~OpQV__2 +~OpQV__
   1+~OpQV__0+BrAbort
SchedFull=LdEntry0 +SC__MisPred·~BrAbort
SchedEmpty=~(OpQV__0+OpQV__1+OpQV__2+OpQV__
   3+OpQV__4+OpQV__5)
B.28 Single-Entry Issue Scan Terms
Single-entry terms are:
LU: ~Pi=Ki=IssuableToLU[i]=LUi·~SOi
SU: ~Pi=Ki=IssuableToSU[i]=SUi·~Soi
RUX: ~Pi=Ki=IssuableToRUX[i]=RUi·~SOi
RUY: ~Pi=Ki=IssuableToRUY[i]=RUYi·~SOi
   Oi=Gi=IssuableToRUX[i] =RUi·~SOi
IssuableToxx="State=Unissued" ·"Executable by xx" where "State=Unissued" is ~SO and "Executable by xx" is equal to LU/SU/RU/RUY for execution pipelines LU/SU/RUX/RUY respectively. Type bits LUi, SUi, RUi, RUXi as used here are: LU=1 for LdOps; SU=1 for StOps (including operations such as LEA); RU=1 for all RegOps; and RUY=1 for RegOps executable by RUY.

Table B.29 LU, SU, and RUX Look-ahead Scan Chains

Six single-entry signals to form four group propagate signals XXPgrp[3:0] and group kill signals XXKgrp[3:0] for scan chain XX where XX is LU, SU, or RUX. Each group signal corresponds to a quadrant of scheduler 280. The following are group signals for the first quadrant (quadrant 0) which includes entries 0 to 5 for one of the scan chains.

XXPgrp0=P0·P1·P2·P3·P4·P5=~(K0+K1+K2+K3+K4+K5)
XXKgrp0=K0+K1+K2+K3+K4+K5
=~(P0·P1·P2·P3·P4·P5)

where P0 to P5 and K0 to K5 are the single-entry terms for six consecutive entries and pipeline XX.

A group contains the selected instruction if its group kill signal XXKgrp is asserted and no older group kills the scan bit. A bit from XXIssueQuadrant[0:3] is asserted to identify the group containing the operation selected for issue to pipeline XX. Signals XXIssueQuadrant[0:3] are generated as follows.

XXIssueQuadrant3=XXKgrp3
XXIssueQuadrant2=XXKgrp2·~XXKgrp3
XXIssueQuadrant1=XXKgrp1·~XXKgrp2·~XXKgrp3
XXIssueQuadrant0=
    XXKgrp0·~XXKgrp1·~XXKgrp2·~XXKgrp3
XXNoneIssued=
    ~XXKgrp0·~XXKgrp1·~XXKgrp2·~XXKgrp3

Signals IssueToXX[i] to indicate the operation issued, if any, issued to pipeline XX and is generated from signals IssueQuadrant and single-entry kill terms IssuableToXX as follows.

IssueOpToXX[5]=XXIssueQuadrant[0]·IssuableToXX[5]
IssueOpToXX[4]=XXIssueQuadrant[0]·~IssuableToXX[5]=IssuableToXX[4]
IssueOpToXX[3]=XXIssueQuadrant[0]·~IssuableToXX[5]·~IssuableToXX[4]·IssuableToXX[3]
IssueOpToXX[2]=XXIssueQuadrant[0]·~IssuableToXX[5]·~IssuableToXX[4]·~IssuableToXX[3]·IssuableToXX[2]
IssueOpToXX[1]·~XXIssueQuadrant[0]·~IssuableToXX[5]·~IssuableToXX[4]·~IssuableToXX[3]·~IssuableToXX[2]·~IssuableToXX[0]·IssuableToXX[1]
IssueOpToXX[0]=XXIssueQuadrant[0]·~IssuableToXX[5]·~IssuableToXX[4]·~IssuableToXX[3]·~IssuableToXX[2]·~IssuableToXX[0]·~IssuableToXX[1]·IssuableToXX[0]

Table B.30 RUY Scan Chain (3-bit groups)

Single-entry P, K, O, and G are combined to produce group terms Ggrp[7:0], Pgrp[7:0], and Ogrp[7:0] for eight groups of three entries. For group 0, the group terms are:
Ggrp [i]=Gx·Py·Pz+~Ox·Gy·Pz+~Ox·~Oy·Gz
    =Gx·~Ky·~Kz+Gy·~Kz+Gz
Pgrp[i]=Px·Py·Pz=~Kx·~Ky·~Kz
Kgrp[i]=~Pgrp[i]=Kx+Ky+Kz
Ogrp[i]=Ox+Oy+Oz=Gx+Gy+Gz where x, y, and z respectively identify oldest, middle and newest entries in group i. Single-entry G terms are bits of signal IssuableToRUX[23:0], and single-entry K terms are bits of IssuableToRUY[23:0].

Group terms are combined in stages to form group terms for yet larger groups. The following equations describe logic which combines group terms GX, OX, PX, GY, OY, and PY to form group terms for a group XY which is the union of groups X and Y.

GXY=GX·PY+~OX·GY
PXY=PX·PY
OXY=OX+OY

Signals CinGrp[6:0] and OinGrp[6:0] are output from the combinations. Signals CinGrp[6:0] are signals G__7, G__67, G__567, G__4567, G__34567, G__234567, and G__1234567 Output signal OinGrp[6:0] are signals O__7, O__67, O__567, O__4567, O__34567, O__234567, and O__1234567.

One bit of signal IssueOpToRUY[23:0] is asserted to identify the selected entry. The following equations describe logic which generates signal IssueOpToRUY.

IssueOpToRUY[23]=0
IssueOpToRUY[22]=G[23]·K[22]
IssueOpToRUY[21]G[23]·P[22]·K[21]+~O23·G[22]·K[21]

For group i where i is equal to 6 to 0:
IssueOpToRUY[3*i+2]=K[3*i+2]·CinGrp[i]
    IssueOpToRUY[3*i+1]=K[3*i+1]·(CinGrp[i]·P[3*i+2]+ ~OinGrp[i]·G[3*i+2])
IssueOpToRUY[3*i]=K[3*i]·(CinGrp[i]·P[3*i+2]·P[3*i+1]+~OinGrp[i]·(G[3*i+2]·P[3*i+1]+~O[3*i+2]·G[3*i+1]))

Table B.31 Operand Information Broadcast

Each entry generates signals Src1Info and Src2Info which describe source operands for the operation contained in the entry.

Src1Info[7:0]={Src1BM[2:0],Src1Reg[4:0]}
Src2Info[7:0]={Src2BM[2:0],Src2Reg[4:0]}

If the operation is selected for issue, the entry drives signals Src1Info and Src2Info on operand information busses associated with the execution unit to which the operation will issue. Signals OprndInfo__XXsrcY are the signals actually carried by the operand information bus associated with source operand Y for execution unit XX and are generated as follows.

OprndInfo LUsrc1 IssueOpToLU?Src1Info: 8'bZ
OprndInfo LUsrc2 IssueOpToLU?Src2Info: 8'bZ
OprndInfo__SUsrc1=IssueOpToSU?Src1Info: 8'bZ
OprndInfo__SUsrc2=IssueOpToSU?Src2Info: 8'bZ
OprndInfo__RUXsrc1=IssueOpToRUX?Src1Info: 8'bZ
OprndInfo__RUXsrc2=IssueOpToRUX?Src2Info: 8'bZ
OprndInfo__RUYsrc1=IssueOpToRUY?Src1Info: 8'bZ
OprndInfo__RUYsrc2=IssueOpToRUY?Src2Info: 8'bZ B.32 Operand Information Match Comparisons The following equation summarizes a generic comparison:
    OprndMatch__XXsrcY=(busReg[4:0]==DestReg[4:0])·
        (busBM[1]·DestBM[1]+busBM[0]·DestBM[1])

where "XXsrcY" is one of LUsrc1, LUsrc2, SUsrc1, SUsrc2, RUXsrc1, RUXsrc2, RUYsrc1, and RUYsrc2 and "bus" refers to signal OprndInfo__XXsrcY which is on one of the operand information busses 552. The byte mark checking does not include BM[2] as a simplification and trade-off. BM[2]=1 implies (BM[1] BM[0])=1 and thus, if busBM[2]=1, a match is signaled regardless of DestBM[2].

Table B.33 Operation Information Broadcast

The following equations summarize readout of OpInfo fields from entries contain an operation that is issued. Accordingly to the following equations, each entry may generate a signal OpInfo__LU, OpInfo__SU, OpInfo-RUX, or OpInfo__RUY on an operation information busses corresponding to LU, SU, RUX, or RUY pipeline.

OpInfo__LU=IssueOpToLU?OpInfo: 13'bZ
OpInfo__SU=IssueOpToSU?OpInfo: 13'bZ
OpInfo__RUX=IssueOpToRUX?OpInfo: 13'bZ
OpInfo__RUY=IssueOpToRUY?OpInfo: 13'bZ Only an entry which contains an issued operation drive a signal on a bus 551.

Signals XXAdv0 control these external pipeline registers in the same way as they control the internal registers.

Table B.34 Operand Selection Scan Chain

Single-entry terms are for the eight scan chains LUsrc1, LUsrc2, SUsrc1, SUsrc2, RUXsrc1, RUXsrc2, RUYsrc1, and RUYsrc2.

LUsrc1: ~P=K=OprndMatch_LUsrc1
  G=LU·~S1·S0
LUsrc2: ~P=K=OprndMatch_LUsrc2
  G=LU·~S1·S0
SUsrc1: ~P=K=OprndMatch_SUsrc1
  G=SUS·~S1·S0
SUsrc2: ~P=K=OprndMatch_SUsrc2
  G=SU·~S1·S0
RUXsrc1: ~P=K=OprndMatch_RUXsrc1
  G=RU·Exec1·~S1·S0
RUXsrc2: ~P=K=OprndMatch_RUXsrc2
  G=RUExec1·~S1·S0·~Imm
RUYsrc1: ~P=K=OprndMatch_RUYsrc1
  G=RU·~Exec1·~S1·S0
RUYsrc2:-P=K =OprndMatch_RUYsrc2
  G=RU·~Exec1·~S1·S0·~Imm Group terms for 4-bit groups are formed as follows.
Pgrp=P0·P1·P2·P3
Ggrp=G0·P1·P2·P3+G1·P2·P3+G2·P3+G3
CIn0=CIn
CIn1=CIn·P0+G0
CIn2=CIn·P0·P1+G0·P1+G1
CIn3=CIn·P0·P1·P2+G0·P1·P2+G1·P2+G2
COut=CIn·P0·P1·P2·P3+G0·P1·P2·P3+G1·P2·P3+G2·P3+G3

Alternatively, 3-bit or 6-bit groups could be employed.

Each entry contains a logic signals which generates signals SupplyValueToXXsrcY which indicate whether the entry supplies operand srcY to execution pipeline XX.
SupplyValueToLUsrc1=LUsrc1chain.CIN·LUsrc1chain.K
SupplyValueToLUsrc2=LUsrc2chain.CIN·LUsrc2chain.K
SupplyValueToSUsrc1=SUsrc1chain.CIN·SUsrc1chain.K
SupplyValueToSUsrc2=SUsrc2chain.CIN·SUsrc2chain.K
SupplyValueToRUXsrc1=
  RUXsrc1chain.CIN·RUXsrc1chain.K
SupplyValueToRUXsrc2=
  RUXsrc2chain.CIN·RUXsrc2chain.K
SupplyValueToRUYsrc1=
  RUYsrc1chain.CIN·RUYsrc1chain.K
SupplyValueToRUYsrc2=
  RUYsrc2chain.CIN·RUYsrc2chain.K XXsrcYchain.CIN and XXsrcYchain.K are the input scan bit signal and kill term in an entry in the scan chain corresponding to operand srcY of pipeline XX.

Table B.35 Enable Logic for Operand Transfer

Each entry has eight drivers corresponding to eight operand signals Oprnd XXsrcY to be transferred. An entry enables its drivers to supply an operation result values if signal SupplyValueToXXSrcY is asserted during operand selection phase.

Oprnd_LUsrc1=SupplyValueToLUsrc1?DestVal: 32'bZ
Oprnd_LUsrc2=SupplyValueToLUsrc2?DestVal: 32'bZ
Oprnd_SUsrc1=SupplyValueToSUsrc1?DestVal: 32'bZ
Oprnd_SUsrc2=SupplyValueToSUsrc2?DestVal: 32'bZ
Oprnd_RUXsrc1=SupplyValueToRUXsrc1?DestVal: 32'bZ
Oprnd_RUXsrc2=SupplyValueToRUXsrc2?DestVal: 32'bZ
Oprnd_RUYsrc1=SupplyValueToRUYsrc1?DestVal: 32'bZ
Oprnd_RUYsrc2=SupplyValueToRUYsrc2?DestVal: 32'bZ Register filed 290 enables its drives to supply signals Oprnd_XXsrcY if a scan bit output from a scan chain is set.
Oprnd_LUsrc1=LUsrc1chain.COUT?LUsrc1RegVal: 32'bZ
Oprnd_LUsrc2=LUsrc2chain.COUT?LUsrc2RegVal: 32'bZ
Oprnd_SUsrc1=SUsrc1chain.COUT?SUsrc1RegVal: 32'bZ
Oprnd_SUsrc2=SUsrc2chain.COUT?SUsrc2RegVal: 32'bZ
Oprnd_RUXsrc1= RUXsrc1chain.COUT?RUXsrc1RegVal: 32'bZ
Oprnd_RUXsrc2= RUXsrc2chain.COUT?RUXsrc2RegVal: 32'bZ
Oprnd RUYsrc1 RUYsrc1chain.COUT?RUYsrc1RegVal: 32'bZ
Oprnd RUYsrc2=RUYsrc2chain.COUT?RUYsrc2RegVal: 32'bZ Table B.36 Operand Information Signal An entry providing an operand also provides an operand status signal as follows.
OprndStat[9:0]={State[3:0],DestBM[2:0],Type[2:1],Exec1)

Enable signals for operand drivers enable drivers for the operand status signal as follows.
OprndStat_LUsrc1=SupplyValueToLUsrc1?OprndStat: 10'bZ
OprndStat_LUsrc2=SupplyValueToLUsrc2?OprndStat: 10'bZ
OprndStat_SUsrc1=SupplyValueToSUsrc1?OprndStat: 10'bZ
OprndStat_SUsrc2=SupplyValueToSUsrc2?OprndStat: 10'bZ
OprndStat_RUXsrc1=SupplyValueToRUXsrc1?OprndStat: 10'bZ
OprndStat_RUXsrc2=SupplyValueToRUXsrc2?OprndStat: 10'bz
OprndStat_RUYsrc1=SupplyValueToRUYsrc1?OprndStat: 10'bZ
OprndStat_RUYsrc2=SupplyValueToRUYsrc2?OprndStat: 10'bZ Register file 290 drives an operand status bus 553 is none of the entries is selected to provide the operand corresponding to the operand status bus. The operand status signal from register file 290 are of the following form.
OprndStat[9:0]={4'b1111,3'b111,2'bXX,1'bX}

Logic which enables register file 290 to drive the operand status busses 553 is summarized as follows.
OprndStat_LUsrc1=LUsrc1chain.COUT?OprndStat: 10'bZ
OprndStat_LUsrc2=LUsrc2chain.COUT?OprndStat: 10'bZ
OprndStat_SUsrc1=SUsrc1chain.COUT?OprndStat: 10'bZ
OprndStat_SUsrc2=SUsrc2chain.COUT?OprndStat: 10'bZ
OprndStat_RUXsrc1=RUXsrc1chain.COUT?OprndStat: 10'bZ
OprndStat_RUXsrc2=RUXsrc2chain.COUT?OprndStat: 10'bZ
OprndStat_RUYsrc1=RUYsrc1chain.COUT?OprndStat: 10'bZ
OprndStat_RUYsrc2=RUYsrc2chain.COUT?OprndStat: 10'bZ Table B.37 Displacement Forwarding During operand forwarding stage, displacement forwarding from an entry is enabled either by the entry or by the preceding entry in scheduler 280. The following summarizes forwarding of signals Disp_LU and Disp_SU to load unit 251 and store unit 252.
Disp_LU=(thisOp(LU·~S1·S0·~LD)+nextOp(LU·~S1·S0·LD))?DestVal: 32'bZ Disp_SU=(thisOp(SU·~S1·S0·~LD)+nextOp
(SU·~S1·S0·LD))?DestVal: 32'bZ
Values "thisOp" and "nextop" identify the physical entry from which come the following signals LU, S1, S0, and LD. Also, in the case of the first/newest entry in scheduler 280, the NextOp term is zero.

Table B.38 Immediate Value Forwarding

Drivers provide immediate values to register units 253 and 254 as follows.

Oprnd RUXsrc2 =
(RU·Exec·~S1·~S0·Imm)?DestVal: 32'bZ
Oprnd_RUYsrc2=
(RU·~Exec·~S1·S0·Imm)?DestVal : 32'bZ The following equations summarizes enabling separate bus for operand status signals.
OprndStat_RUXsrc2=(RU·Exec·~S1·S0·Imm)?OprndStat: 10'bZ
OprndStat_RUYsrc2=(RU—Exec1·~S1·S0·Imm)?OprndStat: 10'bZ Table B.39 Data Operand Selection and Forwarding During operation selection phase 456, each entry determines whether it is in execution stage 450. "Select for data operand fetch"=SU·~S2·S1 During data operand broadcast stage, the entry containing the operation determined to be in execution stage 450 generates a data operand information signal as follows.
SrcStInfo[7:0]={SrcStBM[2:0],SrcStReg[4:0]}
OprndInfo_SUsrcSt=SU·~S2·S1?SrcStInfo: 8'bZ Each entry determines from the data operand information signal whether the entry contains an operation that affects the source register of the data operand. A data operand match register in each entry latches a value OprndMatch SUsrcSt indicating whether the entry affects the source of the data operand.
OprndMatch_SUsrcSt=(busReg[4:0]==DestReg[4:0])·(busBM[1]·DestBM[1]+busBM[0]DestBM[1])
where "bus" refers to OprndInfo SUsrcSt.

During operand selection phase 461, a scan chain starting from the selected entry selects a source of the data operand. The source is the newest preceding entry which affects the source of the data operand or register file 290 if no preceding entry affects data operand. The scan chain has single-entry scan terms:
~P=K=OprndMatch_SUsrcSt
G=SU·~S3·S2
Group-level scan equations are the same as for other operand selection scan chains such as in Table B.34, and each entry determines from an input scan bit and a kill term for the entry whether the entry is selected.
SupplyValueToSUsrcSt=
SUsrcStchain.CIN·SUsrcStchain.K During data operand transfer phase 462, drivers within each scheduler entry are enabled as follows.
Oprnd_SUsrcSt=SupplyValueToSUsrcSt?DestVal: 32'bZ
OprndStat_SUsrcSt=
SupplyValueToSUsrcSt?OprndStat: 10'bZ
If none of the entries' drivers are enabled, drivers at output of register file are enabled as follows.
Oprnd_SUsrcSt=SUsrcStchain.COUT?SUsrcStRegVal: 32'bZ
OprndStat_SUsrcSt=SusrcStchain.COUT?{7'b1111111, 3'bXXX}: 10'bZ
The data operand Oprnd_SUsrcSt transferred over bus 554 is captured in a register 1052 in store unit 252. During data operand transfer phase 462, control logic 520 uses the operand status value read.

Table B.40 Load-Store Ordering Scan Chains

Load-store ordering scan chains has single-entry propagate/kill (P/K) terms based on State and Type fields of each entry. For the three LdOp scan chains, the ST Type bit is used instead of the SU bit. This distinguishes the StOps which actually reference memory from LEA operations which only generate logical addresses. LUst2/LUst1/LUst0 and SUld2/SUld1 denote the respective scan chains for load unit 251 and store unit 252.

The single-entry terms for the scan chains are:
LUst2: ~P=K=ST·~S3·(S2+S1·SU2_FirstAddrV)
LUst1: ~P=K=ST·~S2
LUst0: ~P=K=ST·~S1
SUld2: ~P=K=LU·~S3·(S2+S1·LU2_FirstAddrV)
SUld1: ~P=K=LU·~S2 The group look-ahead terms (based on groups of four) are:
Pgrp=P0·P1·P2·P3
CIn0=CIn
CIn1=CIn·P0
CIn2=CIn·P0·P1
CIn3=CIn·P0·P1·P2
The scan bit input signals for Op quads are:
CinGrp5=1
CinGrp4=Pgrp5
CinGrp3=Pgrp5·Pgrp4
CinGrp2=Pgrp5·Pgrp4·Pgrp3
CinGrp1=Pgrp5·Pgrp4·Pgrp3·Pgrp2
CinGrp0=Pgrp5·Pgrp4·Pgrp3·Pgrp2·Pgrp1

During the second phase 462 of execution stage 460 for a LdStOp, the two/three scan bits Cin's to the entry holding the LdStOp are combined with a 24:1 multiplexer as follows:
LUAges[2:0]=3'b0
SUAges[1:0]=2'b0
for (all Ops)(
LUAges[2:0]$^3$=(LU·~S3·(S2+S1·LU2_FirstAddrV))
?{~LUst2chain.CIN,~LUst1chain.CIN, ~LUst0chain.CIN}: 3'b0
SUAges[1:0]$^3$=(SU·~S3·(S2+S1SU2_FirstAddrV))
?{~SUld2chain.CIN,~SUld1chain.CIN}: 2'b0}
The scan bits Cin are inverted when driven onto the global signals with the result that if a global signal is one, then the associated stage contains an older operation.

Table B.41 Information from Scheduler to External Logic
The following summarizes the information that is read out of scheduler 280, at various times, for external use:
During Operand Information Broadcast phase:
OprndInfo_XXsrcY[7:0], OprndInfo_SUsrcSt[7:0], SrcYReg[4:0], SrcYBM[2:0], and OpInfo_XX[12:0]
During Operand Transfer phase:
OprndStat_XXsrcY[9:0], OprndStat_SUsrcSt[9:0], State[3:0], DestBM[2:0], Type[2:1], and Exec1
Note: XX={LU,SU,RUX,RUY}
y={1,2}

Table B.42 Operation Valid Bits
The following summarizes the OpV bits for issue stage of the four execution pipelines.
OpV_LU_Iss=~LUchain.COUT
OpV_SU_Iss=~SUchain.COUT
OpV_RUX_Iss=~RUXchain.COUT
OpV_RUY_Iss=~RUYchain.COUT Table B.43 RegOp Bumping
Global control logic 520 includes logic which generates signals BumpRUX/Y as follows. Included below are terms which handle what could otherwise be deadlock situations.
Signal InhBumpRUX inhibits Regop bumping if the operand forward stage is an RUX-only operation and a RegOp to be issued is also an RUX-only operation.

InhBumpRUX=OpInfo__RUX(RegOp).R1·OpV__RUX__IssOpInfo__RUX__0(RegOp).R1

Signal BumpRUX is asserted to bump a RegOp out of operand forward stage of execution unit 253 if not inhibited and one of the source operation is unissued or a LdOp in operand forward stage or a timeout signal is assert in response to the RegOp in operand forwarding stage being held up for more than a timeout count.

BumpRUX=~InhBumpRUX·(~OprndStat__RUXsrc1.State[0]+
  (~OprndStat__RUXsrc1.State[1]·
  ~OprndStat__RUXsrc1.Type[1])+
  ~OprndStat__RUXsrc2.State[0]+
  (~OprndStat__RUXsrc2.State[1]OprndStat__RUXsrc2.Type[1]) +RUXTimeout)

Signal BumpRUY to bump a RegOp out of the second register unit 254 cannot be inhibited but otherwise is asserted for the same reasons as signal BumpRUX.

BumpRUY=~OprndStat__RUYsrc1.State[0]+
  (~OprndStat__RUYsrc1.State[1]
  ~OprndStat__RUYsrc1.Type[1])+
  ~OprndStat__RUYsrc2.State[0]+
  (~OprndStat__RUYsrc2.State[1]OprndStat__RUYsrc2.Type[1])+RUYTimeout Table B.44 Operand Transfer Multiplexer Control The following equations summarize the five input select signals for each operand multiplexer. Global control logic 520 uses the operand status signal on busses 553 to select either an operand bus 554 or one of result busses 561 to 564 to provide an operand. For most operands, operand bus 554 is selected if the source operation is completed.

SelOprndBus__XXsrcY=State[3]+State[2]·Type[1]

For the second operand of RegOps, the operand bus is selected if the source operation is completed or the operand is an immediate value.

SelOprndBus__RUXsrc2=State[3]+State[2]·Type[1]+RUXsrc2Imm
SelOprndBus__RUYsrc2=State[3]+State[2]·Type[1]+RUYsrc2Imm where signals RUXsrc2Imm and RUYsrc2Imm indicate the src2 operand is an immediate value.

RUXsrc2Imm=(Type[1:0]='b11)·~S1·S0·Exec1
RUYsrc2Imm=(Type[1:0]='b11)·~S1·S0·~Exec1

The result bus from the one of execution units 251 to 254 which would execute the source operation is selected if operand bus 554 is not selected.

SelLUDestRes__XXsrcY=~SelOprndBus__XXsrcY·~Type[1]
SelSUDestRes__XXsrcY=~SelOprndBus__XXsrcY·Type[1]·~Type[0]
SelRUXDestRes__XXsrcY=~SelOprndBus__XXsrcY·Type[1]·Type[0]·Exec1
SelRUYDestRes__XXsrcY=~SelOprndBus__XXsrcY·Type[1]·Type[0]·~Exec1

The selected operand may be invalid. An execution unit is prevented from using the invalid operand by preventing the associated operation from advancing from operand forward stage 440 to execution stage 450.

Table B.45 Identification of Invalid Operands

Global control logic 520 uses operand status signals from bus 553 to generate signals OprndInvld__XXsrcY that indicate whether an operand srcY (Y={1,2}) for an execution unit XX (XX={LU,SU,RUX,RUY}).

OprndInvld__XXsrcY=~State[1]+~Type[1]·(~State[2]+
  ~State[3·~CHP__LUAdv2)+SrcYBM[2]·~DestBM[2]+
  SrcYBM[1]·~DestBM[1]+SrcYBM[0]·~DestBM[0]

Table B.46 Hold Signal Logic

Hold signals SC__HoldXX0 are generated to prevent an operation from advancing to execution stage 450 if the required operands are not available. StOps are allowed to advance to execution stage 450 even if the data operand is not yet available because the data operand is not required until the second execution stage 460. However, signal SC__HoldSU2 holds the operation in execution stage 460 if the data operand is still invalid.

SC__HoldLU0=OprndInvld__LUsrc1+OprndInvld__LUsrc2
SC__HoldSU0=OprndInvld__SUsrc1+OprndInvld__SUsrc2
SC__HoldRUX0=OprndInvld__RUXsrc1+OprndInvld__RUXsrc2·~RUXsrc2Imm+StatusInvld__RUX+NonAbsync
SC__HoldRUY0=OprndInvld__RUYsrc1+OprndInvld__RUYsrc2·~RUYsrc2Imm
SC__HoldSU2=OprndInvld__SUsrcSt·~SU2__FirstAddrV Table B.47 Status Flat Groups Standard x86 status flag bits OF, SF, ZF, PF, CF, EZF, and ECF are partitioned into four groups which correspond to bits of signal STATUSV and field StatMod as follows.

STATUSV[3] and StatMod[3]→OF
STATUSV[2] and StatMod[2]→SF, ZF, AF, PF
STATUSV[1] and StatMod[1]→CF
STATUSV[0] and StatMod[0]→EZF, ECF Table B.48 Status Flat Fetching Each of entries 16 to 23 generates signals StatInfo__1, StatInfo__2, StatInfo__3, and StatInfo__4 corresponding to the four flag groups and indicating the status flags and a validity bit for the four flag groups. Any one or more of signals StatInfo__1, StatInfo__2, StatInfo__3, and StatInfo__4 is used to generate signals STATUS and STATUSV if the entry is selected by a scan chain for a corresponding group. In the following, the prefix "OPj:" indicates a field or signal form entry j.

for (j=16:23) {
OPj:StatInfo__3[1:0]={OPj:StatVal[7], OPj:S3}//OF
OPj:StatInfo__2[4:0]={OPj:StatVal[6:3], OPj:S3 }//SF,ZF,AF,PF
OPj:StatInfo__1[1:0]={OPj:StatVal[2], OPj:S3 }//CF
OPj:StatInfo__0[2:0]={ OPj:StatVal[1:0], OPj:S3 } //EZF, ECF }

The architectural status flag register generates signals FlgStatInfo__1, FlgStatInfo__2, FlgStatInfo__3, and FlgStatInfo__4, any of which are used to generate signals STATUS and STATUSV if no entry is selected by a scan chain for a corresponding group.

FlgStatInfo__3[1:0]={StatFlags[7], 'b1} //OF
FlgStatInfo__2[4:0]={StatFlags[6:3], 'b1}//SF,ZF,AF,PF
FlgStatInfo__1[1:0]={StatFlags[2], 'b1} //CF
FlgStatInfo__0[2:0]={StatFlags[1:0], 'b1} //EZF,ECF The following logic represent four scan chain without look-ahead for locating an entry to provide a flag group.

for (i=0,1,2,3){
//i indexes flag group corresponding to StatMod[i]
StatSel16__i=OP16:StatMod[i]
StatSel17__i=~OP16:StatMod[i]·OP17:StatMod[i]
StatSel18__i=~OP16:StatMod[i]·~OP17:StatMod[i]·OP18:StatMod[i]
StatSel19__i=~OP16:StatMod[i]· . . . ~OP18:StatMod[i]·OP19:StatMod[i]
StatSel20__i=~OP16:StatMod[i]· . . . ~OP19:StatMod[i]·OP20:StatMod[i]
StatSel21__i=~OP16:StatMod[i]· . . . ~OP20:StatMod[i]·OP21:StatMod[i]
StatSel22__i=~OP16:StatMod[i]· . . . ~OP21:StatMod[i]·OP22:StatMod[i]

StatSel23_i=~OP16:StatMod[i]· . . . ~OP22:StatMod[i]
·OP23:StatMod[i]
StatSelFlg_i=~OP16:StatMod[i]· . . . ~OP22:StatMod[i]
·OP23:StatMod[i]}

The output status flag information signals are:
StatInfo_3[1:0]=
  {StatSel16_3}*2 OP16:StatInfo_3[1:0]+
  {StatSel17_3}*2 OP17:StatInfo_3[1:0]+
  {StatSel18_3}*2 OP18:StatInfo_3[1:0]+
  {StatSel19_3}*2 OP19:StatInfo_3[1:0]+
  {StatSel20_3}*2 OP20:StatInfo_3[1:0]+
  {StatSel21_3}*2 OP21:StatInfo_3[1:0]+
  {StatSel22_3}*2 OP22:StatInfo_3[1:0]+
  {StatSel23_3}*2 OP23:StatInfo_3[1:0]+
  {StatSelFlg_3}*2 FlgStatInfo_3[1:0]
StatInfo_2[4:0]=
  {StatSel16_2}*5 OP16:StatInfo_2[4:0]+
  {StatSel17_2}*5 OP17:StatInfo_2[4:0]+
  {StatSel18_2}*5 OP18:StatInfo_2[4:0]+
  {StatSel19_2}*5 OP19:StatInfo_2[4:0]+
  {StatSel20_2}*5 OP20:StatInfo_2[4:0]+
  {StatSel21_2}*5 OP21:StatInfo_2[4:0]+
  {StatSel22_2}*5 OP22:StatInfo_2[4:0]+
  {StatSel23_2}*5 OP23:StatInfo_2[4:0]+
  {StatSelFlg_2}*5 FlgStatInfo_2[4:0]
StatInfo_1[1:0]=
  {StatSel16_1}*2 OP16:StatInfo_1[1:0]+
  {StatSel17_1}*2 OP17:StatInfo_1[1:0]+
  {StatSel18_1}*2 OP18:StatInfo_1[1:0]+
  {StatSel19_1}*2 OP19:StatInfo_1[1:0]+
  {StatSel20_1}*2 OP20:StatInfo_1[1:0]+
  {StatSel21_1}*2 OP21:StatInfo_1[1:0]+
  {StatSel22_1}*2 OP22:StatInfo_1[1:0]+
  {StatSel23_1}*2 OP23:StatInfo_1[1:0]+
  {StatSelFlg_1}*2 FlgStatInfo_1[1:0]
StatInfo_0[2:0]=
  {StatSel16_0}*3 OP16:StatInfo_0[2:0]+
  {StatSel17_0}*3 OP17:StatInfo_0[2:0]+
  {StatSel18_0}*3 OP18:StatInfo_0[2:0]+
  {StatSel19_0}*3 OP19:StatInfo_0[2:0]+
  {StatSel20_0}*3 OP20:StatInfo_0[2:0]+
  {StatSel21_0}*3 OP21:StatInfo_0[2:0]+
  {StatSel22_0}*3 OP22:StatInfo_0[2:0]+
  {StatSel23_0}*3 OP23:StatInfo_0[2:0]+
Status[7:0]=//OF; SF,ZF,AF,PF; CF; EZF,ECF
  {StatInfo_3[1],StatInfo_2[4:1],
  StatInfo_1[1],StatInfo_0[2:1]}
StatusV[3:0]=
  {StatInfo_3[0],StatInfo_2[0],
  StatInfo_1[0],StatInfo_0[0]}

Table B.49 cc-RegOp Handling

A signal CCDepInRUX_0 indicates whether a cc-dep RegOp is in operand forward stage of register unit RUX and is generated from pipeline registers containing operation information and validity bits for the operation in operand forwarding stage.
CCDepInRUX_0=
  (OpInfo_RUX_0 (RegOp).Type[3:2]='b01)·OpVp_RUX_0

A signal UnexecCCDepInQ3 indicates whether an unexecuted cc-dep RegOp is in row 3 and is generate from type and state bits in the entries of row 3.
UnexecCCDepInQ3=
  OP12:(RU OpInfo(RegOp).Type[3:2]='b01~S1)++
  OP13:(RU OpInfo(RegOp).Type[3:2]='b01~Si)+
  OP14:(RU OpInfo(RegOp).Type[3:2]='b01~Si)+
  OP15:(RU OpInfo(RegOp).Type[3:2]='b01~S1)

The following logic determines generates a signal StatV which indicates whether the status bit group required for the RegOp in operand forward stage is valid.
if (~OpInfo_RUX_0(RegOp).Type[5]) StatV = StatusV[1]
  //need CF for ADC,SBB,RLC,RRC Ops
elseif (OpInfo$_{13}$ RUX_0(RegOp).Type[1:0]= 'b10)
  StatV=StatusV[0] //need EZF,ECF for MOVcc Op
else //need OF, . . . ,CF for MOVcc,RDFLG,DAA,DAS Ops
  StatV=StatusV[3] StatusV[2] StatusV[1]

Signal StrtExecCCDep keeps track of when an unexecuted cc-dep RegOp is in row 3.
StrtExecCCDep = CCDepInRUX_0·SC_AdvRUX0·~BumpRUX Signal UnexecCCDepInQ4 keep track of when an unexecuted cc-dep Regop is in row 4.
@clk:
if (LdEntry4 + StrtExecCCDep + SC_EAbort)
  UnexecCCDepInQ4 = LdEntry4·UnexecCCDepInQ3·StrtExecCCDep·~SC_EAbort Signal SC_HoldStatus holds a copy of the status flag values at input to register unit RUX.
SC_HoldStatus=UnexecCCDepInQ4

Signal StatusInvld_RUX holds RegOp execution.
StatusInvld_RUX=(CCDepInRUX_0·~UnexecCCDepInQ4)·~(UnexecCCDepInQ3·StatV·~NoStatMod)

Signal HoldOpQ3 holds an Op quad from shifting out of scheduler row 3.
HoldOpQ3=UnexecCCDepInQ3·~(CCDepInRUX_0·StatV·~NoStatMod)+UnexecCCDepInQ4

Signal RUX_NoStatMod, from the RUX unit, indicates that the operation being executed does not modify status flags. A cycle-delayed version, called NoStatMod.

Table B.50 BRCOND Handling

The following equations describe BRCOND handling. Reference is made below to signals DTF and SSTF which are signals indicating breakpoint and single-step traps, respectively. A signal MDD, for "multiple decode disable" can be used for debugging to prevent more than one macroinstruction at a time being inserted into scheduler 280.

BRCOND handling first determines whether a BRCOND is in row 4. Signal BRCONDj indicates whether OPj is an unevaluated BRCOND.
BRCONDj=(Type=SpecOp)·(OpInfo(SpecOp).Type=BRCOND)·~S3)
where j is the entry number and Type, OpInfo, and 53 are fields of entry j. Signal BRCONDInQ4 indicates whether row 4 contains a BRCOND.
BRCONDInQ4=(BRCOND16+BRCOND17+BRCOND18+BRCOND19).OPQ4:OpQV If a BRCOND is in row 4, the predicted condition code is (SpecOp.cc) from field OpInfo of the entry containing the BRCOND.
CondCode[4:0]=
  {BRCOND16}*5 OP16:OpInfo(SpecOp).CC[4:0]+
  {BRCOND17}*5 OP17:OpInfo(SpecOp).CC[4:0]+
  {BRCOND18}*5 OP18:OpInfo(SpecOp).CC[4:0]+

{BRCOND19}*5 OP19:OpInfo(SpecOp).CC[4:0]+
Values of signal CondCode[4:1] are defined as follows. (Bit CondCode[0] flips the sense.)

| True  | 4'b0000 | ECF     | 4'b0001 |
|-------|---------|---------|---------|
| EZF   | 4'b0010 | SZnZF   | 4'b0011 |
| MSTRZ | 4'b0100 | STRZ    | 4'b0101 |
| MSTRC | 4'b0110 | STRZnZF | 4'b0111 |
| OF    | 4'b1000 | CF      | 4'b1001 |
| ZF    | 4'b1010 | CvZF    | 4'b1011 |
| SF    | 4'b1100 | PF      | 4'b1101 |
| SxOF  | 4'b1110 | SxOvZF  | 4'b1111 |

Signal CondV indicates whether status bits required for evaluation of the BRCOND are valid.
CondV=switch (CondCode[4:1]) {
  case 0000: 'b1
  case 0001: StatusV[0]
  case 0010: StatusV[0]
  case 0011: StatusV[0]·StatusV[2]
  case 0100: StatusV[0]
  case 0101: StatusV[0]
  case 0110: StatusV[0]
  case 0111: StatusV[0]·StatusV[2]
  case 1000: StatusV[3]
  case 1001: StatusV[1]
  case 1010: StatusV[2]
  case 1011: StatusV[2]·StatusV[1]
  case 1100: StatusV[2]
  case 1101: StatusV[2]
  case 1110: StatusV[3]·StatusV[2]
  case 1111: StatusV[3]·StatusV[2]}

Signal HoldOpQ4A is for inhibiting shifting of the Op quad in row 4 if a BRCOND is in row 4 and the is condition necessary for evaluation is invalid.
HoldOpQ4A=BRCONDInQ4·~CondV
Signal CondVal indicates the predicted value CondCode[0] was mispredicted.
CondVal=switch (CondCode[4:1]) {
  case 0000: CondCode[0]^'b1
  case 0001: CondCode[0]^Status[0]
  case 0010: CondCode[0]^Status[1]
  case 0011: Status[1]+(CondCode[0]^~Status[5])
  case 0100: CondCode[0]^(~Status[1]~IP ~(DTF+SSTF+MDD))
  case 0101: CondCode[0]^(~Status[1]~IP~(DTF+SSTF+MDD))
  case 0110: CondCode[0]^(~Status[0]~IP~(DTF+SSTF+MDD))
  case 0111:~Status[1]~IP~(DTF+SSTF+MDD)·(CondCode[0]^Status[5])
  case 1000: CondCode[0]^Status[7]
  case 1001: CondCode[0]^Status[2]
  case 1010: CondCode[0]^Status[5]
  case 1011: CondCode[0]^(Status[5]+Status[2])
case 1100: CondCode[0]^Status[6]
case 1101: CondCode[0]^Status[3]
case 1110: CondCode[0]^(Status[7]^Status[6])
case 1111: CondCode[0] ^((Status[7]^Status[6]+Status[5]) }
where signal IP is defined as
IP=SI_NMIP+SI_INTRP and indicates whether there are any active h/w interrupt requests.
Signal SC_Resolve indicates a resolve conditional branch.
SC_Resolve=BRCONDInQ4·CondV·~SC_MisPred·~NoStatMod·~OPQ4:Emcode
A register records Signal Resolved indicating resolution of a BRCOND in quad 4.
@clk: Resolved=~LdEntry4·(SC_Resolve+Resolved)
x86 MOVS (move string) instructions are decoded into an emcode loop of operations. To improve the speed at which MOVS instructions are performed, full 32-bit transfers are performed until a byte count for the loop is less than 4. A conditional BRCOND is used in the check of the count for the MOVS. Signal TermMOVS terminates the emcode loop if the move string is almost done.
TermMOVS=BRCONDInQ4·CondV·~NoStatMod·~SC_MisPred·
  ((CondCode[4:1]='b0110)·(OP19:DestVal[15:0]=16'h5)
  ·(OP19:DestVal[31:16]=16'h0+RUX_D)+
  (CondCode[4:1]='b0100)·(OP23:DestVal[15:0]=16'h6)
  (OP23:DestVal[31:16]=16'b0+RUX_D))
  //CondCode=MSTRC . . . +CondCode=MSTRZ
clk: TermedMOVS=~LdEntry4 (TermMOVS+TermedMOVS) SC_TermMOVS=TermMOVS+TermedMOVS
Signal BrVecAddr from field DestVal for a BRCOND indicates the emcode or instruction vector address to be used if the branch was mispredicted.
BrVecAddr[31:0]={BRCOND16}*32·OP16:DestVal[31:0]+
  {BRCOND17}*32·OP17:DestVal[31:0]+
  {BRCOND18}*32·OP18:DestVal[31:0]+
  {BRCOND19}*32·OP19:DestVal[31:0]
Signals SC_OldRASPtr, SC_OldBPTInfo, and SC_RestartAddr are transmitted to restart instruction decoder 240. A restart can be generated in response to a mispredicted branch or a fault. Signal SC_OldRASPtr from field RASPtr of a mispredicted or faulting entry is for restoring the RAS TOS pointer. Signal SC_OldBPTInfo indicates correct branch prediction table information for correcting the branch prediction table. Signal SC_RestartAddr indicates the program counter following the restart.
SC_OldRASPtr[2:0]=OPQ4:RASPtr[2:0]
SC_OldBPTInfo[14:0]=OPQ4:BPTInfo[14:0]
SC_RestartAddr[31:0]=ExcpAbort?OPQ5:FaultPC:
  ((OPQ4:Emcode) ?OPQ4:FaultPC[31:0]: BrVecAddr[31:0])
Signals BrVec2Emc and BrVec2Dec indicate a restart is required because of a mispredicted BRCOND for the case of a BRCOND from emcode or MacDec 252.
BrVec2Emc=SC_Resolve·~CondVal·OPQ4:Emcode
BrVec2Dec=SC_Resolve·~CondVal·OPQ4:~Emcode
A register records misprediction:
@clk: if (SC_Resolve + SC_Abort)
  SC MisPred = ~SC_Abort (~CondVal + SC_MisPred)
If a BRCOND was correctly predicted, the BRCOND is marked as completed as follows.
@clk: if (SC_Resolve·CondVal·BRCOND16) OP16:S3 = 'b1
@clk: if (SC_Resolve·CondVal·BRCOND17) OP17:S3 = 'b1
@clk: if (SC_Resolve·CondVal·BRCOND18) OP18:S3 = 'b1
@clk: if (SC_Resolve·CondVal·BRCOND19) OP19:S3 = 'b1

A BRCOND being successfully resolved may sit in row 4 for more than one cycle due to row 5 not being able to shift and thus preventing row 4 from shifting down. During this time, signal SC_Resolve is asserted, and one of signals BrVec2XX on bus 558 remains asserted for the entire time (versus for just the first cycle). Instruction decoder 240 keeps restarting each cycle until signal BrVec2XX deasserts. All other associated signals such as the vector address maintain proper values throughout this time.

Table B.51 Non-abortable RegOp Handling

Signal NonAbInRUX_0 is asserted to indicate a non-abortable RegOp is in RUX operand forward stage.

NonAbInRUX_0 =(OpInfo_RUX_0(RegOp).Type[5:21= 'b1110) OpV_RUX_0

Signal UnexecNonAbInQ4 is asserted to indicate a non-abortable RegOp is in row 4 of scheduler 280 and is generated from fields Type, OpInfo, and State of entries 16 to 19.

UnexecNonAbInQ4=
    OP16(RU·OpInfo(RegOp).Type [5:2]='b1110·~S1)+
    OP17(RU·OpInfo(RegOp).Type [5:2]='b1110·~S1)+
    OP18(RU·OpInfo(RegOp).Type [5:2]='b1110·~S1)+
    OP19(RU·OpInfo(RegOp).Type [5:2]='b1110·~S1)

Signal NonAbSync is used to hold up advancement from RUX operand forward stage if a non-abortable Regop is in RUX operand forward stage and not in row 4 or a preceding BRCOND was mispredicted or a trap is pending.

NonAbSync=NonAbInRUX_0·(~UnexecNonAbInQ4+ SC_MisPred+"trap pending")

The non-abortable RegOp is prevented from shifting out of row 4 until it advances to RUX execution stage.

HoldOpQ4B=UnexecNonAbInQ4

Table B.52 Self-Modifying Code Handling Logic

Self-Modifying code handling logic makes the following comparisons to eliminate the possibility that code has been modified.

for (i=0; i<5; ++i) {
uit Match1st=
    (STQ_LinAddr(11,5)=OpQi:Smc1stAddr)·(STQ_PhysAddr(19,12)=OpQi:Smc1stPg);
uit Match2nd=
    (STQ_LinAddr(11,5)=OpQi:Smc2ndAddr)
    (STQ_PhysAddr(19,12)=OpQi:Smc2ndPg);
    MatchSMC[i]=(Match1st+Match2nd)·OpQi:OpQV;
}SmcHit=
    "STQ store is not a special memory access"
    ("self-modifying code detected by DEC
    (fetch/decode) unit" +MatchSMC[0]+MatchSMC[1]+ MatchSMC[2]+MatchSMC[3]+MatchSMC[4]);

Table B.53 Commitment to the Register File

The following equations summarizes the register file write enable and the DestBM field and signal OprndMatch_XXsrcY modifications for each operation of an Op quad. Operation results selected to be committed are from row 4 or 5 by signal RegCmtSel.

RegCmtSel=OP23:S3·OP22:S3·OP21:S3·OP20:S3·
  (OP23:DestBM=0)·(OP22:DestBM=0)
  (OP21:DestBM=0)·(OP20:DestBM=0)
OPA=RegCmtSel?OP19: OP23
OPB=RegCmtSel?OP18: OP22
OPC=RegCmtSel?OP17: OP21
OPD=RegCmtSel?OP16: OP20

Signal CmtInh inhibits commitment if a limit violation occurs for an operation in row 5 or if a trap is pending. Signal RegCmtInh inhibits register commitment.

CmtInh=OPQ5:LimViol+"trap pending"
RegCmtInh=CmtInh+RegCmtSel·
  (OPQ4:LimViol+~StCmtSel[2]+SetTrapPend)

Signals WrEnbli enable commitment to register file 290 if there is no limit violation in the Op quad being committed and older operations in the row are older and therefore also being committed.

WrEnb10=~(RegCmtSel?OPQ4:LimViol: OPQ5:LimViol)
  OPA:S3
WrEnb11=~(RegCmtSel?OPQ4:LimViol: OPQ5:LimViol)
  OPA: S3·OPB:S3
WrEnb12=~(RegCmtSel?OPQ4:LimViol: OPQ5:LimViol)
  OPA: S3·OPB:S3·OPC:S3
WrEnb13=~(RegCmtSel?OPQ4:LimViol: OPQ5:LimViol)
  OPA:S3·OPB:S3·OPC:S3·OPD:S3

Byte mark DestBM are clear the cycle in which results are committed to register file 290.

@clk: if (WrEnb10) OP23:DestBM = 3'b0
@clk: if (WrEnb11) OP22:DestBM = 3'b0
@clk: if (WrEnb12) OP21:DestBM = 3'b0
@clk: if (WrEnb13) OP20:DestBM = 3'b0
@clk: if (WrEnb10·RegCmtSel) OP19:DestBM = 3'b0
@clk: if (WrEnb11·RegCmtSel) OP18:DestBM = 3'b0
@clk: if (WrEnb12·RegCmtSel) OP17:DestBM = 3'b0
@clk: if (WrEnb13·RegCmtSel) OP16:DestBM = 3'b0

Signals OprndMatch_XXsrcY are effectively masked so that: register file 290 provides operands.

OP23:"effective match with operand XXsrcY"=
  OP23:OprndMatch_XXsrcY·~WrEnb10
OP22:"effective match with operand XXsrcY"=
  OP22:OprndMatch_XXsrcY·~WrEnb11
OP21:"effective match with operand XXsrcY"=
  OP21:OprndMatch_XXsrcY·~WrEnb12
OP20:"effective match with operand XXsrcY"=
  OP20:OprndMatch_XXsrcY·~WrEnb13
OP19:"effective match with operand XXsrcY"=
  OP19:OprndMatch_XXsrcY·~(WrEnb10 RegCmtSel)
OP18:"effective match with operand XXsrcY"=
  OP18:OprndMatch_XXsrcy·~(WrEnb11 RegCmtSel)
OP17:"effective match with operand XXsrcY"=
  OP17:OprndMatch_XXsrcY·~(WrEnb12 RegCmtSel)
OP16:"effective match with operand XXsrcY"=
  OP16:OprndMatch_XXsrcY·~(WrEnb13 RegCmtSel)

Table B.54 Status Flag Commitment

The following equation summarizes the cumulative result generation or the selection process for a status group. Similar processes are applied independently for each status group.

NextStatFlags[x1:x2]=
  if (OP20:StatMod[x]·OP23:S3·OP22:S3·OP21:S3)
    OP20:StatVal[x1:x2]
  elseif (OP21:StatMod[x]·OP23:S3·OP22:S3)
    OP21:StatVal[x1:x2]
  elseif (OP22:StatMod[x]·OP23:S3) OP22:StatVal[x1:x2]
  elseif(OP23:StatMod[x]) OP23:StatVal[x1:x2]
  else StatFlags [x1:x2]

Table B.55 StOp Commitment

Signal StCmtSel indicates which of entries 23 to 16 contains the StOp selected for commitment. The oldest entry containing an uncommitted StOp is selected.

StCmtSel[3:0]=priority_encode(
  (OPQ5:OpQV·UncmtStOp[0]),   .  .  .
  ,(OPQ5:OpQV·UncmtStOp [3]),
  (OPQ4:OpQV·UncmtStOp[4]),   .  .  .
  ,(OPQ4:OpQV·UncmtStOp [7]))

StCmtSel equals b0000 to b0111 if entry 23 to 16 is selected. StCmtSel equals b1111 if no entry is selected.

Signal CmtMask has eight bits corresponding to the eight entries in the last two rows of scheduler 280. Bits corresponding to the oldest entry up to the selected entry are zero, and the remaining bits are one.

CmtMask[7:0]={(StCmtSel[2:0]<'b111), . . . , (StCmtSel[2:0]<'b000)}

Signal CmtCiaCda indicates the selected StOp is a CIA or CDA instruction.

CmtCiaCda=(~CmtMask[7]·OP16:Type[2])+
  (~CmtMask[6]·CmtMask[7]·OP17:Type[2])+
  (~CmtMask[5]·CmtMask[6]·OP18:Type[2])+
  (~CmtMask[4]·CmtMask[5]·OP19:Type[2])+
  (~CmtMask[3]·CmtMask[4]·OP20:Type[2])+
  (~CmtMask[2]·CmtMask[3]·OP21:Type[2])+
  (~CmtMask[1]·CmtMask[2]·OP22:Type[2])+
  (~CmtMask[0]·CmtMask[1]·OP23:Type[2])

Signal StCmtInh inhibits commitment of a StOp if all commitment is inhibited,

StCmtInh=CmtInh+StCmtSel[2]·(OPQ4:LimViol+SmcHit·~CmtCiaCda+"trap pending")

Signals StCmtV and Q5StCmtV respectively indicate whether a StOp and a StOp in row 5 is ready for commitment this cycle. There is no commitment of a StOp if no StOp was selected, StOp commitment is inhibited, the selected StOp has not completed, or older StOps have not completed.

StCmtV=~StCmtSel[3]·~StCmtInh·(CmtMask[7]+OP16:S3)·
  (CmtMask[6]+OP17:S3+OP17:RU)·
  (CmtMask[5]+OP18:S3+OP18:RU)·
  (CmtMask[4]+OP19:S3+OP19:RU)·
  (CmtMask[3]+OP20:S3+OP20:RU)·
  (CmtMask[2]+OP21:S3+OP21:RU)·
  (CmtMask[1]+OP22:S3+OP22:RU)
Q5StcmtV=~StcmtSel [2]·~CmtInh·
  (CmtMask[3]+OP20:S3)
  (CmtMask[2]+OP21:S3+OP21:RU)·
  (CmtMask[1]+OP22:S3+OP22:RU)·
  (CmtMask[0]+OP23:S3+OP23:RU)

Signal StAdv indicates whether a StOp can advance to stage 2 of the store commitment pipeline.

StAdv=~STQ_FirstAddr·~DC_HoldSC1·CHP_AdvSC2+CmtCiaCda

Signals StRetire and Q5StRetire indicate whether any of a row-5 StOp is committed this cycle.

StRetire=StCmtV·StAdv
Q5StRetire=Q5StCmtV·StAdv

Signal NewUncmtStOp identifies all StOps in the bottom two rows which have not been and are not being committed.

NewUncmtStOp[7:0]={(CmtMask[7]·OP16:Type=ST), . . . , (CmtMask[0]·OP23:Type=ST) }

If a StOp is committed UncmtStOp bits are updated as follows.

NextUncmtStOp[7:0]=(StRetire)?NewUncmtStOp[7:0]:UncmtStOp[7:0]
NextUncmtStOp[11:8]={OP12:Type=ST, OP13:Type=ST, OP14:Type=ST, OP1S:Type=ST }
@clk:
  UncmtStOp[7:4]=(LdEntry4)?
    NextUncmtStOp[11:8]: NextUncmtStOp[7:4]
  UncmtStOp[3:0]=(LdEntry5)?
    NextUncmtStOp[7:4]: NextUncmtStOp[3:0]

Signal AllStCmt indicates whether all memory-writing StOps in row 5 have been committed or are being successfully committed.

AllStCmt=StCmtSel[2]+
  Q5StRetire—NewUncmtStOp [3]· . . . ~NewUncmtStOp [0]

Signal SC_HoldSC1 indicates whether OCU 260 believes store commitment is ready to advance to stage 2.

SC_HoldSC1=~StCmtV+CmtCiaCda

Store unit 252 generates a signal SUViol indicated a fault for a StOp stuck in the second execution stage. An abort will be generated if the selected StOp is stuck in the second execution stage and therefore caused the fault.

StAbort=~StCmtSel[2]·SUViol·
  ((StCmtSel[1:0]==00)·~OP23:S3+
  (StCmtSel[1:0]==01)·~OP22:S3·OP23:S3+
  (StCmtSel[1:0]==10)·~OP21:S3·OP22:S3·OP23:S3+
  (StCmtSel[1:0]==11)
  ·~OP20:S3·OP21:S3·OP22:S3·OP23:S3)

Table B.56 OD Quad Retirement

The following equation summarizes the OCU's Op quad retirement control logic.

OpQRetire=OP20:S3·OP21:S3OP22:S3·OP23:S3·AllStCmt

Signal OpQRetire may be asserted for multiple cycles for the same Op quad. This will occur when shifting of. the bottom Op quad is being temporarily inhibited.

When the Op quad is retired or aborted, accumulated status flags are committed.

@clk: if ((OpQRetire + SC_Abort)·~OPQ5:LimViol)
  StatFlags[7:0]=NewStatFlags[7:0]

Table B.57 LdOp Abort

OCU 260 generates an abort signal LdAbort for a LdOp in row 5 if it has not completed and all older operations have completed and been committed.

LdAbort=LU2_LUViol·(OP23:(Type=LU·~S3)+
  OP22:(Type=LU·~S3)·OP23:S3·~CmtMask[1]+
  OP21:(Type=LU·~S3)·OP23:S3·OP22:S3·~CmtMask[2]+
  OP20:(Type=LU·~S3)
  ·OP23:S3·OP22:S3·OP21:S3·~CmtMask[3] )

Table B.58 FAULT OP Aborts

The following equation summarizes the OCU's FAULT operation handling logic.

FltAbort=OPQ5:OpQV·OP23:(Type=SpecOp·OpInfo(SpecOp).Type=FAULT)

Table B.59 LDDHA/LDAHA Handling Logic

OCU handles LDDHA and LDAHA operations when they reach entry 23 by loading the DestVal into the appropriate default handler address register.

@clk: if ( OPQ5:OpQV·
  OP23: (Type=SpecOp·OpInfo(SpecOp).Type=LDDHA) )
  DefFltVecAddr[13:0] = OP23:DestVal[13:0]
LdAltAddr = OPQ5:OpQV·
  OP23: (Type=SpecOp·OpInfo(SpecOp).Type=LDAHA)
@clk: if (LdAltAddr)
  AltFltVecAddr[13:0] = OP23:DestVal[13:0]

Signal EffAltFltVecAddr provides the new alternate handler address for faults on Ops within the same Op quad as an LDAHA operation.

EffAltFltvecAddr[13:0]=(LdAltAddr)?OP23:DestVal[13:0]:AltFltVecAddr[13:0]

Changing and switching between handler addresses is synchronized with the recognition of faults on surrounding operations.

@clk: if (NextOPQS:EretNextOPQ5:OpQV·~BrAbort +

LdAltAddr + ExcpAbort) FltVecMode = ~ExcpAbort·
(NextOPQ5:Eret·NextOPQ5:OpQV·~BrAbort)·
LdAltAddr
CurFltVecAddr[14:0]= (FltVecMode + LdAltAddr) ?
  EffAltFltVecAddr[]: DefFltVecAddr[]
OPQ refers to an Op quad field.
Table B.60 Branch Target Limit Violations Handling
  If a valid Op quad which is tagged as having a branch target limit violation reaches row 5, OCU 260 generates an abort signal LimAbort.
  LimAbort=OPQ5:(OpQV·LimViol)
Table B.61 Abort for Mispredicted BRCOND
  OCU 260 generates an abort signal BrAbort for a mispredicted BRCOND when all operations preceding an uncompleted BRCOND in row 5 are completed.
BrAbort=OP23:(Type=SpecOp·~S3)+
  OP22:(Type=SpecOp·~S3)·OP23:S3·~CmtMask[1]+
  O P 2 1 : ( T y p e = S p e c O p · ~ S 3 )
    ·OP23:S3·OP22:S3·~CmtMask[2]+
  O P 2 0 : ( T y p e = S p e c O p · ~ S 3 )
    ·OP23:S3·OP22:S3·OP21:S3·~CmtMask[3]
The commitment of following operations is inhibited by the State of the BRCOND being not completed (i.e. ~S3). Also, BrAbort is asserted when FltAbort is asserted, but this is harmless.
Table B.62 Abort Cycle Logic
  Signal ExcpAbort indicates an abort when any abort condition requiring a vector address for restart.
ExcpAbort=LdAbort+StAbort+FltAbort+LimAbort+
  TrapAbort+SCReset
  Signal SC_EAbort also includes aborts for mispredicted BRCOND.
SC_EAbort=ExcpAbort+BrAbort
  The abort is initiated by signal SC_Abort at a clock edge.
@clk: SC_Abort=SC_EAbort
  Information required for the different causes of the abort are provided as follows.
if (TrapAbort) {
  FaultId[2:0] = (DTF + SSTF) ? 0x1 : 0x0
}
else if (LimAbort) {
  FaultId[2:0] = 0x2 }
else {
  FaultId[2:0] = LdAbort ? LU2_ViolType : SU2_
    ViolType
}
  Latch into SR4:
@clk: if (ExcpAbort) {
  SC_FID[2:0] = FaultId[2:0]
  SC_SR4[31:0] = OPQ5:FaultPC[31:0]
}
  Select emcode vector address:
if (SCReset) {
  SC_VecAddr[13:0] =0x2200
  ExtEmcVecAddr = SCExtReset
}else {
Sc_VecAddr[13:0] = (ExcpAbort ) ?
  CurFltVecAddr[13:0] : BrVecAddr[13:0]
ExtEmcVecAddr = (ExcpAbort) ?
  CurFltVecAddr[14] : BrVecAddr[14]
}
SC_Vec2ROM = (ExcpAbort + ErVec2Emc) ~ExtEmcVecAddr
SC_Vec2RAM = (ExcpAbort + BrVec2Emc) ExtEmcVecAddr SC_Vec2Dec = ~ExcpAbort BrVec2Dec

We claim:

1. A processor comprising:
  a plurality of execution units; and
  a scheduler coupled to the execution units, the scheduler comprising:
    a sequence of rows of entries, the sequence of rows beginning with a top row and ending with a bottom row, wherein each row contains a plurality of entries, each entry includes memory fields for storage of information describing an operation associated with the entry, and the memory fields of the entries of each row except the bottom row are coupled to the memory fields of the entries in a next row of the sequence to permit shifting of information from one row to the next in the sequence;
  logic which scans the entries to select operations for issue to the execution units for execution;
  logic which provides information from the entries to the execution units for execution of the issued operations; and
  logic which stores results from execution of previously issued operations in the entries associated with the previously issued operations.

2. The processor of claim 1, further comprising an operation commit unit coupled to the scheduler, wherein:
  the operation commit unit retires and removes operations from the scheduler so that new operations can be associated with entries in the scheduler; and
  the operation commit unit makes permanent a result if result is stored in an entry is required for a program executed by the processor.

3. The processor of claim 2, further comprising a register file, wherein the operation commit unit makes a result permanent by transferring a result from an entry in the scheduler to the register file.

4. The processor of claim 3, further comprising a status register, wherein the operation commit unit makes a result permanent by transferring status flag values from indicated by a result from an entry to the status flag register.

5. The processor of claim 1, further comprising an instruction decoder which generates sets of operations from instructions which constitute a program to be executed by the processor, wherein the instruction decoder is coupled to load information associated with a set of operations into entries in the top row of the scheduler.

6. The processor of claim 5, wherein when the instruction decoder encounter a conditional branch instruction in the program to be executed, the instruction decoder:
  determines a predicted instruction address to follow the conditional branch instruction;
  continues decoding from the predicted instruction address; and
  loads into an entry of the top row of the scheduler information associated with an operation which when executed evaluates whether the prediction was correct.

7. The processor of claim 1, wherein the scheduler further comprises:
  a status register; and
  status flag logic which generates status flag bits from a value stored in the status register and results stored in memory fields of the scheduler and generates validity bits indicating whether the status flag bits are valid for operations at a boundary of a selected row of the scheduler which is associated with the status flag logic.

8. The processor of claim 7, wherein for a first operation which requires status flag bits for completion of a particular execution stage of the first operation, the status flag logic generates a signal which prevents the first operation from entering the execution stage until information associated with the first operation shifts down to the boundary of the selected row associated with the status flag logic.

9. The processor of claim 8, wherein status flag logic can simultaneously provide the status flag bits for execution of a first type of operation when the first type of operation is in a row above the selected boundary and provide the status flag bits for execution of a second type of operation when the second type of operation is in a row below the selected boundary.

10. The processor of claim 9, wherein the second type of operation is a conditional branch evaluation.

11. The processor of claim 1, wherein each row further comprises a row field for information relating to the operations associated with the entries in the row.

12. A processing system comprising:
   a memory subsystem which stores data and instructions; and
   a processor operably coupled to access the data and instructions stored in the memory subsystem, wherein the processor comprises:
      a plurality of execution units; and
      a scheduler coupled to the execution units, the scheduler comprising:
         a sequence of rows of entries, the sequence of rows beginning with a top row and ending with a bottom row, wherein each row contains a plurality of entries, each entry includes memory fields for storage of information describing an operation associated with the entry, and the memory fields of the entries of each row except the bottom row are coupled to the memory fields of the entries in a next row of the sequence to permit shifting of information from one row to the next in the sequence;
      logic which scans the entries to select operations for issue to the execution units for execution;
      logic which provides information to the execution units for execution of the issued operations; and
      logic which stores results from execution of previously issued operations in the entries associated with the previously issued operations.

13. The processing system of claim 12, wherein the processor and the memory subsystem are components of a motherboard.

14. The processing system of claim 13, wherein the motherboard further comprises a backplane bus operably connected to the processor, and wherein the processing system further comprises one or more devices on cards connected to the motherboard via the backplane bus.

15. The processing system of claim 12, further comprising a parallel device interface operably coupled to the processor.

16. The processing system of claim 15, further comprising a printer connected to the processor via the parallel interface.

17. The processing system of claim 12, wherein each row further comprises a row field for information relating to the operations associated with the entries in the row.

* * * * *

UNITED STATES PATENT AND TRADEMARK OFFICE
CERTIFICATE OF CORRECTION

Page 1 of 1

PATENT NO. : 6,195,744 B1
DATED : February 27, 2001
INVENTOR(S) : John G. Favor, Amos Ben-Meir, Warren G. Stapleton It is certified that error appears in the above-identified patent and that said Letters Patent is hereby corrected as shown below:

<u>Column 1,</u>
Line 53, please delete "5,093,213" and insert -- 6,093,213 --.
Line 67, please delete "5,826,073" and insert -- 5,809,273 --.

Signed and Sealed this

Nineteenth Day of March, 2002

Attest:

JAMES E. ROGAN
Director of the United States Patent and Trademark Office

Attesting Officer